United States Patent [19]
Drori

[11] Patent Number: 5,157,375
[45] Date of Patent: Oct. 20, 1992

[54] ELECTRONIC VEHICLE SECURITY SYSTEM

[75] Inventor: Ze'ev Drori, Los Angeles, Calif.

[73] Assignee: Clifford Electronics, Inc., Chatsworth, Calif.

[21] Appl. No.: 637,378

[22] Filed: Jan. 4, 1991

Related U.S. Application Data

[60] Division of Ser. No. 277,959, Nov. 30, 1988, which is a continuation-in-part of Ser. No. 231,159, Aug. 11, 1988, Pat. No. 4,922,224, which is a continuation-in-part of Ser. No. 138,828, Dec. 28, 1987, Pat. No. 4,887,064.

[51] Int. Cl.$^5$ ............................................. B60R 25/00
[52] U.S. Cl. ................................. 340/429; 340/426; 341/176
[58] Field of Search ............... 340/426, 430, 429, 527, 340/528, 539, 825.31, 825.69; 341/176; 307/10.2

[56] References Cited

U.S. PATENT DOCUMENTS

| | | | |
|---|---|---|---|
| 4,754,255 | 6/1988 | Sanders et al. | 340/426 X |
| 4,794,368 | 12/1988 | Grossheim et al. | 340/527 X |
| 4,897,630 | 1/1990 | Nykerk | 340/426 |
| 4,922,224 | 5/1990 | Drori et al. | 340/428 |

Primary Examiner—Jin F. Ng
Assistant Examiner—Brian R. Tumm
Attorney, Agent, or Firm—Roberts and Quiogue

[57] ABSTRACT

A multi-featured electronic vehicle security system is disclosed. The system is controlled by an electronic controller such a microcomputer. To reduce noise pollution due to false alarms caused by repetitive tripping of the system sensor devices, the system will not respond to more than a defined number of successive trippings of the same sensor device to initiate an alarm condition. The system includes a user-enabled feature wherein a first alarm signal generator is activated by a sensor tripping, and a second, distinct alarm signal generator is activated when a trigger device has been tripped. When the system is passively armed, active sensors and triggers are automatically diagnosed and bypassed, permitting the system to be passively armed even if one or more trigger or sensor is active. The system can be programmed so that if the system is disarmed by a remote control and the doors are automatically unlocked, the system will automatically rearm and relock the doors if a door is not opened within a predetermined time interval after disarming with the remote control.

15 Claims, 49 Drawing Sheets

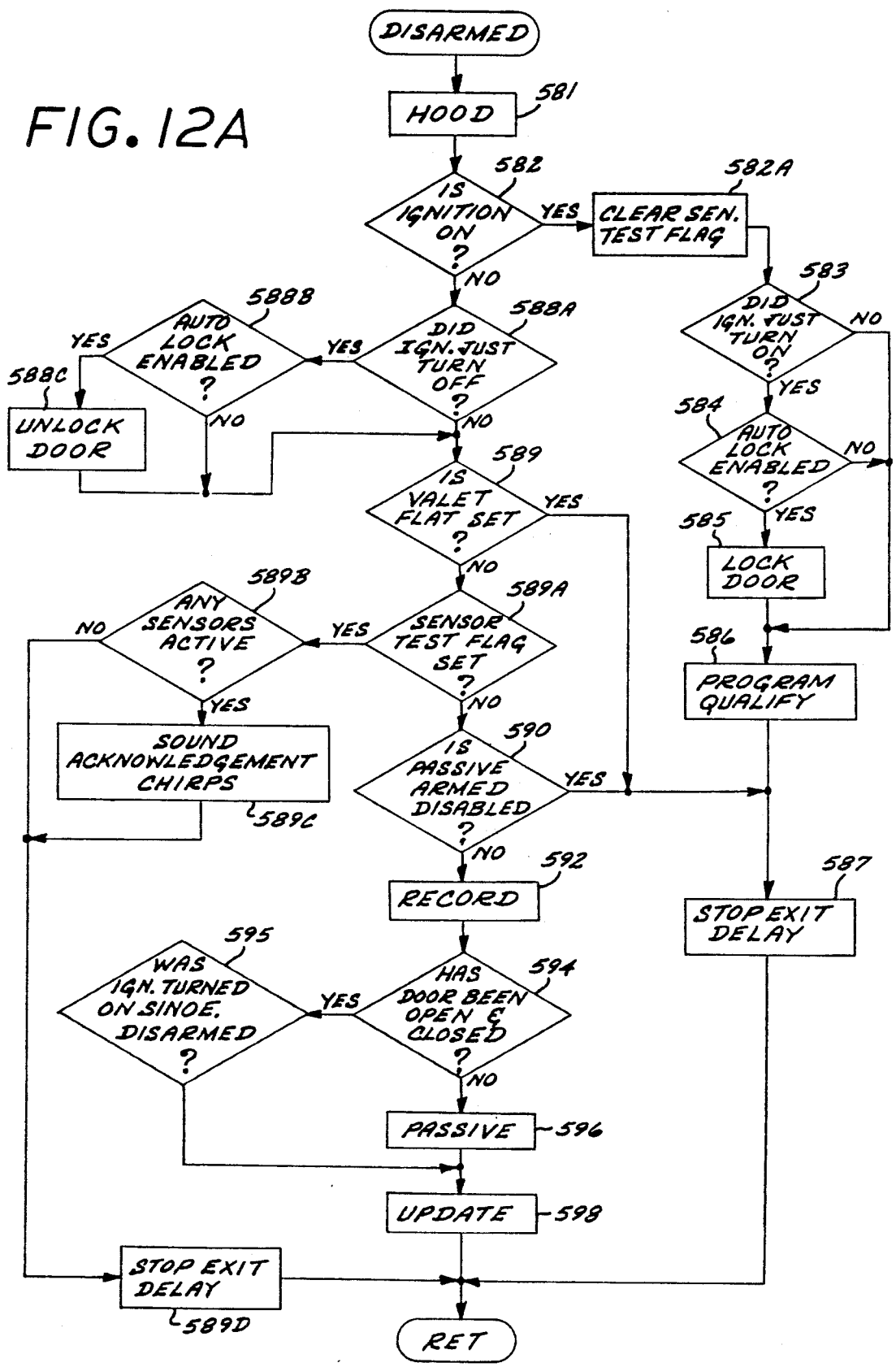

ELECTRONIC VEHICLE SECURITY SYSTEM

This is a division of pending application Ser. No. 07/277,959, now allowed, entitled "Electronically Programmable Remote Control For Vehicle Security System" by Ze'ev Drori, filed Nov. 30, 1988, which is a continuation-in-part of Ser. No. 07/231,159, entitled "Electronic Vehicle Security System," by Ze'ev Drori and Amir Abrishami, filed Aug. 11, 1988, now U.S. Pat. No. 4,922,224, which is a continuation-in-part of application Ser. No. 07/138,828, entitled "Multi-Featured Security System With Self-Diagnostic Capability," by Ze'ev Drori and Mansoor Amirpoor, filed Dec. 28, 1987, now U.S. Pat. No. 4,887,064, all assigned to a common assignee with the present application.

BACKGROUND OF THE INVENTION

The present invention relates to the field of security systems for monitoring and controlling access to a secured or access restricted area, such as a vehicle.

Security systems are in wide use today to control and/or monitor access to secured or access-restricted areas. Such systems typically employ one or more sensors and/or trigger switches which are monitored or controlled by a central controller to sense intrusion or to allow controlled access. Examples of such systems include vehicle security systems and building security systems, which may be activated by either a remote switch or transmitter or by a key pad to enter a predetermined code. Entrance of the correct code typically arms or disarms the system, opens or closes a door or the like. Automotive security systems typically employ vibration sensors, glass breakage sensors, ultrasonic or microwave sensors, as well as triggers such as door, hood or trunk triggers, to detect unauthorized intrusion attempts and to activate alarm devices such as sirens or lights to warn off the intruder and call attention to the intrusion, and in most cases such system will also activate a relay or other electronic circuits disabling the vehicle ignition system.

The sensors and triggers typically detect attempts to intrude into the protected area, such as by way of a door or window, forcing a hood or trunk open, lifting or moving the vehicle or the like. The trigger devices may take the form of switches which are activated by the opening or closing of a door or window. To allow access through doors or other access points, devices which release or position locking elements, such as solenoid switches, are typically employed.

Conventional security systems will not arm when a sensor indicate that a door or window is open, or when a sensor indicates that there is presently an intrusion into the protected area. As an example, a vehicle door left open will typically prevent the security system from being armed, or a window left open in a building will prevent the building security system from being armed. For the same reason, a defective sensor which indicates that a door is open irrespective of the position of the door, i.e., open or closed, will also prevent the security system from being armed. The result is that the vehicle or building owner is deprived completely of the benefit of the security system until the defective sensor is repaired.

Another disadvantage of conventional security systems is repetitive alarm alerts due to conditions such as a defective sensor, or noncorrected or ignored intrusion events. Most systems on the market have a maximum alarm duration for sounding a siren or other noise-making device when an alarm event is detected, after which duration the alarm resets itself. The maximum duration is typically set by local ordinances requiring that alarms shut off after some fixed time, say ten minutes, regardless of whether the owner has attended to the alarm or not. However, if the alarm was caused by a sensor or trigger which remains in an active state after the alarm system resets itself, then successive alarm cycles will be repeated over and over again until the alarm is disabled or the car's battery is depleted.

A further limitation of conventional vehicle security alarm systems is that they typically provide only a single type of audio alarm signal, such as a siren, or a siren sound alternating with a voice-synthesized audio message, e.g., "BURGLAR-BURGLAR." The same audio alert signal is generated no matter why the alarm condition was declared, e.g., a door opening results in the same alarm signal as a vibration sensor alarm condition. In many cases where the sensors cause an alarm, such as a vibration sensor or glass breakage sensor, a real intrusion event follows the sensor alarm condition within a few moments by the thief gaining entry through a door, trunk or hood. Yet because the same alarm audio signal results from both the sensor alarm and the door trigger alarm, the user may simply assume that the sensor alarm has caused the second alarm, not an actual intrusion into the vehicle, and ignore the warning.

Many luxury automobile are equipped with power door locks. Some electronic security and control systems have been integrated with the power door locks so as to automatically lock the doors when the security system is actively armed, and to automatically unlock the doors when the system is disarmed. However, a sitution may arise where an inadvertent activation of the remote control will not only disarm the alarm, but also will unlock the vehicle doors.

It is therefore an object of the invention is to provide a system which does not repetitively cycle through alarm cycles due to a constantly active sensor or trigger device.

An additional object of the invention to provide a security system which provides a different type of alarm signal when a door is opened within a predetermined time interval after a sensor alarm condition is sounded.

A further object of the invention is to provide a security system with passive arming which automatically bypasses active sensor or trigger devices, thereby permitting passive arming to occur even in the presence of defective sensors or triggers and without triggering an immediate alarm.

Still another object of the invention is to provide a vehicle security system having remote control and passive control features with an intelligent automatic locking and relocking function, whereby the system will be passively armed and the doors automatically relocked if a door is not opened within a predetermined time interval after the system is disarmed.

SUMMARY OF THE INVENTION

These and other objects and advantages are provided by a security system as described herein. A security system is disclosed for monitoring and controlling access to a protected area, such as a vehicle. The system includes one or more sensor devices, each for sensing an intrusion event and providing a sensor activated signal when the event is detected. Such sensors may take the form of vibration detectors, motion detectors, infrared, ultrasonic, or sound discriminators. The system further comprises one or more trigger devices, which may take the form of switches activated by the opening or closing of a door, hood, trunk or window.

The system further comprises means for communicating alert signals, such as for example, a siren, horn, auto-dialer for initiation of telephone calls or the like.

A system controller is provided to control the operation of the security system so that the system may be operated in an armed mode or in a disarmed mode. When in the armed mode the controller monitors the sensors and triggers and causes the communicating device to issue an alert signal through the output devices in response to a sensor or trigger activated signal.

In accordance with the invention, the system includes a means for reducing noise pollution and preventing the vehicle battery from being drained, due to repetitive alarms triggered by a constantly or repetitively activated sensor or trigger device. The system keeps track of the number of successive alarm cycles caused by activation of a sensor or trigger after the system was armed. Once this number reaches a predetermined maximum allowable number, the system will ignore any further activation signals from that sensor or trigger, and not generate alarm signals as a result, until the system is disarmed and rearmed again.

A further feature of the invention is to provide a first alert signal when a sensor device is activated after the system is armed, and thereafter to provide a more pronounced, second alert signal if any trigger is also activated within a given time interval after the sensor was activated. The first alert device may be a siren, and the second alert device may comprise a voice synthesizer for generating audible messages such as "BURGLAR BURGLAR." As a result, the system user is provided with clear alert indication signals that an intrusion has occurred.

Another feature of the invention is that triggers or sensors which are active when the security system is passively armed are automatically bypassed. This permits the system to be passively armed even if there is an active (typically defective) sensor or trigger and without immediately tripping the alarm due to such conditions.

The system further includes remote control door locking, unlocking and automatic relocking features that will automatically rearm the alarm and relock the doors if none of the doors are opened within a predetermined time after the system is remotely disarmed.

BRIEF DESCRIPTION OF THE DRAWINGS

These and other features and advantages of the present invention will become more apparent from the following detailed description of exemplary embodiments thereof, as illustrated in the accompanying drawings, in which.

DETAILED DESCRIPTION OF THE DISCLOSURE

Figure 1:
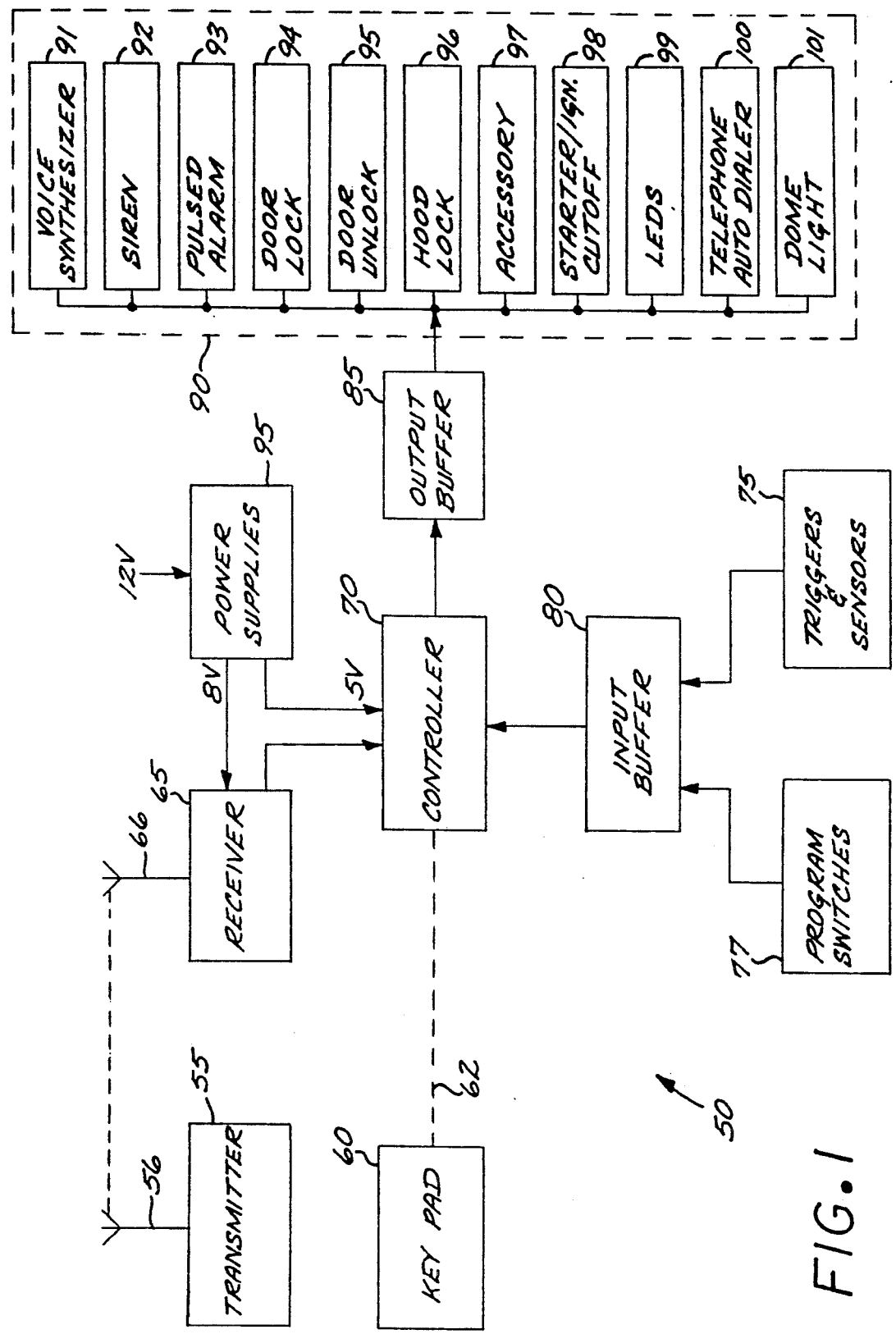
FIG. 1 is a simplified block diagram of a security system employing the present invention.

A simplified block diagram of the principal structural elements of a system embodying the invention is set forth in FIG. 1. The system includes a means for permitting the user to communicate with the system controller 70. This communicating means may take the form, in the conventional manner, of a transmitter device 55 for transmitting an encoded signal via an antenna 56. The transmitted signal is received by receiver 65 via antenna 66, and the received signal is provided in some form to the system controller 70. Additionally, or alternatively, the user communicating means may take the form of a key pad 60, which is coupled directly to the controller 70 by cable 62. The keypad 60 may comprise a plurality of digit keys 1-9, as well as additional keys or switches employed for various functions such as an "armed" switch for signaling the system to enter the armed mode. Additionally, or alternatively, the user communicating means may take the form of one or more switches 77 manually manipulated by the user. Such switches may take the form of a single three-position toggle switch having an off position intermediate a "momentary" position or switch spring-loaded toward the off position and a "valet" position or switch. With the transmitter 55, which may be used remotely, the key pad 60, or the program switches 77, the user may input to the controller a predetermined coded message to cause the controller to initiate some action, e.g., arming or disarming the security system, sounding an alert, entering the programming mode, or the like. One type of coded message typically takes the form of a predetermined sequence of binary-valued signals, which collectively define a digital user authorization code, e.g., a predetermined N-bit word. One aspect of the invention, the branch programming feature described below, is advantageously employed with a system employing a transmitter and the three-position switch but without a keypad.

Power supplies 95 provide electrical power to the receiver 65 and the controller 70. In the case of a security system mounted in a vehicle, the power supplies receive the primary source of power from the vehicle battery, typically 12 volts, and convert that available power source into voltage levels required by the system, here regulated +5 volts and +8 volts.

The system triggers and sensors 75 are coupled to the system controller 70 through input buffer circuitry 80. In the case of a security system installed in a vehicle, the sensor elements may be motion or vibration sensors, glass breakage sensors, ultrasound sensors and the like. The triggers are hard-wired switches on the doors, hood and trunk lid activated by a particular event such as opening or closing a door.

The system 50 further employs a plurality of controlled devices, indicated generally in FIG. 1 as elements 90, which are coupled to the system controller by output buffer circuitry 85. In the case of a vehicle security system, the controlled devices may include one or more of the controlled devices 90 shown in FIG. 1, i.e., the voice synthesizer 91, siren 92, pulsed alarm 93, (hooked to parking light and/or air horns), door lock device 94, door unlock device 95, hood lock device 96, accessory 97, starter or ignition cutoff apparatus 98, LEDs 99, telephone autodialer 100, and the vehicle interior courtesy or dome light 101.

The transmitter 55 in a preferred form provides a pulse-width-modulated RF signal, wherein an RF carrier at some predetermined RF frequency is modulated by information from an internal encoder unit. As is well known in the art, the transmitter may be actuated by depressing a switch, thereby generating a transmit signal encoded with information such as a multi-bit code. The specific code may be determined by the status of switches or the like comprising the encoder. The width of each pulse determines its status as a digital "1" or "0." The particular circuit arrangement comprising the transmitter 55 per se forms no part of the invention, and is not described herein in further detail. An exemplary circuit arrangement is described in the co-pending application entitled "Electronically Programmable Remote Control Access Systems" by Ze'ev Drori, Ser. No. 094,395 now abandoned, the contents of which are incorporated herein by this reference.

Figure 2:
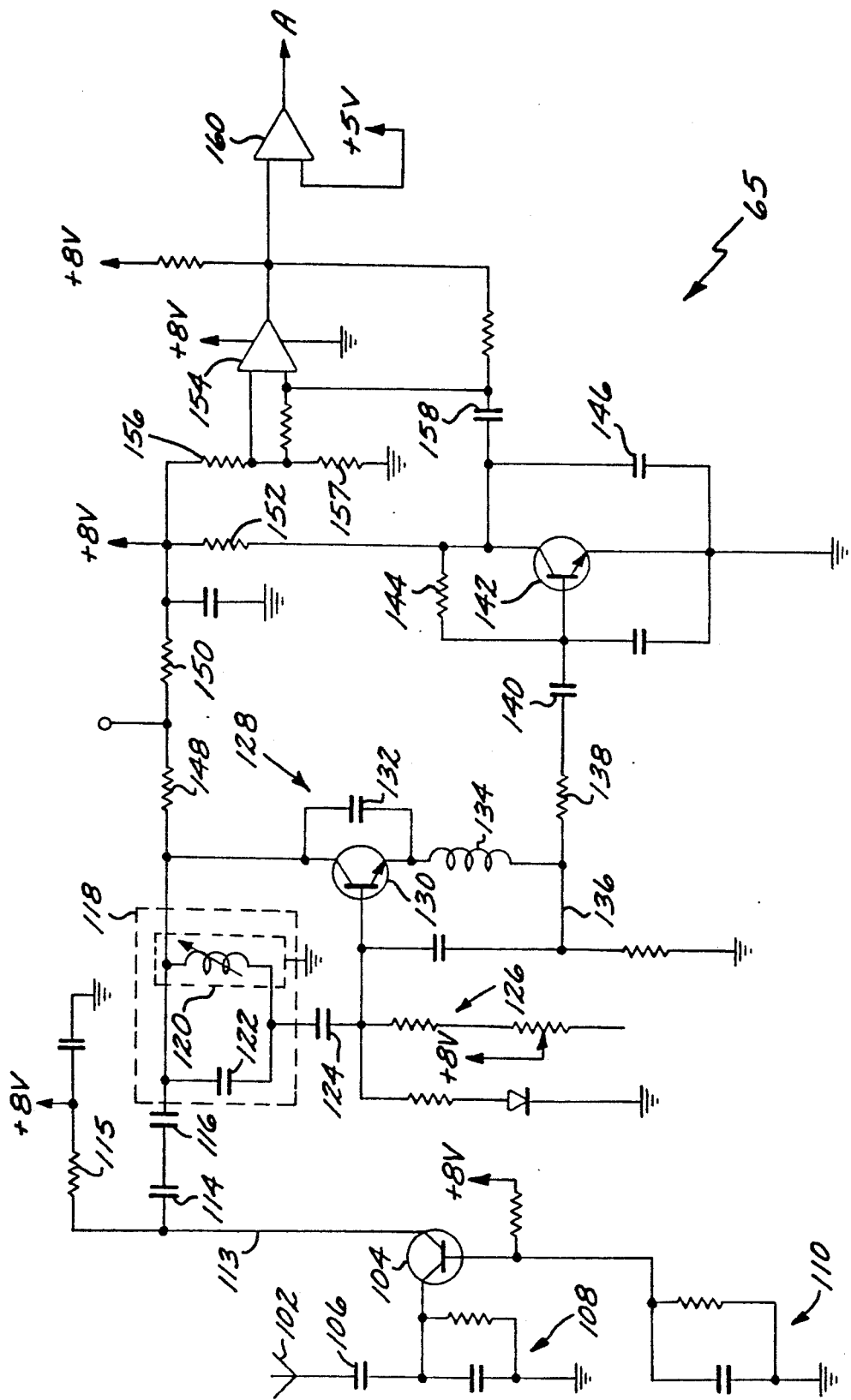
FIG. 2 is a schematic diagram of the receiver circuit of the security system depicted in FIG. 1.

The receiver 65 is more fully illustrated in FIG. 2, and is described in U.S. Pat. No. 4,887,065, the contents of which are incorporated herein by reference.

Figure 3:
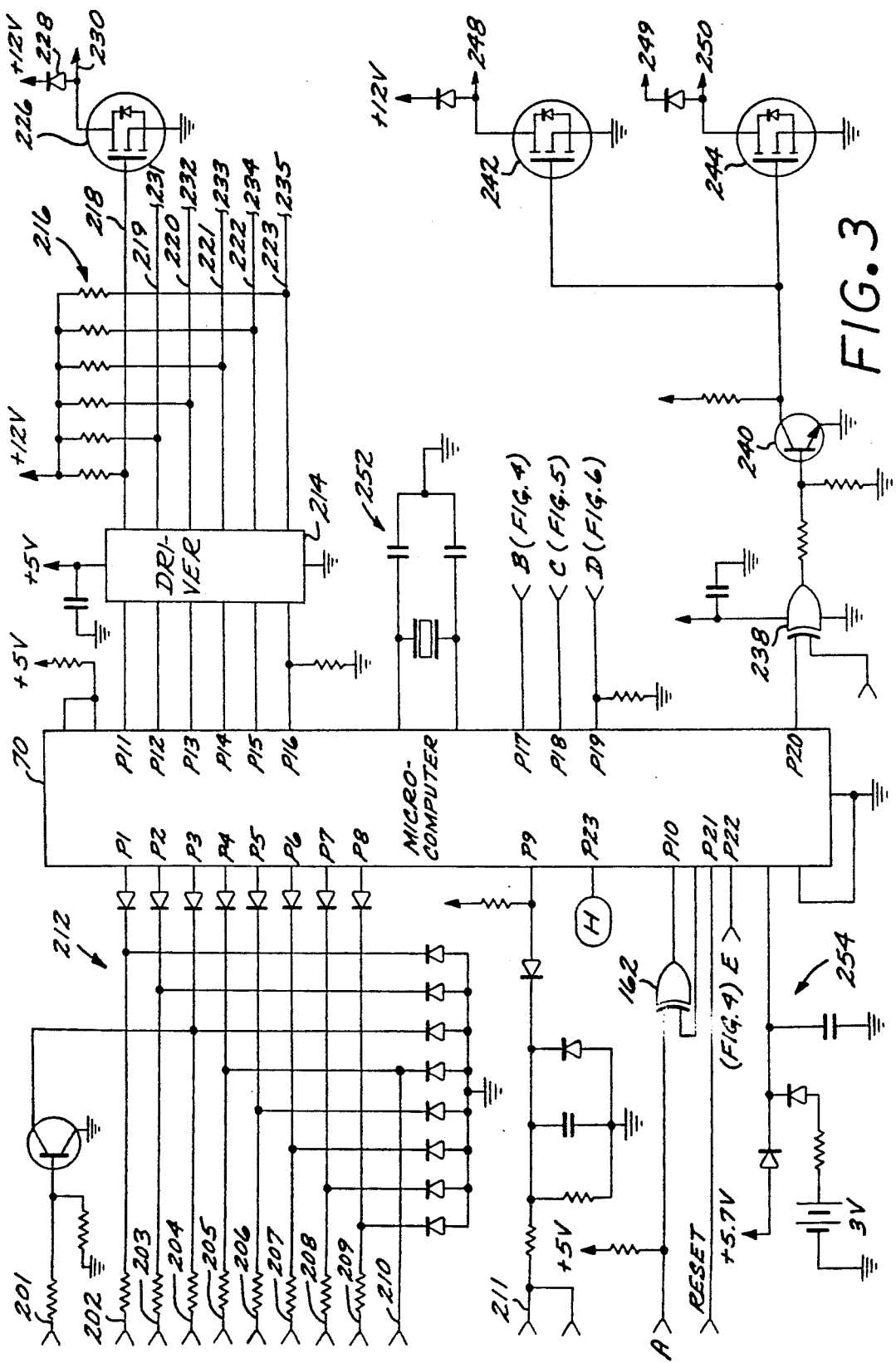
FIG. 3 is a schematic block diagram of the controller and input and output buffers of the security system of FIG. 1.

The output of the receiver 65 from inverter 160 is introduced into the controller 70, as is more fully illustrated in FIG. 3. In this case, the output from the receiver 65 is introduced into an exclusive OR gate 162 (acting as a programmable inverter) which has an output to the controller 70. The controller 70 comprises a microcomputer, with some internal RAM and nonvolatile memory capacity, such as the NEC 80C49H microcomputer.

The plurality of sensors and triggers 75 (FIG. 1) are coupled to the controller 70 by a buffer circuit 80 comprising the diode network 212 shown in FIG. 3. The triggers and sensors 75 are connected to nodes 201–210 which connect to the network 212 and to node 211. By way of example only, a door trigger device may be connected to node 201, first and second sensor devices to nodes 202 and 203, an "immediate" trigger device at node 205, a hood position sensor at node 206, program switches 77 (the "valet" and "hood" switches) at nodes 208 and 209, a normally closed trigger at node 210, and an ignition switch "on" or "off" sensor at node 211. Commonly, the door trigger node is actually wired to the vehicle interior light, which is in turn activated by the conventional door trigger switches. The pins P1–P8 are monitored by the microcomputer 70, enabling the microcomputer to monitor the states of the trigger and sensor devices, thereby monitoring the protected areas of the vehicle.

The particular triggers, sensors and switches are described by way of example for a vehicle security system implementation. The "immediate" trigger device is typically connected to the vehicle trunk or back door, for generating an immediate alarm when the trigger is activated. The hood position sensor provides a signal indicative of the position of the hood, i.e., closed or not closed. The normally closed trigger coupled to node 210 is a trigger device that is normally grounded, and is activated when the trigger is no longer grounded. Such a trigger is normally connected to the vehicle radio, to signal when the radio has been removed.

The sensors and triggers 75 and switches 77 are preferably coupled to the controller 70 in such a way as to allow the controller to monitor the individual status of each device. Pin P10 of the microcomputer 70 is also monitored to receive information from the receiver 65.

Pins P11–P20 of the microcomputer 70 are employed as output pins to control the various controlled devices 90 employed with the system. The output buffer circuitry 85 comprises hex driver device 214, for example, a type 76C906 device, and pullup resister network 216 connected to output lines 218–223, which are in turn connected to a corresponding plurality of power TMOS transistor output devices, one of which is indicated as device 226. The output of the power transistor 226 is diode-coupled to a 12 v power source and is connected to a controlled device at node 230. Thus, the driver circuit 214, network 216, power transistor 226 and diode connection to the power source serves as part of the output buffer circuit 85 to enable the low level microcomputer output signals to drive a controlled device such as, for example, a siren, pulsed alarm, door lock, door unlock, a hood lock, and the like which require substantial power to operate, e.g., by actuating relays. Nodes 231–235 are connected to similar power transistor output devices, which for the sake of clarity are not shown. These nodes are also used to control various controlled devices.

For this example of the invention, line 218 controls the siren device 92, line 219 the pulsed alarm 93, line 220 the door lock device 94, line 221 the door unlock device 95, line 222 the hood lock device 96 and line 223 an accessory device 97, the interior light 101, or the autodialer 91.

Another output pin P20 of microcomputer 70 is coupled to an inverter circuit 238 whose output is connected to driver transistor 240. The collector of transistor 240 drives power transistors 242 and 244 to provide additional control nodes 248–250 to control various controlled devices, such as the starter/ignition cutoff device 98, accessory 97 and the like.

Figure 4:
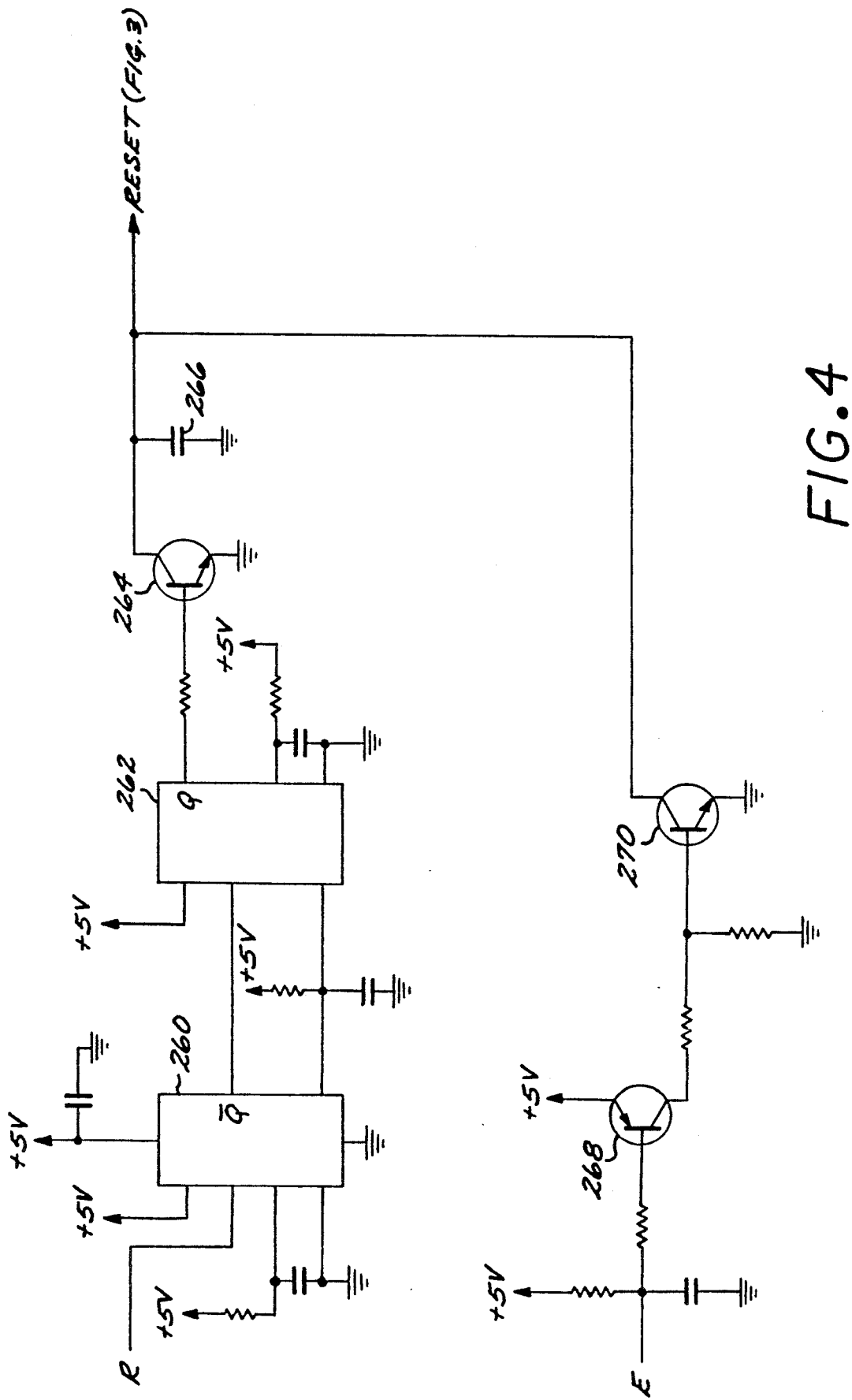
FIG. 4 is a schematic diagram of a reset signal generating circuit employed with the controller of FIG. 3.
Figure 5A:
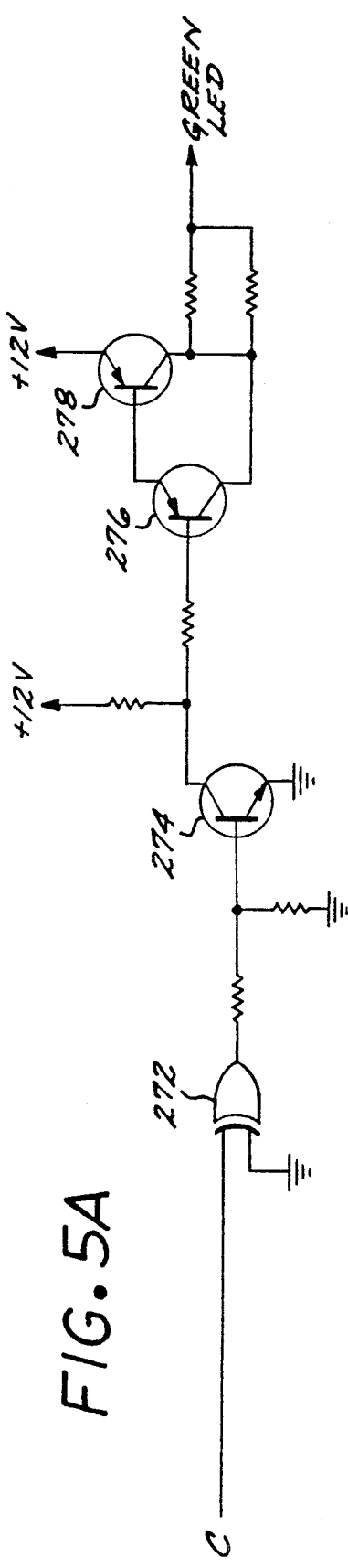
FIGS. 5A and 5B are schematic diagrams of LED driver circuits employed with the controller of FIG. 3.
Figure 5B:
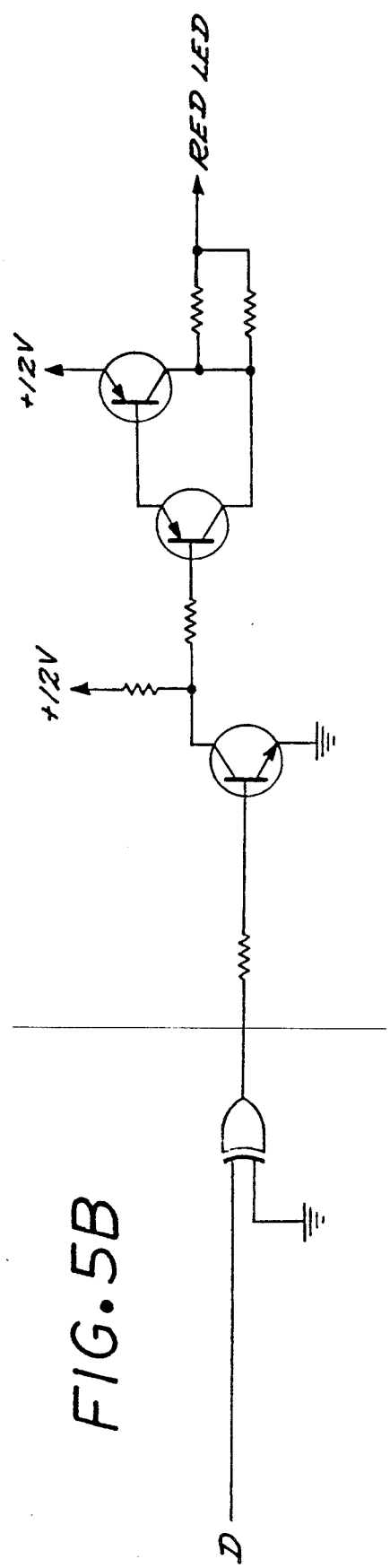

Output pins P17—P19 are connected respectively to the circuit shown in FIG. 4 and the LED driver circuits of FIGS. 5A and 5B.

An oscillator circuit 252 provides a stable oscillator frequency signal to the microcomputer for use as the device clock. The microcomputer 70 receives +5 volt power from battery circuit 254 and from power supplies 95.

The microcomputer 70 receives a reset signal on pin P21 from a reset signal generating circuit shown in FIG. 4, and described more fully in U.S. Pat. No. 4,887,064.

FIGS. 5A and 5B illustrate respective driver circuits for the green and red LED devices 99 which are employed in the disclosed embodiment to provide a means for visually communicating with the user of the system. Pin P18 of the microcomputer 70 controls the green LED driver circuit of FIG. 5A and pin P19 controls the red LED driver of FIG. 5B. The green LED driver circuit comprises an inverter device 272, NPN transistor 274, PNP transistors 276 and 278 connected in the manner shown in FIG. 5A. The operation of the driver circuit of FIG. 5A as well as that of FIG. 5B will be readily understood by those skilled in the art. In the case of the security system installed in a vehicle, the LEDs 99 may be mounted on the vehicle instrument panel or dashboard.

Figure 6:
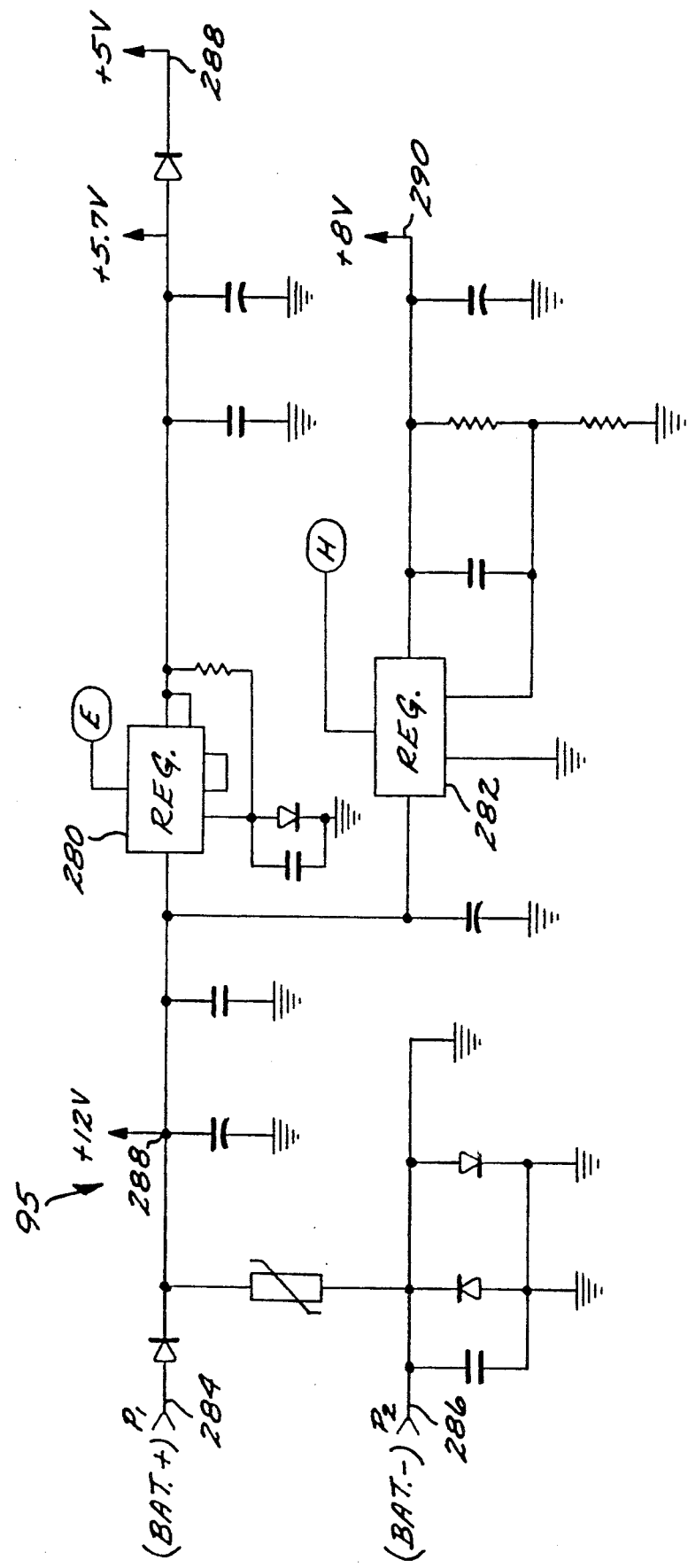
FIG. 6 is a circuit schematic illustrating an embodiment of the power supplies employed in the system of FIG. 1.

Referring now to FIG. 6, the circuitry for the power supplies 95 is shown. The circuitry develops regulated 5 and 8 volt sources. By monitoring the state of the regulator error signal at pin P23, the controller determines when the +8 volt supply is no longer available. In such case, the controller will disable operation, as is described more fully in U.S. Pat. No. 4,887,064.

Figure 7:
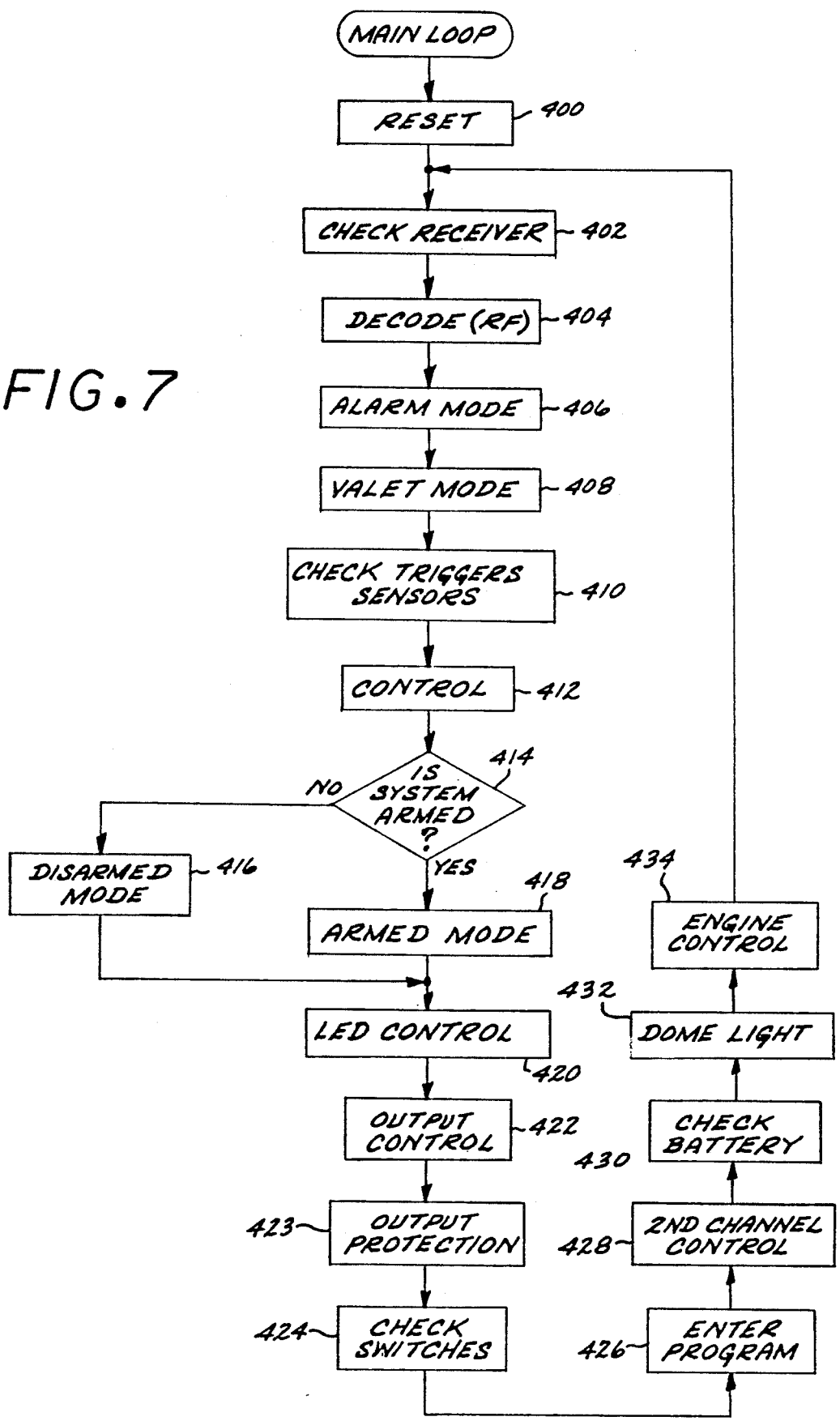
FIGS. 7-18 are flow diagrams illustrating the operation of the security system generally depicted in FIG. 1.

To further explain the operation of the system shown in FIG. 1, a general flow diagram is set forth in FIG. 7. As will be apparent to those skilled in the art, the desired operation of the system is achieved by appropriate programming of the controller 70 to achieve the functions indicated in the flow diagram.

The operation commences at step 400 on system powerup with the RESET function. This results in the reset circuit (FIG. 4) providing a reset signal to the controller to initialize the various parameters and flags utilized in the microcomputer 70. The reset function also includes detecting whether power has been disconnected from the security system and then reconnected. The system will activate the alarm if the reconnection of power is unauthorized. The "reset" feature of the system is more fully described with respect to FIG. 8.

The next step 404 in the general operational flow is to decode the received RF signal, in the case of the embodiment of FIGS. 2-6, wherein decoding internal to the microcomputer 70 is employed. This function is a correlation of the received sequence of digital data bits with the stored authorization code. If the received signal matches the stored code, then a flag is set indicative of the condition of a correctly entered user authorization code. The decode function for the internal decoder is interrupt driven, with assembly of the incoming data bits occurring in the background until a "dead period" is detected with no data coming in for a predetermined period of time. Then the received bit sequence is compared with the stored data, and flags are set accordingly. The internal decoding function is shown more fully in FIGS. 9A-C.

The next function to be performed is the ALARM mode function 406. Here, the alarm mode is commenced, if appropriate, as determined by the appropriate software flags, i.e, the "TRIP" or "PANIC" flags. Thus, if the alarm mode has been triggered, then controlled devices such as the siren, the dome and parking lights and the like as programmed to occur during an alarm event are activated. The alarm mode starts a timer for the alarm duration. If either the "PANIC" or "TRIP" flag is cleared during the timeout, the alarm mode ends immediately. Otherwise the flags are cleared at the end of the alarm interval. The alarm mode is described more fully with respect to FIG. 10.

The next function in the overall sequence is the VALET MODE function 408. The valet mode allows the security system to be disabled so that the vehicles may be left in the care of an authorized person, such as a valet, service technician or the like. Thus, if the valet mode is properly entered, the VALET flag will be activated.

The next function 410 to be accomplished by the system is to check the triggers and sensors of the system. This is accomplished by reading the states of the microcomputer 70 pins P1-P9. For each active line or device, a flag is set. The flag will be cleared when the particular line or device is no longer active.

Figure 11A:
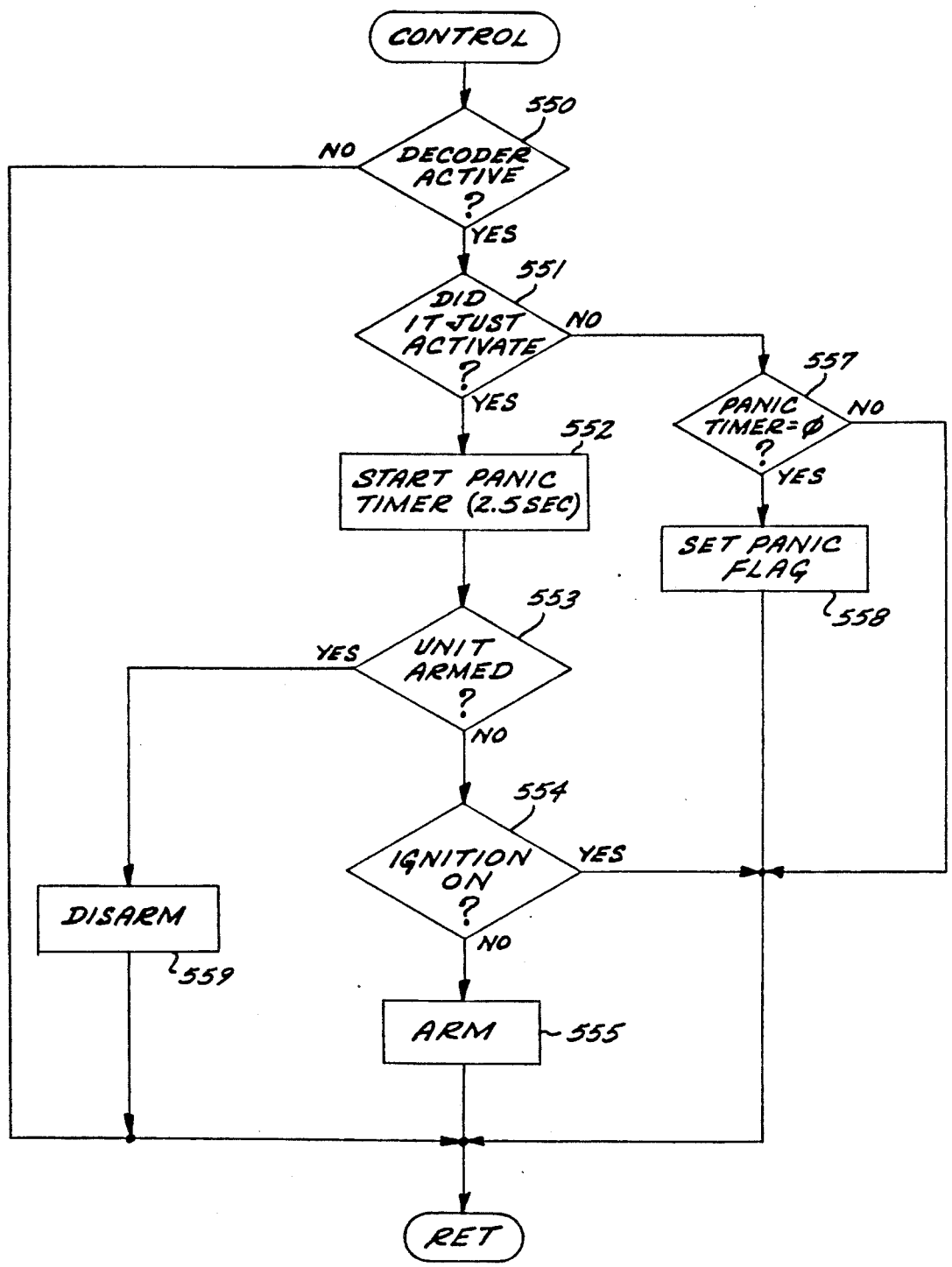
Figure 11B:
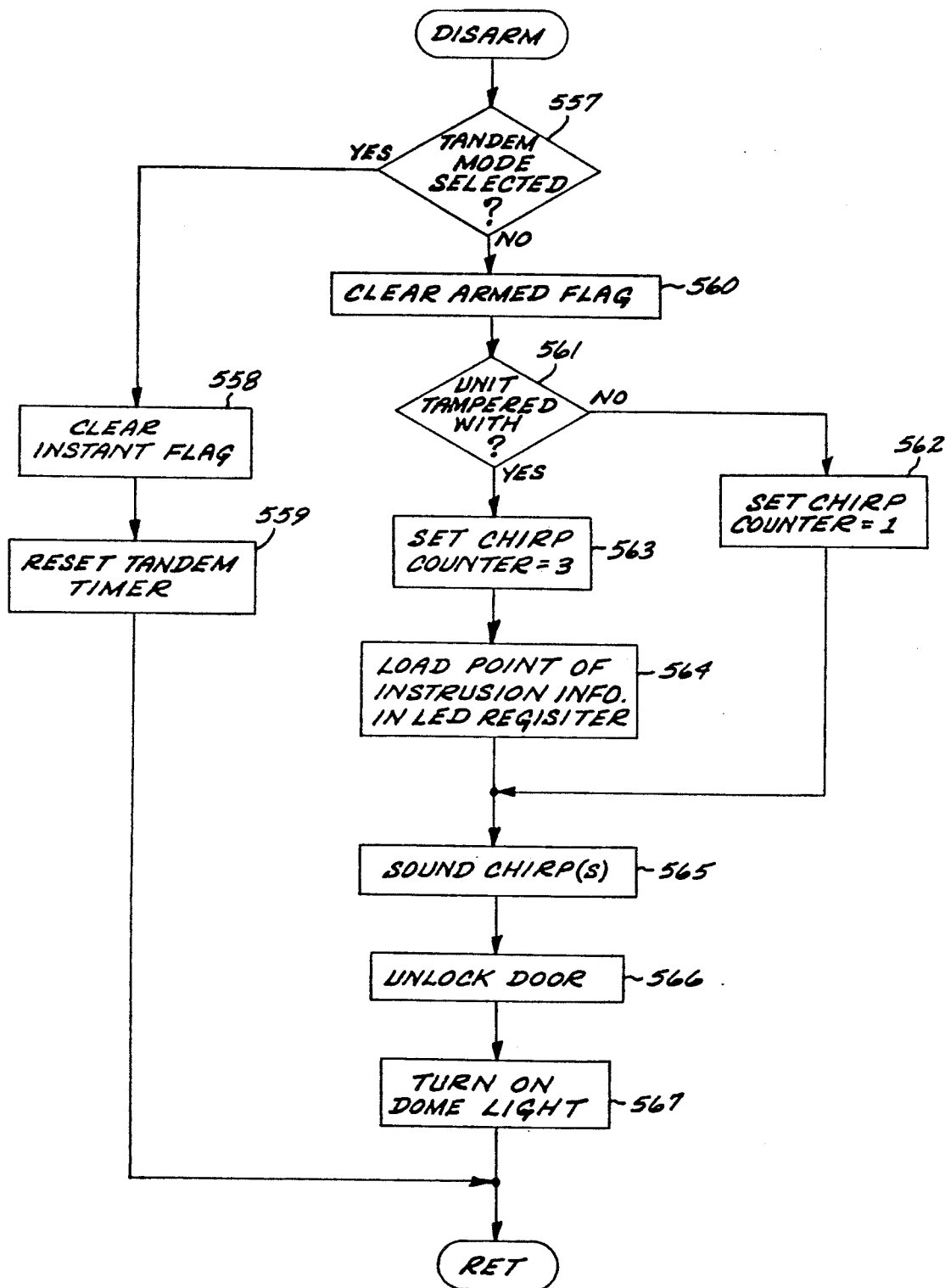

The next function in the main loop (FIG. 7) is the CONTROL function 412. This is described in detail with respect to FIGS. 11A-11C. In general, the control function responds to the decoder outputs. When the command is received to arm the system, the controller checks the sensor and trigger flags. If no sensor or trigger line is active, i.e., none of the device flags are set, then the controller enables two "chirps" (a chirp is sounded by a pulse applied to the siren 92) and then sets the ARMED flag. If there is an active trigger or sensor, four chirps are sounded and the controller provides information to an LED register comprising the controller 70, indicating which sensor is active, i.e., setting a flag which will be used to communicate visually to the user which sensor is defective. If the decoder signal is to disarm the system, then the controller sounds one chirp if there was no tampering with the controlled area. If tampering occurred during the time the system was armed, the chirp counter is set to 3 (step 563, FIG. 11B), the controller 70 provides the LED register with information as to which sensor or trigger was tampered with (step 564). During this function the controller also set the duration for the door unlock/lock control signal.

Once the CONTROL function has been completed, then at step 414, the decision is made as to whether the system is armed, by checking the ARMED flag. If the system is armed, then the next function is the armed mode function 418. If the system is not armed, the disarmed mode function 416 is performed.

A timer is initiated in the ARM mode (FIG. 11D) to disable the sensor "two" (e.g., a motion or shock detector or sound discriminator) line (coupled to pin P2 of the controller 70 in FIG. 3) for five seconds. After the initial five seconds, both trigger and sensor lines are enabled. A counter function is provided for counting how many times each sensor or trigger is activated consecutively. After ten consecutive alarms by a particular sensor or trigger, that device will be disabled. This prevents noise pollution and battery drain caused by what would otherwise be a continuing alarm signal. If a sensor or trigger is active, a TRIP flag is set and information is placed in a register which identifies the particular trigger or sensor which tripped the alarm. The LED control mode 420 responds to this data when the system is disarmed.

The DISARMED function 416 controls the passive arming of the system. This is described in further detail with respect to FIG. 15B.

The LED control function 420, when the system is armed, sets the red LED flag to flash with the appropriate message as indicated by the data stored in the LED register. If the system is disarmed, the green LED flag will be set to flash in the appropriate sequence. If the valet mode has been entered the green LED flag will be set. The LED control is shown in further detail in FIGS. 14A-C.

The next function in the general operation flow is the OUTPUT CONTROL function 422. Here the controller examines the flag for each output line of the controller 70 for a controlled device, and if set, will turn that output line on. If the flag for a particular output line is cleared, the controller will turn that line off. Thus, this function activates and deactivates the controlled devices 90, in dependence on the state of the software flag associated with the particular device.

Following the OUTPUT CONTROL function 422, the OUTPUT PROTECTION function 423 is performed. This function involves monitoring the current flow magnitude through particular controlled devices, generally the siren and the ignition cutoff devices, and turning off these devices if the current through a respective output device exceeds a predetermined level. This protects the output devices against damage due to improper installation or wiring conditions. This feature of the invention is described more fully with respect to FIG. 19.

The next function is the CHECK SWITCHES function 424. During this step, the controller checks the status of all switches other than sensors and triggers, i.e., the ignition switch, and the ("valet" and "program") switches 77. The controller sets flags as appropriate for each line.

The next function is the ENTER PROGRAM function 426. The purpose of this mode is to program the system, e.g., by enabling or disabling particular programmable features of the system as is described more fully with respect to FIGS. 15A—U. The system chirps once to signify that the program mode has been entered and the green LED is turned on. The programming mode can be aborted by turning the ignition switch off.

Figure 16:
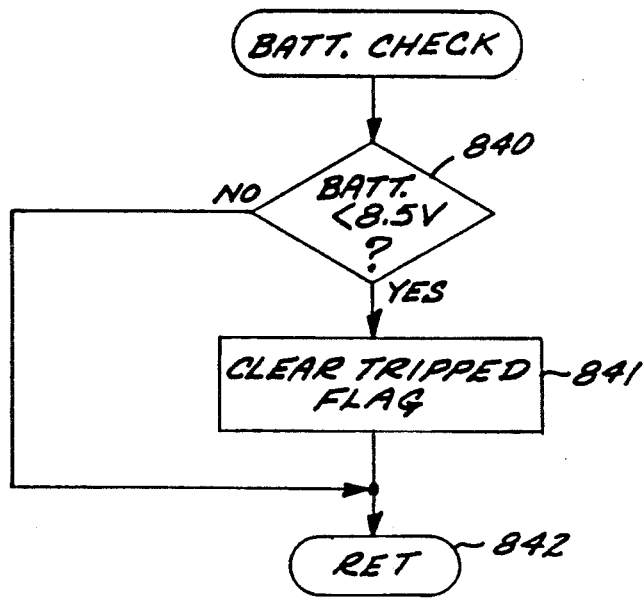
Figure 17:
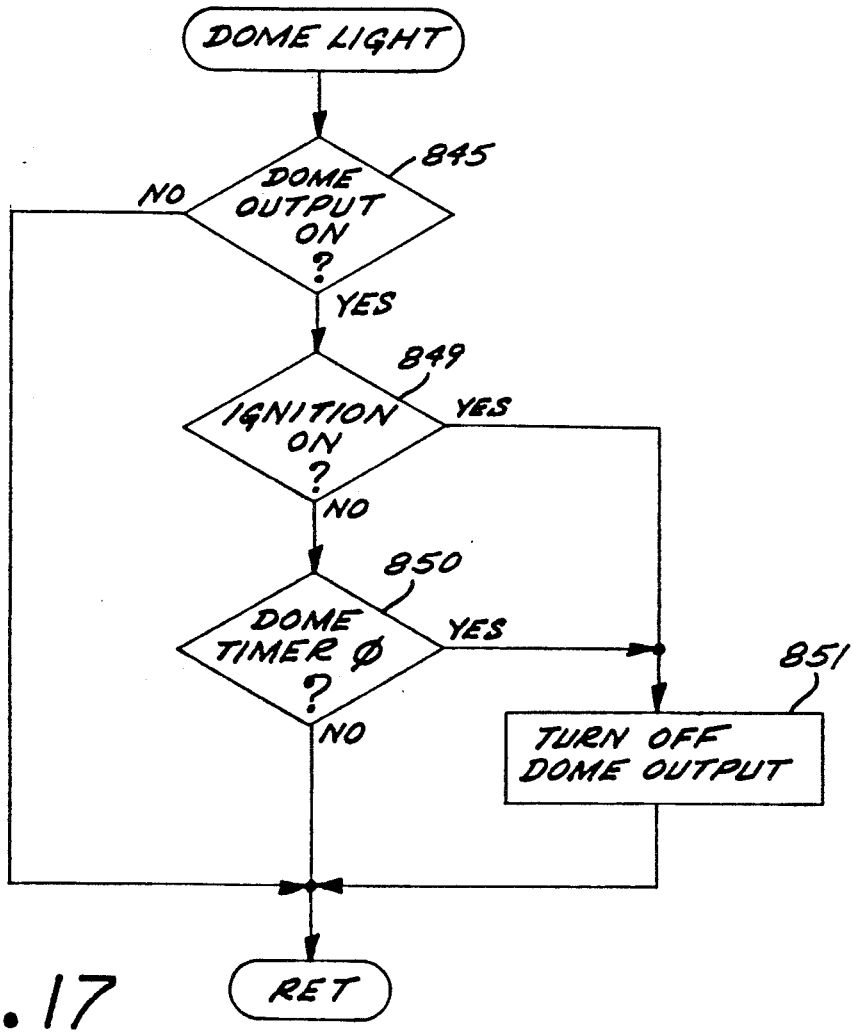

The CHECK BATTERY function (step 430), shown in FIG. 16 operates to detect the condition wherein +5 volts is not available to the security system, and disables the system in that event to avoid further draining the vehicle battery. The DOME LIGHT function 432 allows the user to have the interior courtesy or dome light activated for a predetermined interval after the system is disarmed or until the ignition switch is turned on. Another function performed during the main loop is the "ENGINE CONTROL" function 434. This function selectively disables the vehicle engine to prevent unauthorized operation of the vehicle.

After step 434 has been performed, the operation flow loops back to step 402 to commence the loop again. The entire main loop takes only a short period of time to complete, on the order of milliseconds.

Figure 8:
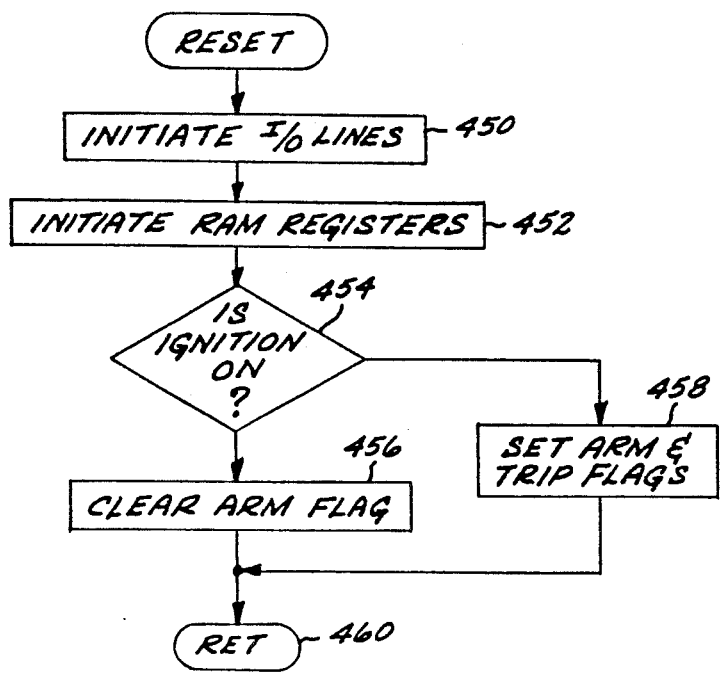

Selected ones of the particular functional modules described above will now be described in further detail. FIG. 8 shows the RESET module which is activated when the +5 volt power supply to the system 50 is interrupted and restored. Upon power up, the controller 70 input/output lines are initiated at step 450. At step 452, the registers of the random access memory of the controller are initialized. At step 454, the ignition switch state is read and if turned on, the ARM flag is cleared at step 456, and the program operation returns to step 402 of the main operation loop. If the ignition switch is not turned on, the ARM and TRIP flags are set, since this is interpreted as an unauthorized power up of the system, and program operation returns to step 402.

Figure 9A:
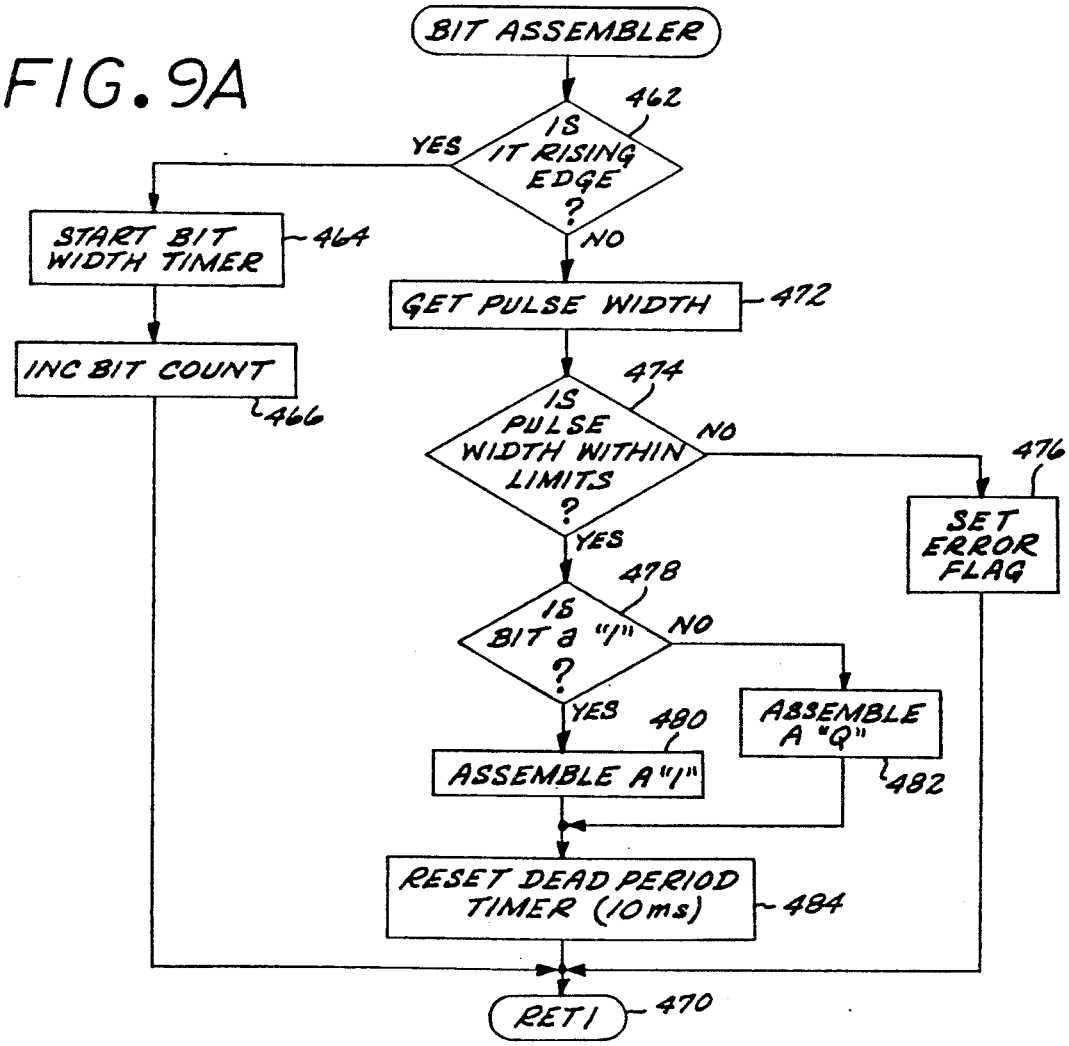
Figure 9B:
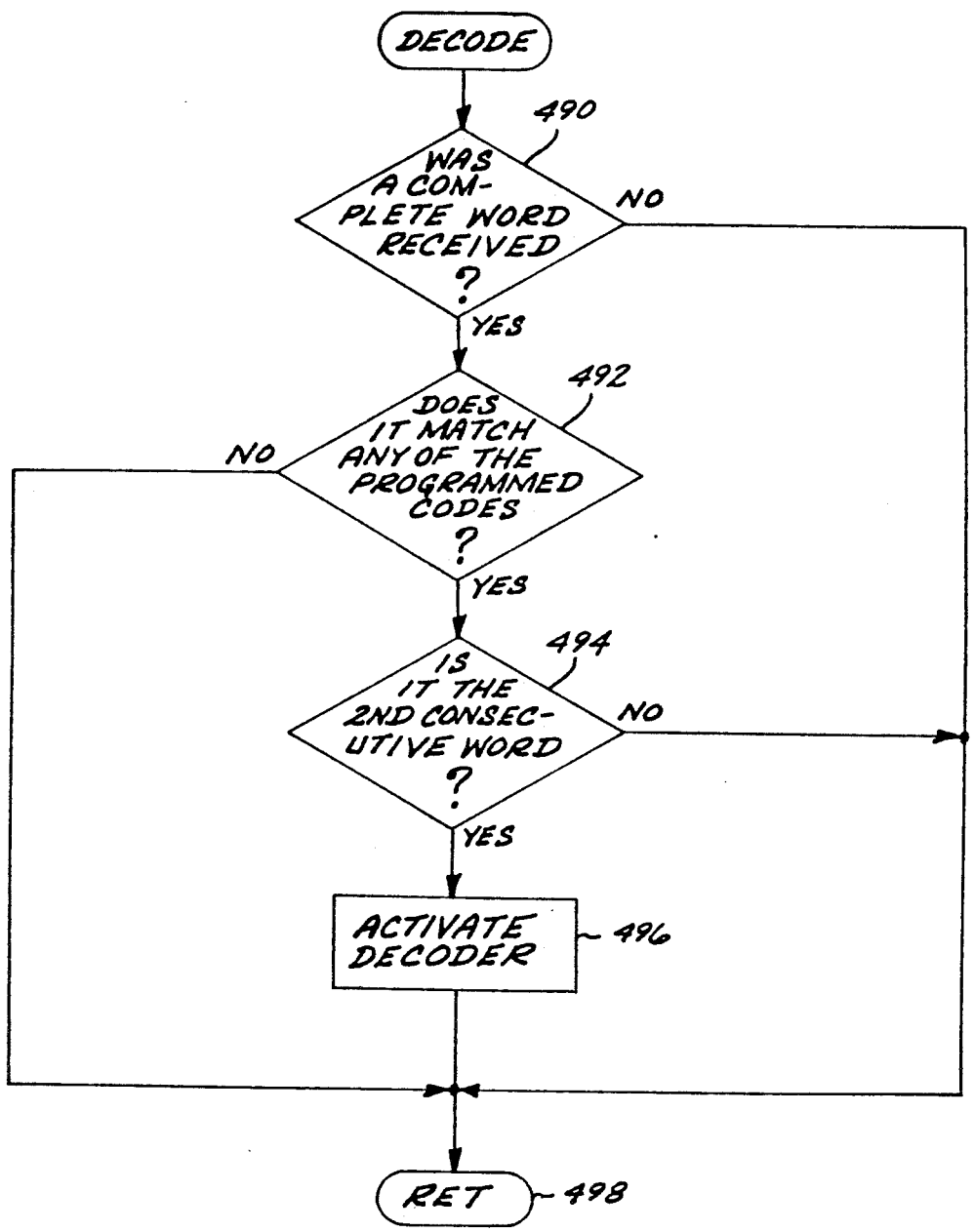

The internal DECODE module 404 is illustrated in further detail with respect to FIGS. 9A—B. FIG. 9A shows the bit assembly operation carried out by the controller 70 as data is being received by the receiver. This background operation is continuously performed, even as the operational flow is at various functions within the main loop of FIG. 7. The receipt of a bit (rising edge) from the receiver at pin P10 of controller 70 results in a hardware interrupt, which shifts operation to the bit assembler (FIG. 9A). At step 462, if a rising edge of a received pulse is detected, then at step 464 a "bit width" timer is started, the bit count for the particular received sequence of bits is incremented (step 466), and at step 470 operation returns to whatever step in the main loop in which the interrupt occurred. If at step 462, the rising edge of a pulse is not detected, then at step 472 the present pulse width is determined, and if not within the predetermined limits (step 474), then at step 476 an ERROR flag is set. At step 470 operation returns to the main loop step at which the interrupt occurred. If the pulse width is within limits, then at steps 478, 480 and 482 either a "1" or a "0" bit is assembled with the preceding data bits, as appropriate. At step 484, the "dead period" timer (10 milliseconds) is reset and at step 470 program operation returns to the main loop.

Referring now to the DECODE subroutine of FIG. 9B, the first step 490 is to determine whether a complete word has been received. This determination is made upon occurrence of a "dead" period by checking the bit count and comparing that current count with the length of the authorization code. If a complete word has not been received, then the subroutine returns to the main loop. If a complete word has been received, then at step 492, the received word is compared against the stored authorization codes to determine if there is a match. If not, the program operation returns to the main loop. If the received word matches any of the programmed authorization codes, then if the matching code has been received twice consecutively (step 494), the decoder is activated at step 496. If the matching code has not been received twice consecutively, program operation returns to the main loop without activating the decoder. The requirement that the matching code be received twice consecutively is a further security feature, against the user of code scanners.

Figure 9C:
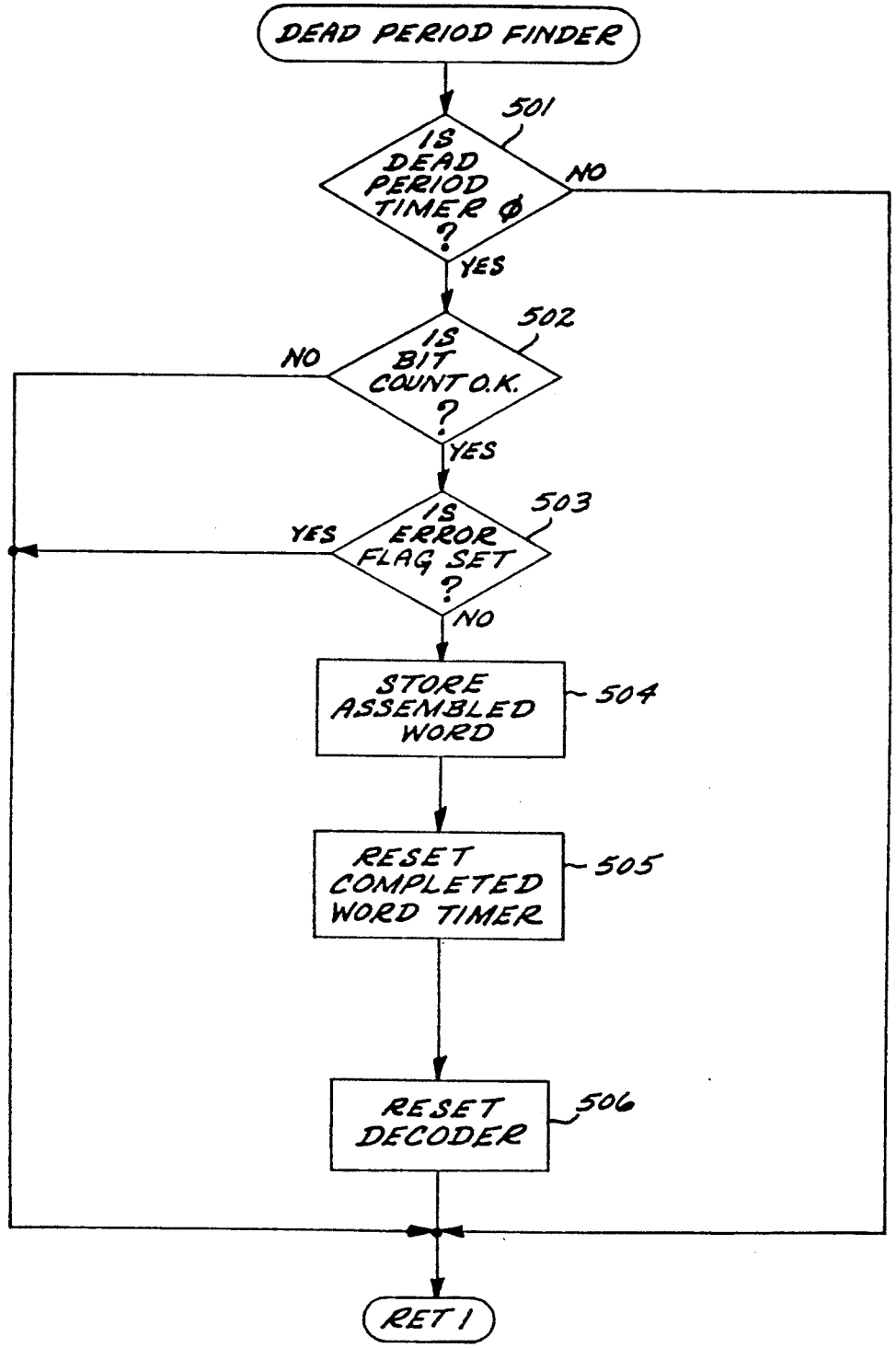

A "dead period" timer is employed as a "background" function, which on an interrupt basis monitors the receiver output to locate 10 millisecond time periods between received data. Such gaps indicate that a data word has been received. The dead period finder function is illustrated in FIG. 9C. The routine employs a 10 millisecond software timer, which is reset during the bit assembler operation (step 484, FIG. 9A). At step 501, this dead period timer is checked to determine if it has received the "0" timed-out state. If not, the operation returns to the particular function in the main loop at which the interrupt occurred. If the timer state has reached "0", then at step 502, the bit count is checked to see if the bit count is not equal to the maximum possible code bit length. If the count equals that maximum length, then the decoder is reset to the inactive state at step 506, and the operation returns to the main loop. If the bit count does not exceed this maximum length, then the error flag is checked at step 503, and if set, operation branches to step 506 to reset the decoder. If the error flag is not set, then at step 504, the assembled word is stored (step 504) in a buffer memory comprising the controller 70, the completed word timer is reset at step 505, the decoder is reset to the inactive state (step 506), and operation returns to the main loop.

The ALARM mode function (function 406 in FIG. 7) is shown in FIGS. 10A-D. This function is to activate and deactivate the alarm condition events at the appropriate times. At step 507, the alarm flag is checked. If set the alarm timer state is checked (step 508A) to determine whether it has reached the "0" or timed-out state. If the timer state is "0," then the ALARM, TRIPPED and PANIC flags are cleared (step 508B), the controller outputs for the controlled alarm devices are turned off (step 508C), and operation returns to the main loop. If the alarm flag is not set (step 507), the TRIPPED and PANIC flags are checked at step 509. If neither flag is set, no alarm devices are to be activated, and therefore operation returns to the main loop. If either the TRIPPED or the PANIC flag is set, then at step 510, the ALARM flag is set. At step 511, the alarm timer is loaded with the programmed alarm duration, and then the alarm outputs are turned on (step 512A), including such controlled devices as, for example, the siren, pulsed alarm, autodialer and vehicle interior light. At step 512B, the "BURGLAR-BURGLAR" subroutine is called. Its purpose is to activate a second alarm device if certain conditions are met, the second alarm device (e.g., device 91, FIG. 1) comprising a siren and voice-synthesizer device, now commercially available, which alternates a siren sound with the voice synthesized audio message "BURGLAR-BURGLAR." The subroutine 512B is described more fully with respect to FIG. 10E. If at step 512C, the BURGLAR-BURGLAR siren is active, the siren subroutine 513 is bypassed. Steps 513 and 514 indicate the SIREN and PULSED ALARM subroutines, the former illustrated in FIGS. 10C-D. Lastly, the INT LIGHT subroutine is called at step 514A, and illustrated in FIG. 10F. If this feature has been enabled by the installer, the interior light will be pulsated on and off during an alarm cycle. Operation then returns to the main loop.

The first step of the SIREN subroutine (FIG. 10B) is to determine whether the siren counter is at the "0" state (step 515). If not, the counter is decremented (step 516) and its state is again checked. If the count is "0," at step 525, the timer variable TSIREN is set to 240 milliseconds, the siren output line is turned off (step 526). Operation then returns to the main loop. If at step 515, the counter is at "0," then the siren counter is reset (step 521), TSIREN is set to 2.5 seconds (step 522) and the siren is turned on (step 523) before operation returns to the main loop. At step 517, if the counter state is not zero, then through step 518, either the OFFSOUND or ONSOUND subroutines (FIG. 10C and 10D, respectively) will be accessed. At step 520, operation for the next bit in the personalized siren code is set up, and operation returns to the main loop.

Figure 10A:
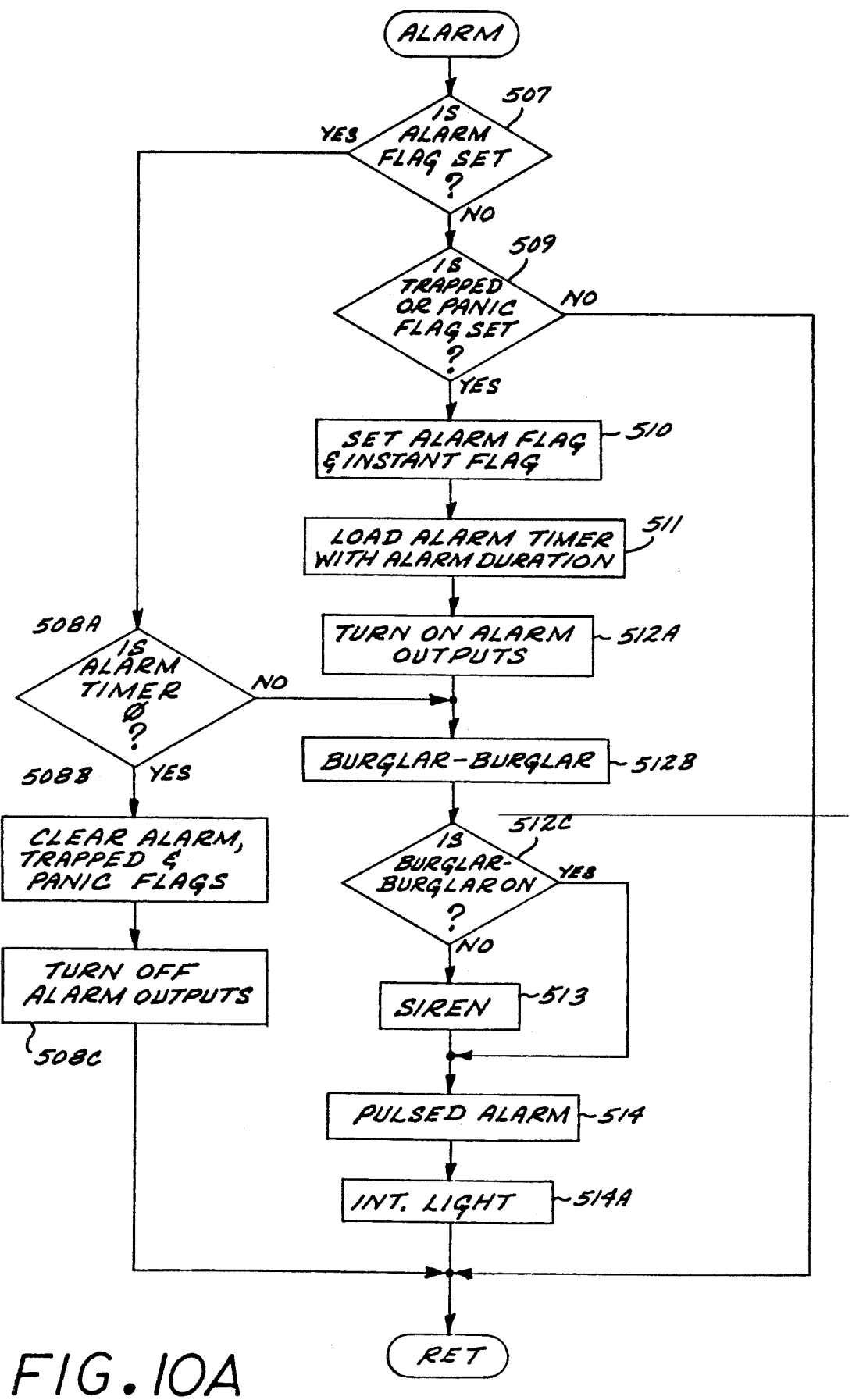
Figure 10B:
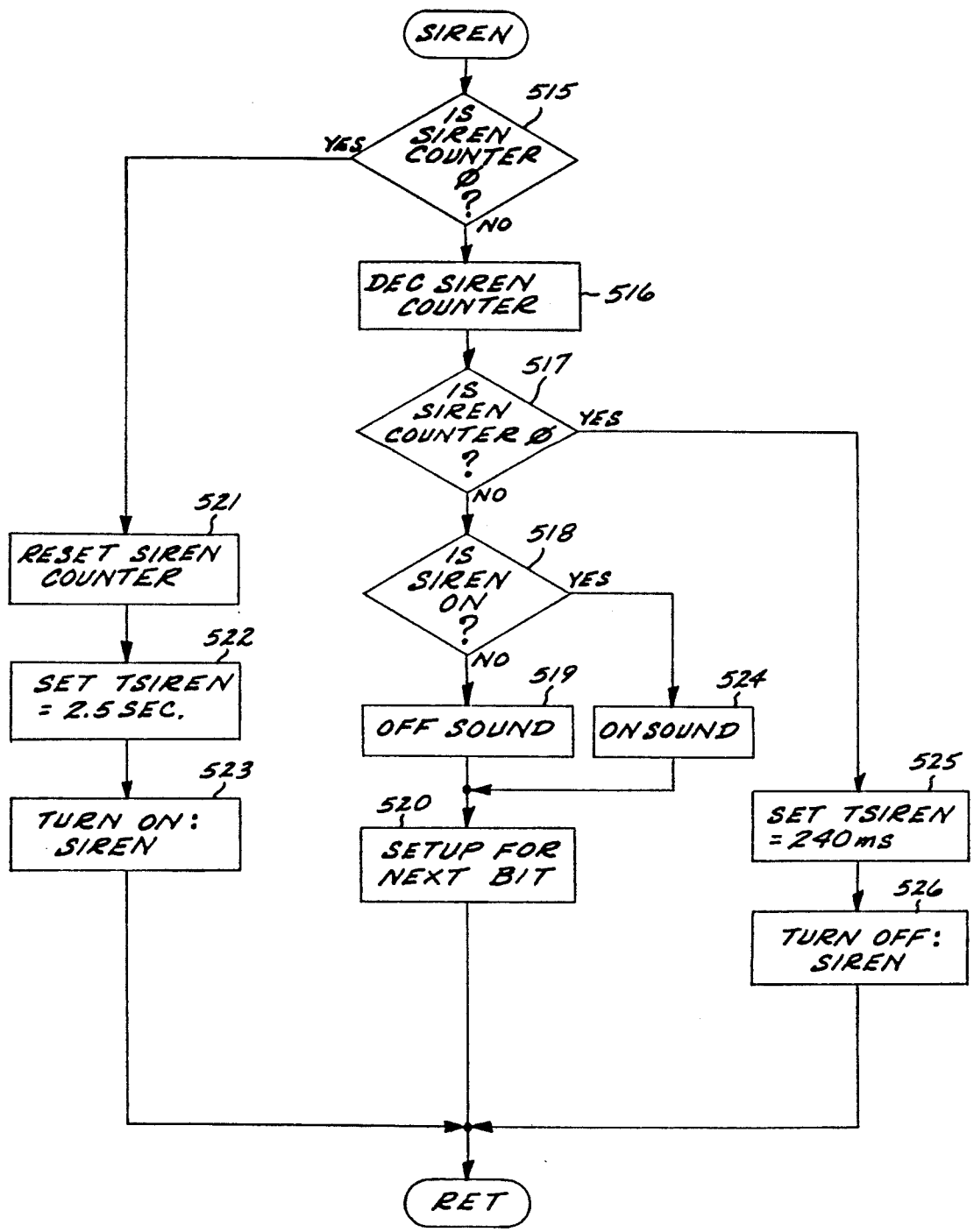
Figure 10C:
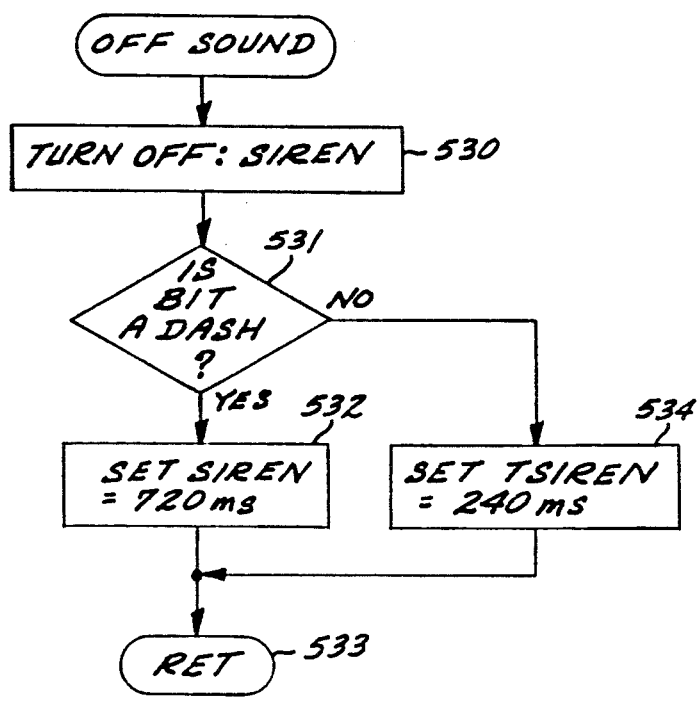
Figure 10D:
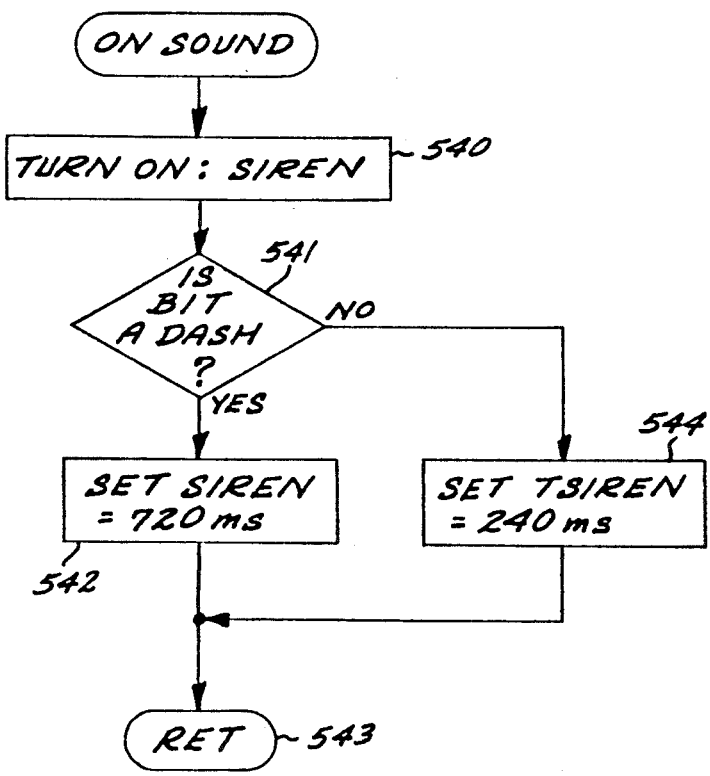

The first step 530 of the OFFSOUND routine (FIG. 10C) is to turn off the siren. The bit status of the programmed siren code is checked, and if it represents a dash, the TSIREN time variable is set to 720 milliseconds (step 532). Otherwise TSIREN is set to 240 milliseconds for a "dot." Operation then returns to step 520 (FIG. 10A).

The first step 540 of the ONSOUND routine (FIG. 10D) is to turn on the siren. The current siren code bit is checked, and if it represents a "dash," TSIREN is set to 720 milliseconds. Otherwise TSIREN is set to 240 milliseconds. Operation then returns (step 543) to step 520.

The SIREN subroutine therefore results in generation of the programmed personalized siren code at the appropriate time.

Figure 10E:
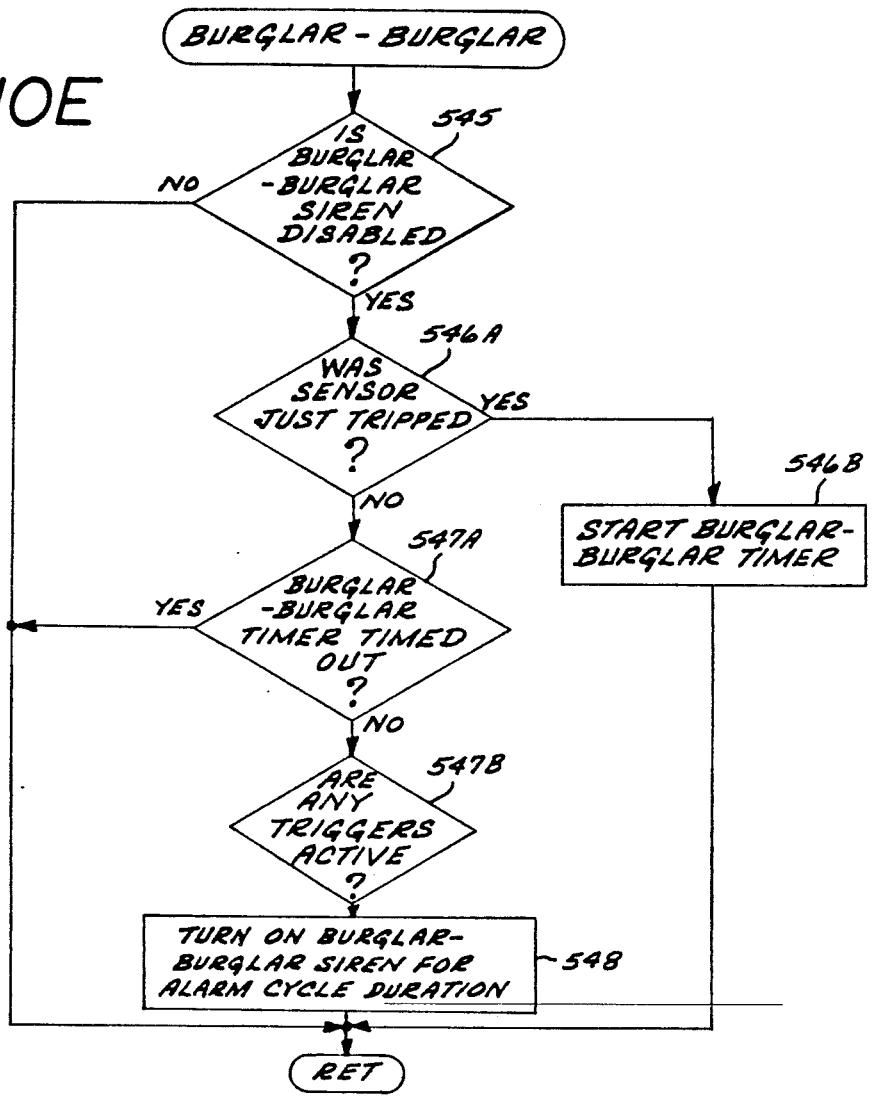

FIG. 10E shows the BURGLAR-BURGLAR subroutine 512B in further detail. If this feature is not enabled (during a programming mode), then operation immediately returns to the ALARM routine. If enabled, then a decision is made as to whether a sensor was just tripped (step 546A). If so, then the BURGLAR-BURGLAR timer is started (step 546B), and operation returns to the ALARM routine. In this embodiment, the timer has a duration of ninety seconds. If a sensor was not just tripped, then the timer is checked at step 547A, and if it has timed out to zero, operation returns to the ALARM subroutine. If the timer has not timed out, then at step 547B, the triggers are checked to determined if any trigger is active. If both conditions are true, then the BURGLAR-BURGLAR siren is turned on for the alarm cycle duration, and operation returns to the ALARM subroutine.

The foregoing operation of the ALARM routine results in the system activating a first alarm device (e.g., siren 92) the first time a sensor device (e.g., a vibration sensor) become active. This starts the BURGLAR-BURGLAR timer. If a trigger also becomes active within the timer interval, then the BURGLAR-BURGLAR alarm device 91 is activated for the alarm cycle duration. As described above, the alarm device 91 may comprise a voice synthesizer for synthesizing the voice message "BURGLAR-BURGLAR" which may be alternated with a siren noise during the alarm duration. Thus, the user is clearly warned by a distinctive alarm indication that the second alarm event is an actual intrusion attempt, and not just a vibration sensor being set off.

Figure 10F:
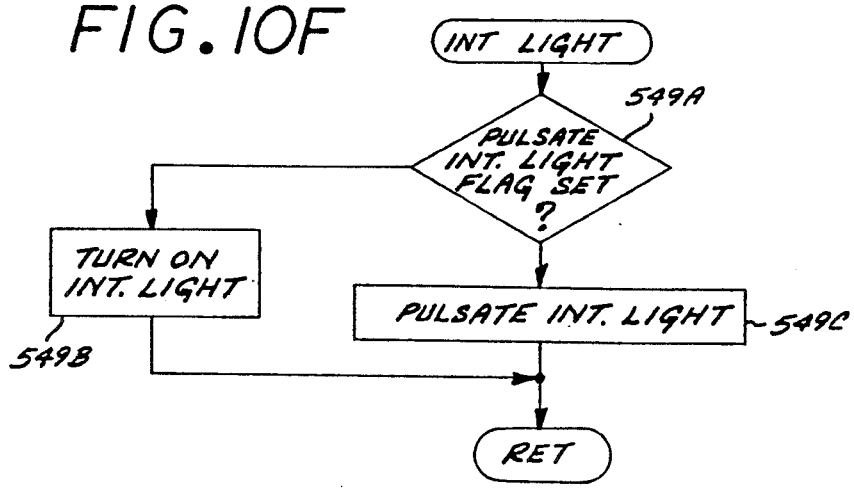

The INT LIGHT subroutine is illustrated in FIG. 10F. When this feature is enabled by the installer of the system in the vehicle, the PULSATE INT LIGHT flag is set. The status of this flag checked at step 549B, and if it is not set, indicating that the feature has not been enabled, the controller 70 turns the interior light on for the duration of the alarm cycle (step 549B). If the PULSATE INT LIGHT flag is set, then the controller 70 pulsates the interior light on and off during the alarm cycle (step 549C). The controller 70 performs this function by alternatively changing the state of the output line 223 (FIG. 3) between the active and inactive states.

The CONTROL module is described in further detail with respect to FIGS. 11A-11D. At step 550 (FIG. 12A) the decoder is tested to determine if it is in the active state (step 498 of FIG. 9B). If not in the active state, then there is no decoder activity for the CONTROL module to respond to, and the operation returns to the main loop. If the decoder is active, then if it was just activated since the prior pass through the main loop, the panic timer is started (2.5 seconds) at step 552, and at step 553 the ARMED flag is checked to determine whether the system is armed. If armed, the DISARM subroutine (FIG. 11B) is entered. Otherwise the ignition switch is checked for its status and if turned on, the control function is ended and operation returns to the main loop. If the ignition switch is not turned on, then the ARM subroutine (FIG. 11C) is entered. One function of the CONTROL module then is to perform active arming (subroutine 555) or disarming (subroutine 559) of the system in response to receipt of a proper transmitted code.

Upon completion of either the DISARM or ARM subroutines, the control function is ended, and operation returns to the main loop. If, at step 551, the decoder was not just deactivated, then at step 557 the panic timer status is checked, and if "0" the PANIC flag is set at step 1558. Operation then returns to the main loop.

Upon entry of the DISARM subroutine (FIG. 11B), if the tandem security mode has been selected (step 557), then the INSTANT flag is cleared (step 558), the tandem timer is reset (step 559), and operation returns. If the tandem security mode has not been selected, then at step 560 the ARMED flag is cleared. At step 561, the trigger and sensor flags are checked to determine whether any tampering has occurred during the ARMED mode. If none of these flags are set, then at step 562 the audible chirp counter is set to 1, and at step 565 the appropriate chirp(s) is sounded. If tampering is indicated, than at step 563 the chirp counter is set to 3, and at step 564, the point of intrusion indicated by the particular active flag or flags is loaded into the LED register for display by the LED control function (step 420 of FIG. 7). Thus, the system will sound a first predetermined audible message (here, one chirp) if no tampering was detected, and a second predetermined audible message (here, three chirps) if tampering was indicated. Further, the point of intrusion will be indicated by the LED flash code generated during the LED CONTROL function.

After sounding the appropriate number of chirps by the SOUND CHIRPS subroutine (FIG. 11C), which indicate audibly that tampering has or has not been detected, then at step 566 the vehicle power door system is activated to unlock the vehicle doors, the dome light is turned on (step 567) and operation returns to the main loop. Thus, upon disarming the system the vehicle doors are automatically unlocked, and the vehicle dome light is activated for a predetermined time interval or until the ignition switch is activated.

Figure 11C:
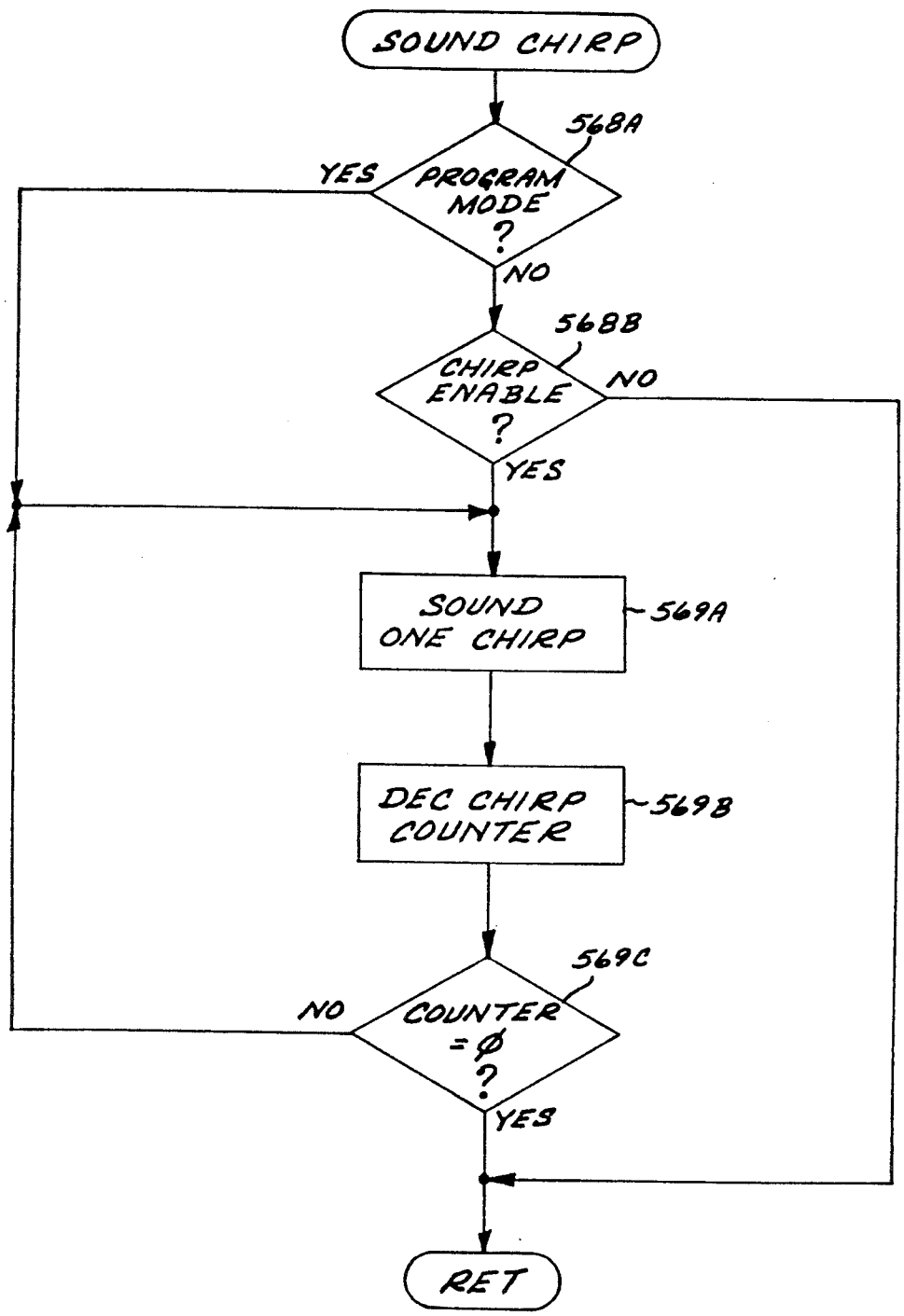
Figure 11D:
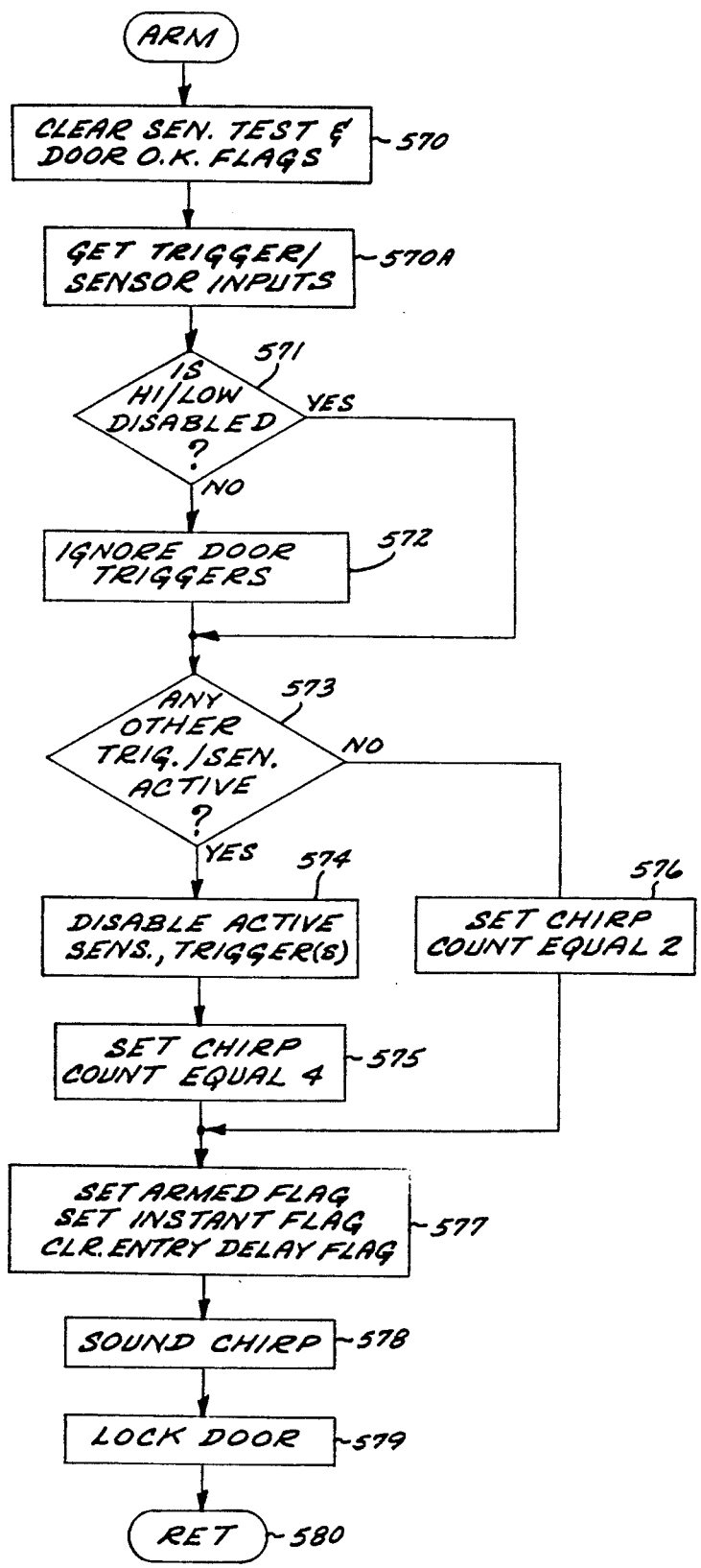

The SOUND CHIRPS subroutine is shown in FIG. 11C. If the system is determined to be in the PROGRAM mode (step 568A), then one chirp is sounded (step 569A), the chirp counter is decremented (step 569B) and the operation returns if the chirp counter state is zero, or otherwise loops back to step 569A. If the system is not in the PROGRAM mode, and if the CHIRP ENABLE flag is not set (step 568B), operation returns. If the flag is set, then operation proceeds to step 569A.

Upon entry of the ARM subroutine (FIG. 11D), at step 570, the SENSOR TEST and DOOR OK flags are cleared. At step 570A the controller 70 gets the trigger and sensor inputs, i.e., checks the various flags corresponding to these devices, and at step 571 determines whether the "HI/LO" feature has been disabled. If so, then operation branches to step 573. Otherwise, the status of the door trigger is ignored (step 572), and at step 573 the other trigger and sensor flags are checked to determine whether any of these other devices are active. If none are active, then at step 576, the chirp count is set to 2. Otherwise the active devices are disabled (step 574), to allow the system to be armed without the disabled sensor or trigger. This disabling takes place by storing the disabled sensor or trigger device identification, and thereafter ignoring the state of these identified devices each time the sensor and trigger lines are interrogated by the controller 70. At step 575 the chirp count is set to 4 indicating that a defective device has been bypassed. At step 577 the ARMED and INSTANT flags are set and the ENTRY DELAY flag is cleared. At step 578 the appropriate number of chirps is sounded, and at step 579 the door lock output line is activated to automatically lock the vehicle doors. Thus, the system automatically activates the door power locking system when the system is armed. Operation then returns to the main loop.

It will be appreciated that the purpose of the "HI/LO" feature is to allow the system to be actively armed even though the door trigger, which is assumed to be wired by the system installer to the vehicle interior light, is active. For vehicles with an interior courtesy light feature, wherein the light remains on for a predetermined interval after the door is closed, then the door trigger (node 201, FIG. 3) will remain active for some predetermined interval after the door is actually closed. Although the door triggers are initially ignored by the controller 70 (step 572) when the system is armed, the other triggers and sensors do provide some security protection immediately. And once the door trigger (interior light) state becomes inactive after the courtesy light interval expires, the system senses this condition, and the door trigger state is automatically no longer ignored by the controller 70 so that the security system will trigger an alarm based on unauthorized door entry.

The DISARMED module (step 416 of FIG. 7) is shown in more detail in FIGS. 12A-E. At step 581, the HOOD subroutine (FIG. 12B) is entered. At step 582, the ignition switch is checked. If it is activated, then the SENSOR TEST flag is cleared (step 582A), and at step 583, a test is performed to determine whether the ignition switch was activated since the last pass through the subroutine. If so, the door lock system will be activated to lock the doors (step 585) if the auto lock feature has been enabled during the program mode (step 584). If the ignition switch was not just turned on or the auto lock feature is not enabled, the door lock step is bypassed. At step 583, the PROGRAM QUALIFY subroutine is entered which begins a 10 second timer after the ignition switch is turned on, during which interval the ENTER PROG module (step 426 of FIG. 7) can be entered by toggling the "valet" switch 77. At step 587 the EXIT DELAY flag is cleared, ending the exit delay during which the user is provided the opportunity to exit the vehicle without activating the alarm. Operation then returns to the main loop.

If the ignition switch was not on at step 582, a test is performed to determine whether the ignition switch was just turned off (step 588A). If so, then the doors will be unlocked (step 588C) if the auto lock feature is enabled. The valet flag is checked at step 588, and if set, the operation proceeds to step 587 to clear the EXIT DELAY flag. Otherwise, the SENSOR TEST flag is checked (step 589A) and if it was set during the installer program mode as described below, the status of each of the system sensors is checked. If none are active, the EXIT DELAY flag is cleared (step 589D), and operation returns to the main loop. If any sensor is active, the system sounds an appropriate number of audible chirps to identify the active sensor at step 589C. For example, assume the system comprises a vibration sensor and a glass breakage sensor, whose outputs are respectively connected to nodes 202 and 203 (FIG. 3) for interrogation by the controller 70. If only the vibration sensor is active, one chirp is sounded. If only the glass breakage sensor is active, two chirps are sounded. If both sensors are active, three chirps are sounded. The sensor test feature provides the intaller the opportunity to test the installed system sensors after the system is installed, without putting the system in an armed mode and setting off the alarm siren device during the sensor testing for the alarm cycle duration. As a result, noise pollution is avoided. To use the feature, the SENSOR TEST flag is set by the installer enabling the feature during the installer program mode, as described in connection with the programming mode. Upon exiting the program mode, the system will loop through the functions of the main loop (FIG. 7), and will enter the DISARMED function (FIG. 12A). If the SENSOR TEST flag has not been cleared by arming the system with the remote transmitter (FIG. 11D) or by turning on the ignition (steps 582, 582A), the steps 589A-D will be repetitively performed as the system cycles through the main loop. The passive arming routine (step 596) will be bypassed. Thus, the installer may test the sensor operation by kicking the vehicle tires, tapping on the vehicle glass, and the like to attempt to activate the sensors. If the sensors do not activate, a problem is indicated. This sensor test mode is exited by actively arming the system or by turning on the vehicle ignition.

The passive arming flag is checked at step 590, and if this feature is disabled, operation proceeds to step 587. If the passive arming feature is not disabled, then at step 592 the RECORD subroutine is called. At step 594, the door triggers are tested to determine whether a door has been opened and closed. If not, then the determination is made (step 595) as to whether the ignition switch has been turned on since the system was disarmed. If it has, then the PASSIVE routine (596) is bypassed, this indicating that passive arming of the system should not occur. At step 598, the UPDATE subroutine is called.

Figure 12B:
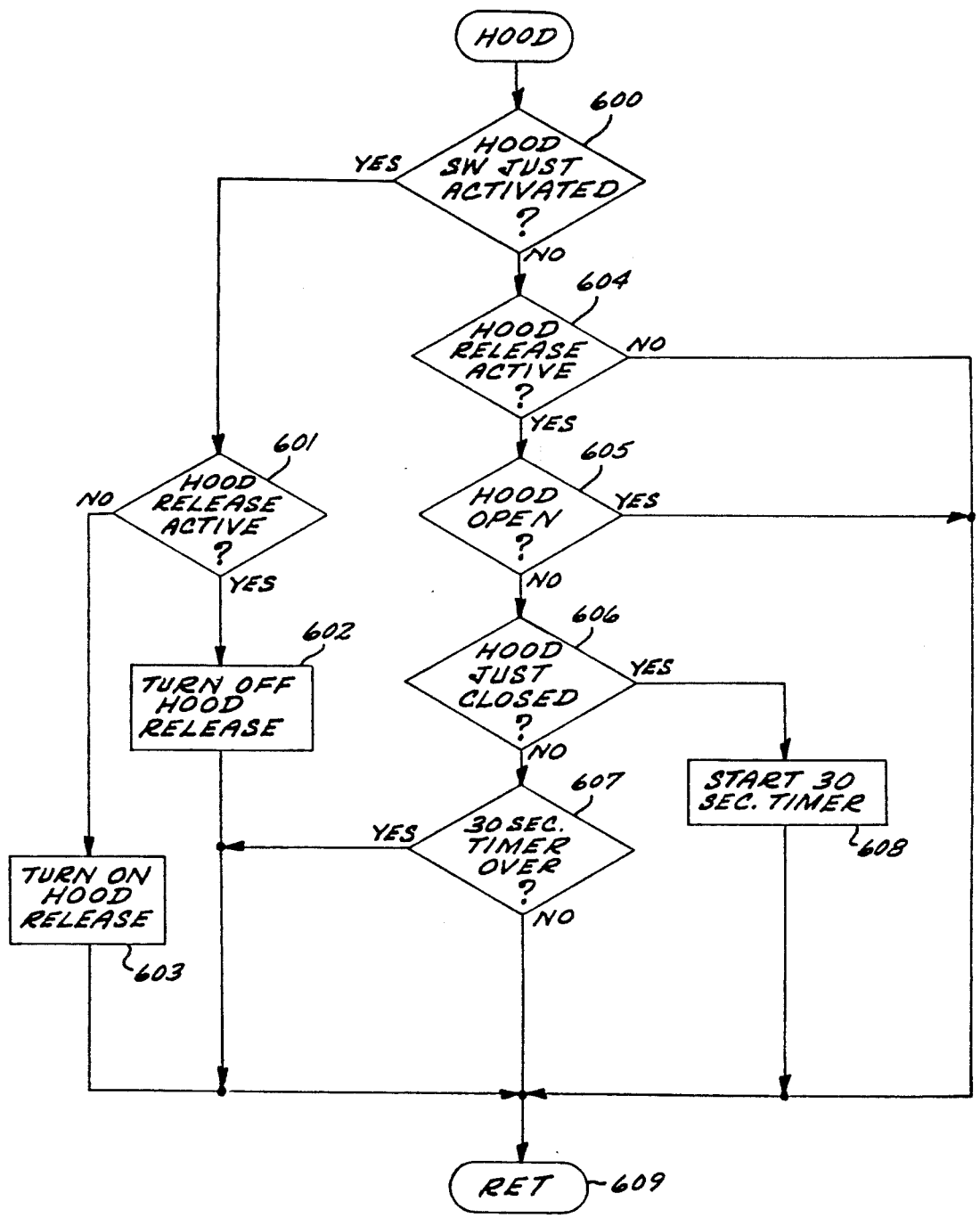

The HOOD subroutine is shown in FIG. 12B. At step 600, the status of the "hood" program switch (one of switches 77) is interrogated to determine whether the hood switch was just activated since the last pass through the subroutine. If yes, then the status of the hood release controlled device 96 is checked to see whether it is active (step 601). If active, it is turned off (step 602); if not active, the hood release device is turned on (step 603). Operation then returns. If the hood switch was not just activated (step 600), operation returns via step 604 if the hood release device is not active. If the hood release is active (step 604), the hood sensor is checked (step 605), and if open, operation returns. If not open, the determination is made at step 606 if the hood was closed since the last pass through the subroutine. If it was, a 30-second timer is started, and operation returns. If not, then at step 607, the 30-second timer is checked to determine whether it has timed out. If it is timed out, the hood release device is turned off, locking the hood, and operation then returns to step 582.

Figure 12C:
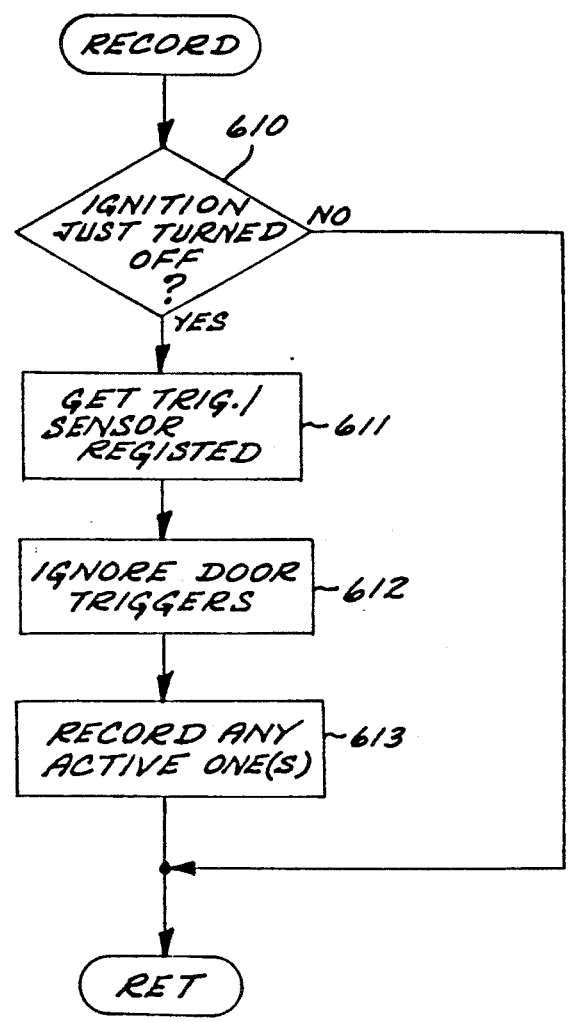
Figure 12D:
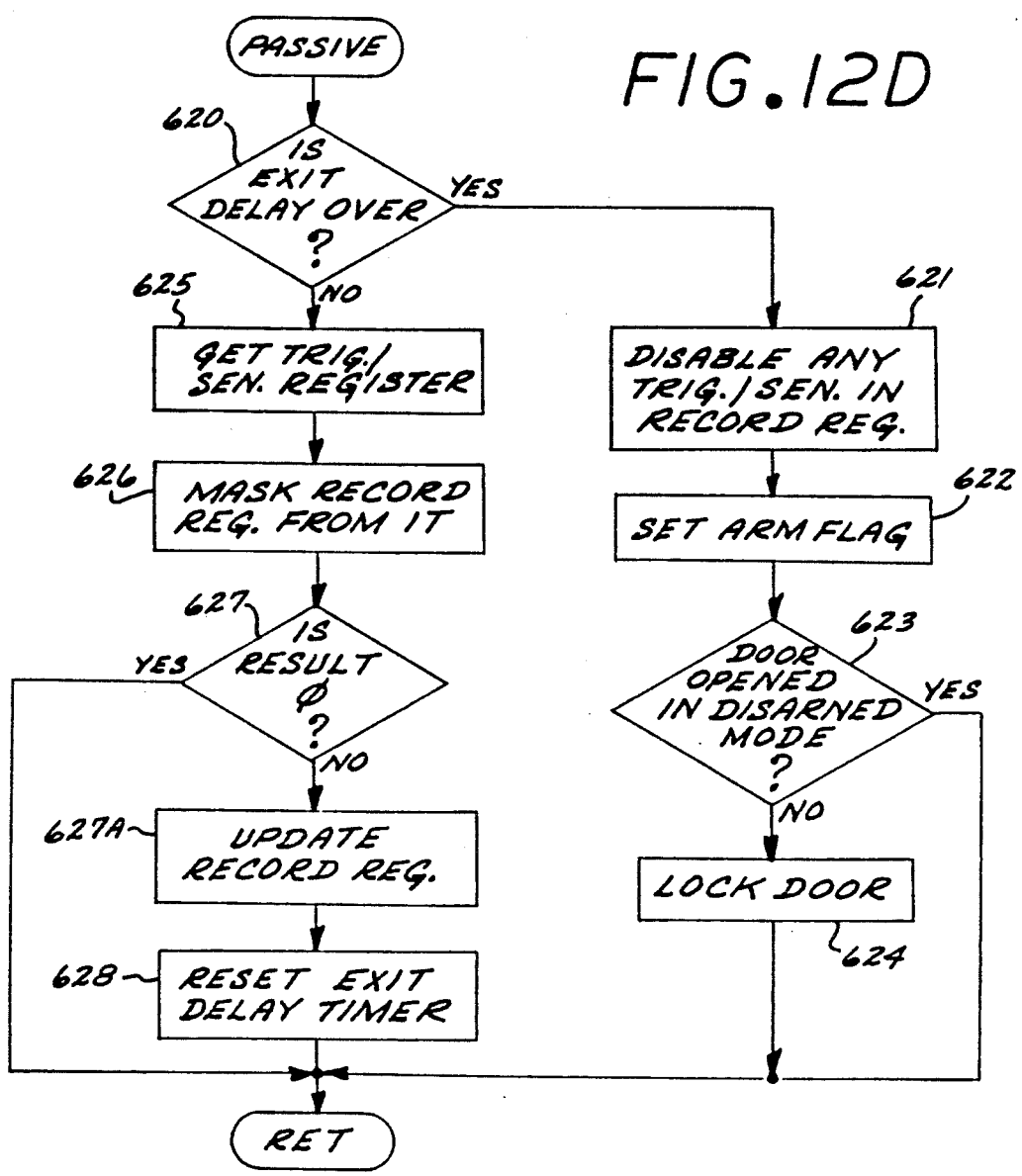

The RECORD subroutine is shown in FIG. 12C. The purpose of this routine is to record in the trigger/sensor register comprising the controller 70 any active triggers or sensors. Thus, at step 610, the ignition switch is checked to determine whether it was turned off since the last pass through the subroutine. If not, then operation returns. If the ignition switch was just turned off, the contents of the trigger/sensor register maintained by the controller are accessed (step 611), and the door triggers are ignored at step 612. Then any active sensor or triggers, excepting the door triggers, are recorded in the register (step 613). Operation then returns to step 594.

In the PASSIVE subroutine (FIG. 12D), the system is passively armed, if the conditions are appropriate. The exit delay timer is checked at step 620 to determine whether the exit delay is over. If it is, then at step 621, any triggers or sensors recorded in the trigger/sensor register as being active (step 613) are disabled, and at step 622 the ARM flag is set. A determination is made (step 623) as to whether the door was opened during the disarmed mode. If so, operation returns to the main loop. If not, the door lock device 94 is activated to lock the doors (step 624). If the exit delay is not over (step 620), then at step 625 the contents of the trigger/sensor register are fetched, and at step 626 the contents of the "record" register, i.e., those active triggers and sensors recorded at step 612 (FIG. 12C), are masked from the trigger/sensor register contents. If the result is a blank register, this indicates that there has been no change in the status of the triggers and sensors. If the result is not zero, a change has occurred in the status of the triggers/sensors. The record register is updated (step 627A) to remove the trigger or sensor which is no longer active, so that that device is no longer disabled. The exit delay timer is then reset before returning (step 628).

Figure 12E:
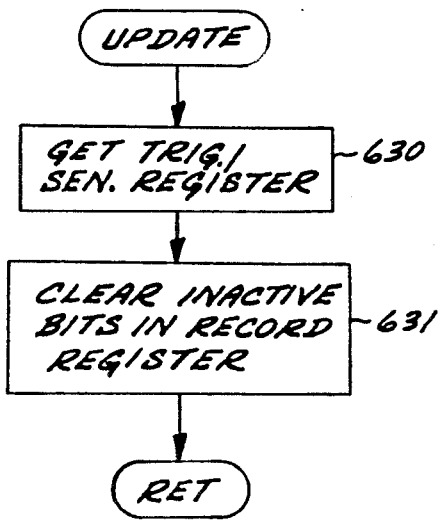

The UPDATE subroutine is illustrated in FIG. 12E. The purpose of this subroutine is to clear any bit in the record register that is inactive as illustrated in steps 630 and 631 in FIG. 12E.

The ARMED function 414 (FIG. 7) is illustrated in FIGS. 13A–F. The first step 640 (FIG. 13A) of this function is to determine the status of the triggers and sensors. At step 642, any sensors or triggers previously identified as disabled are masked out. The next steps 643–46 are to execute the subroutines DOOR, ENTRY, SENSOR and OTHER TRIGS which are shown in FIGS. 13B–E, so as to determine which active trigger or sensor elements should result in activating the alarm controlled elements. At step 646A, the FACT subroutine (FIG. 13G) is called. At step 647, the TRIPPED flag is checked, and if set, the SHUT OFF subroutine (FIG. 13F) is executed. Otherwise, the trip counter is reset (step 649) to 10. The purpose of the trip counter is to prevent alarms from continuing after ten successive passes due to the same trigger or sensor being active. This prevents noise pollution and conserves the vehicle battery by limiting the alarm sounding due to a particular sensor or trigger to a predetermined cumulative activation interval equal to a given number of alarm cycles before the system is disarmed and rearmed. Operation then returns to the main loop.

Figure 13A:
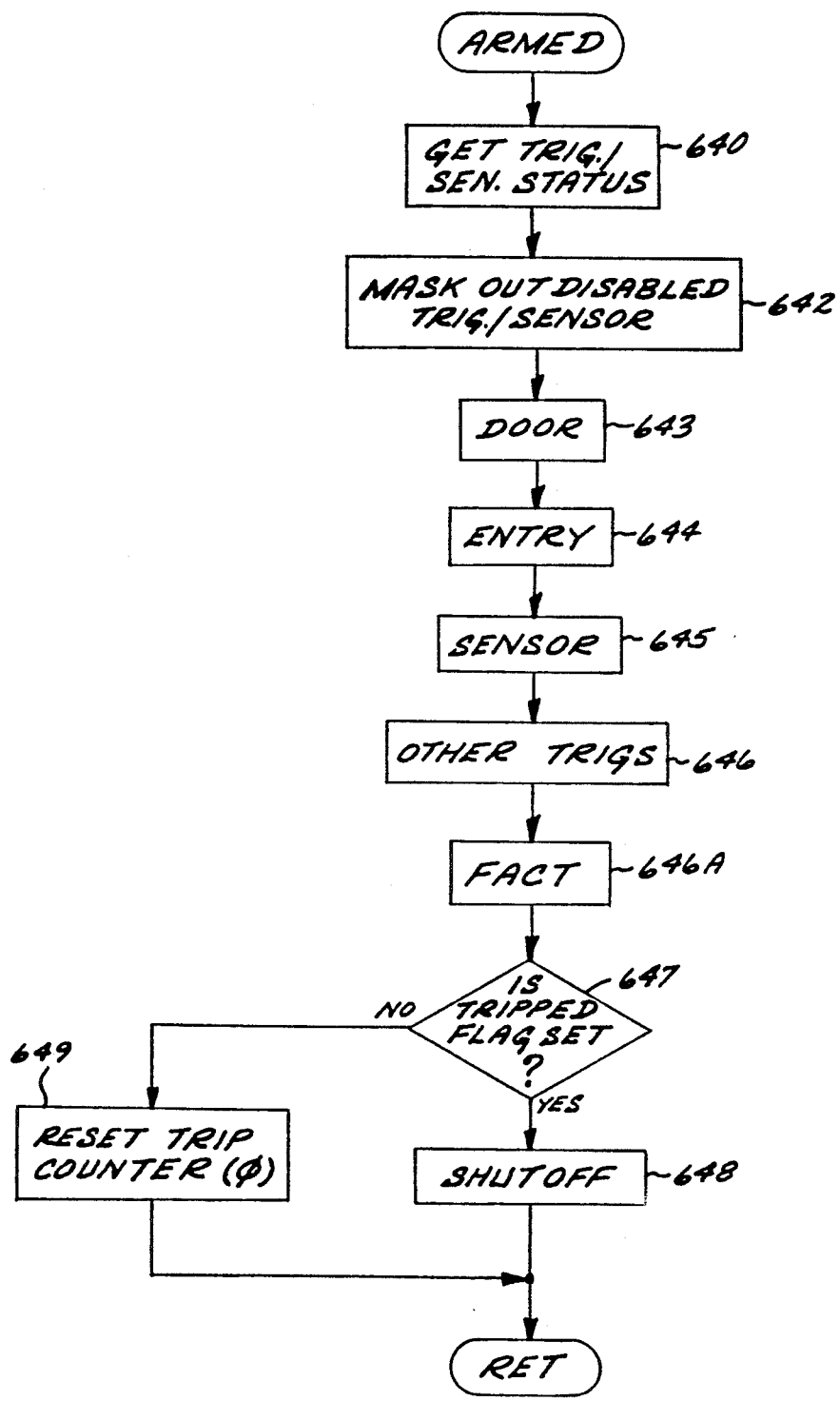
Figure 13B:
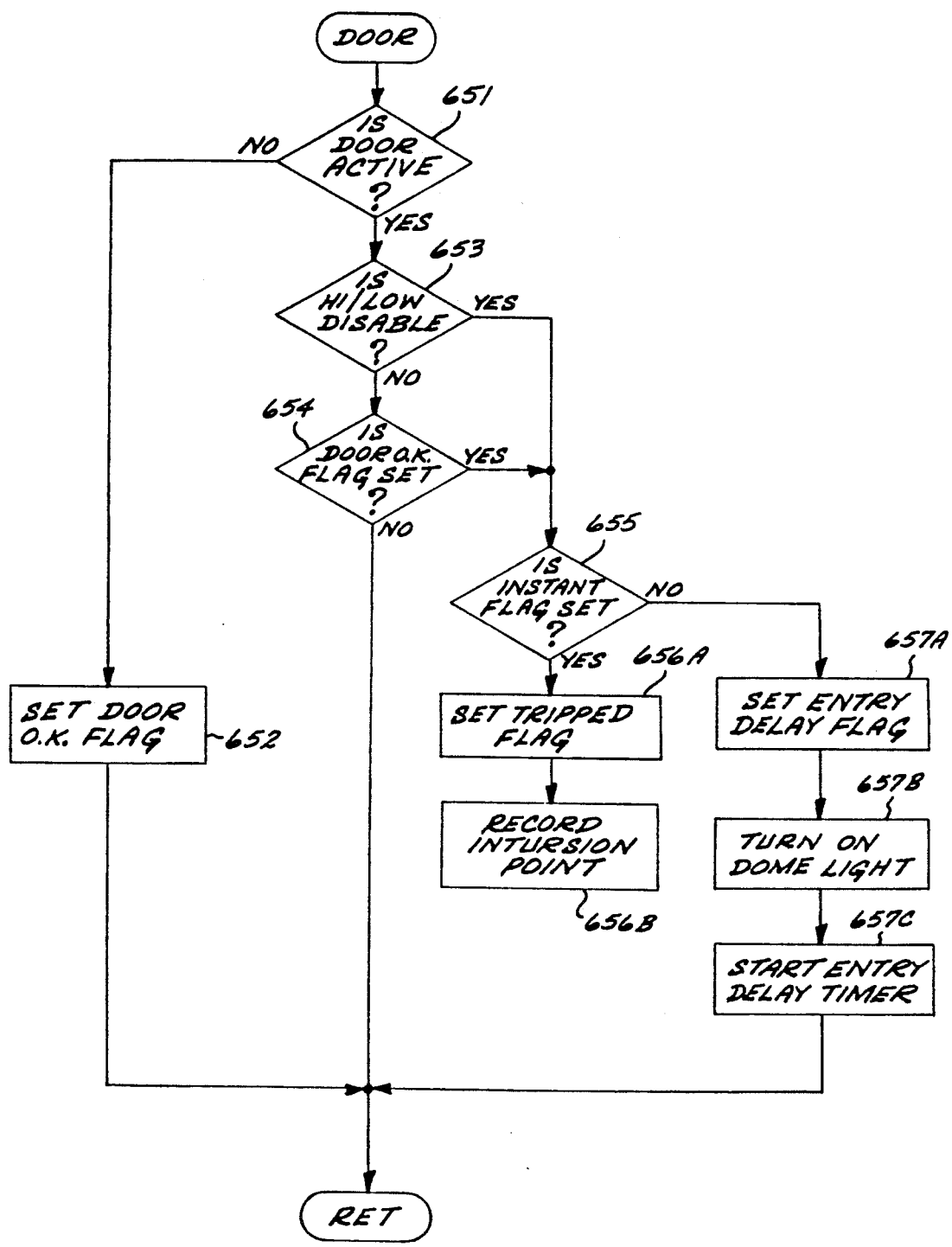

Referring now to FIG. 13B, the DOOR subroutine is depicted. The door triggers are checked at step 651, and if not active (i.e., the doors are closed), then the DOOR OK flag is set (step 652) and operation proceeds to the ENTRY subroutine. If a door trigger is active, then if the "HI/LO" feature described above is not disabled (step 653), the DOOR OK flag is checked. If this flag is not set, operation proceeds to the ENTRY subroutine and the open door condition does not result in an alarm condition. If the "HI/LO" feature is disabled, or if the DOOR OK flag is set, then the INSTANT flag is checked (step 655), and if set, the door trigger active status is interpreted as an alarm condition, the TRIP flag is set (step 656A) and the intrusion point is recorded (step 656B) before proceeding to the ENTRY subroutine. If the INSTANT flag is not set, then at step 657A, the ENTRY DELAY flag is set, the dome light is turned on at step 657B, and the entry delay timer is started at step 657C. Thus, if the door trigger line is wired to the interior light and the vehicle has a courtesy light delay feature, the HI/LO feature of the system will not act on an active door trigger to declare an alarm event until after the door trigger becomes inactive (step 651) and the DOOR OK flag is set. The system provides full intrusion protection as soon as the door trigger becomes inactive, in contrast to conventional systems having a fixed predetermined time delay during which the status of the door trigger is ignored for purposes of declaring an alarm event.

Figure 13C:
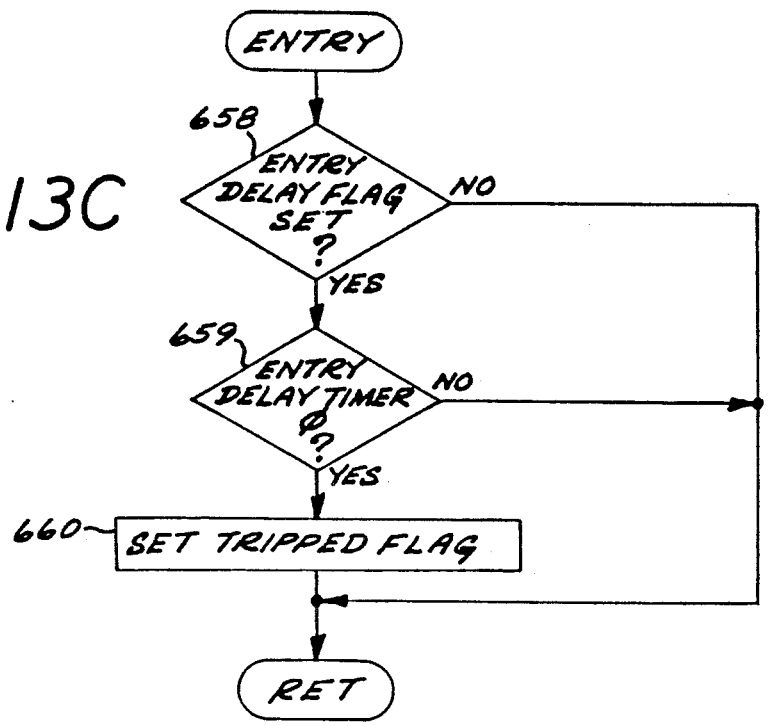
Figure 13D:
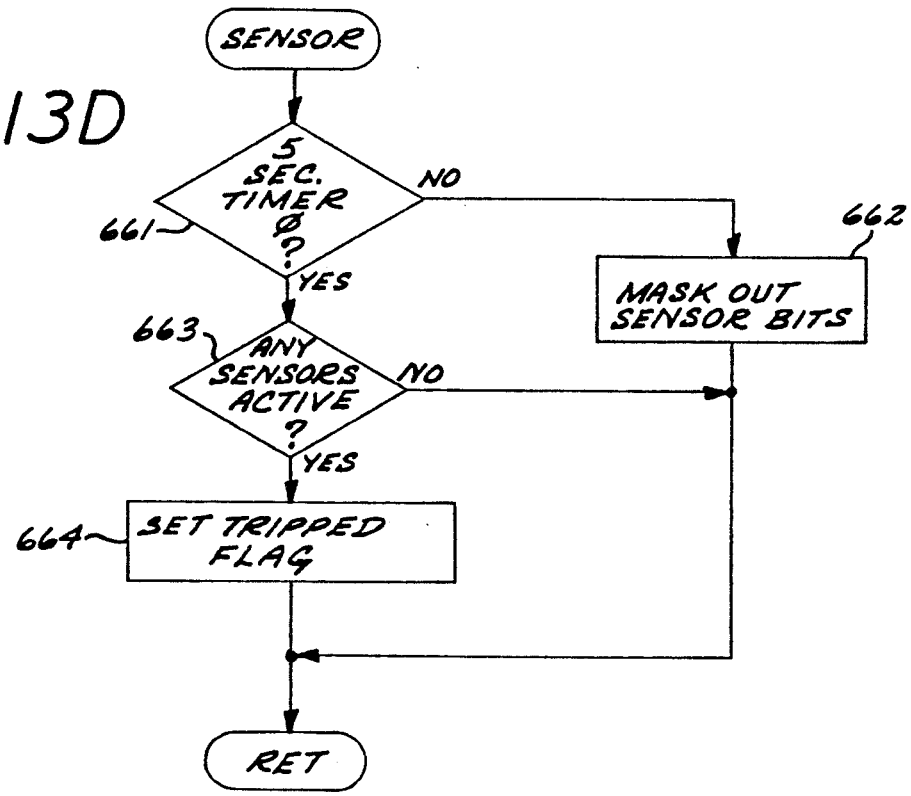

The ENTRY subroutine is shown in FIG. 13C. The ENTRY DELAY flag is checked (step 658), and if not set, operation proceeds to the SENSOR subroutine. If the flag is set and if the entry delay timer state is "0." then the TRIPPED flag will be set. Operation otherwise proceeds to the SENSOR subroutine.

Figure 13E:
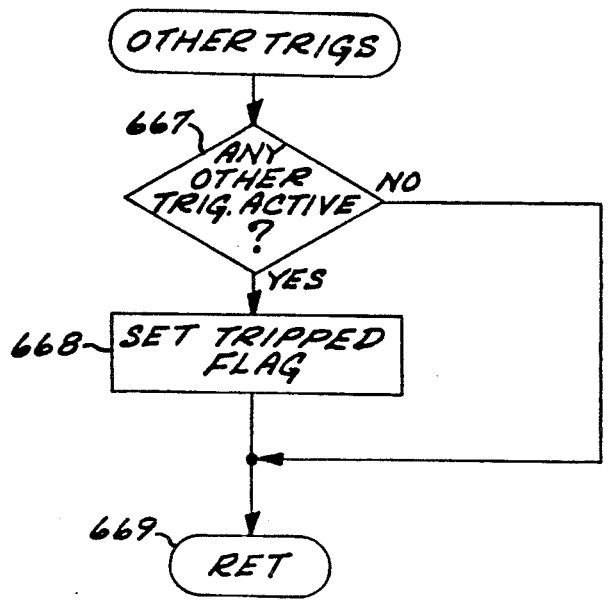
Figure 13F:
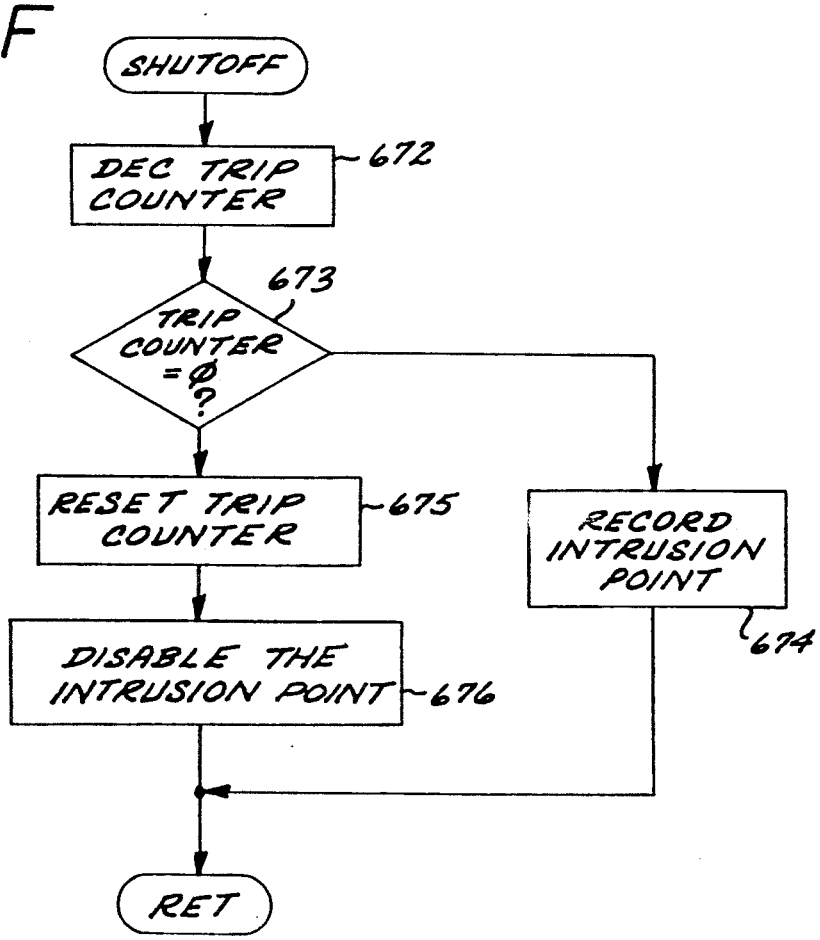

The first step 661 of the SENSOR subroutine (FIG. 13D) is to check the five-second timer initiated when the system was armed. If the timer has not timed out, the sensor lines or bits are masked out (step 662) and operation proceeds to the OTHER TRIGS subroutine (FIG. 13E). If the timer has reached zero, then the sensor lines are checked (step 663), and if none are active, operation proceeds to the OTHER TRIGS subroutine. If a sensor is active, the TRIPPED flag is set (step 664), and operation proceeds to the OTHER TRIGS subroutine.

In the OTHER TRIGS subroutine (FIG. 13D), the triggers other than the door triggers are checked. If none are active, operation proceeds to step 647 (FIG. 13A). If any other triggers are active, the TRIPPED flag is set at step 668, and operation proceeds to step 647.

The SHUTOFF subroutine (FIG. 13F) is entered if the TRIPPED flag has been set. Here, the trip counter is decremented (step 672) and if its state is not zero, the intrusion point is recorded (step 674), and operation returns to the main loop. If the trip counter has reached zero, it is reset (step 675), the intrusion point trigger or sensor is disabled, and operation returns to the main loop. Thus, once the trip counter reaches its zero state, an alarm will not be generated as a result of the active trigger or sensor device on the next pass through the main loop.

Figure 13G:
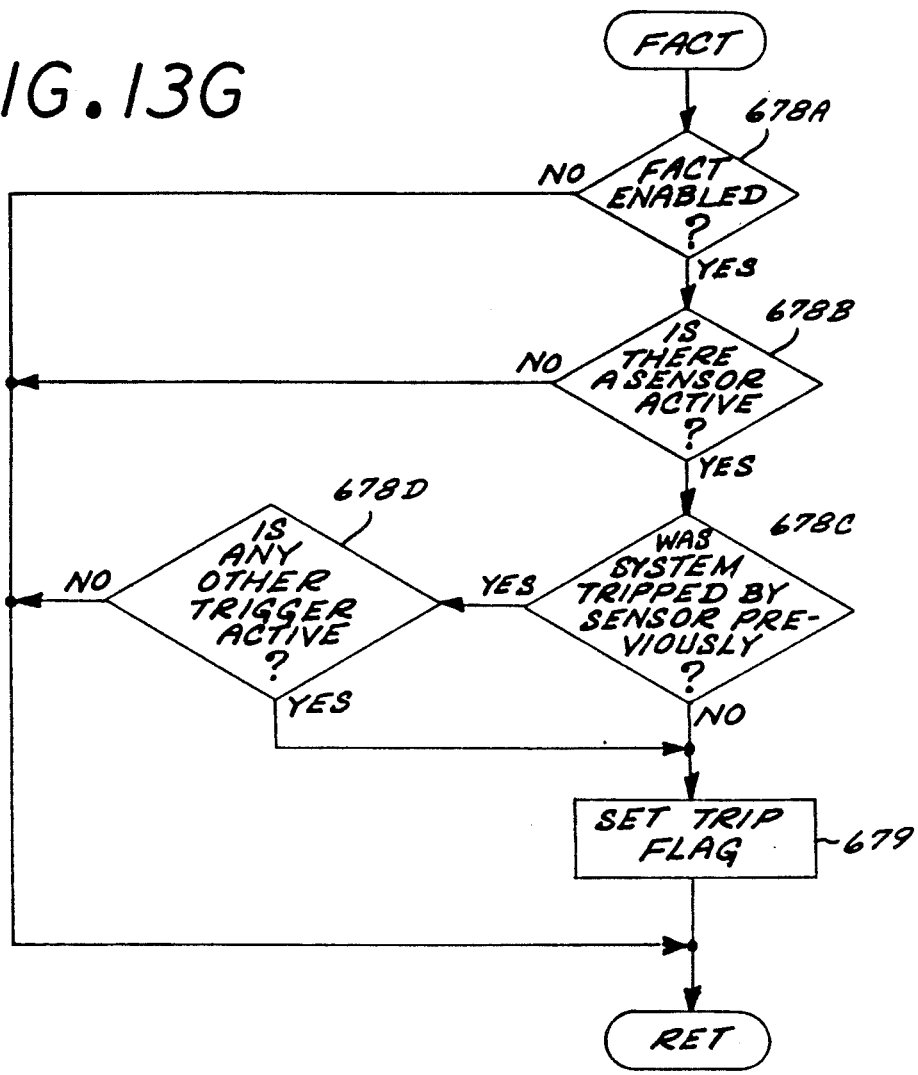

FIG. 13G shows the FACT (false alarm control and test) subroutine, whose function is to minimize false alarms due to repetitive sensor triggering. The first time a sensor is triggered, an alarm condition will be declared without regard to the status of the trigger devices. But, if the FACT feature is enabled, once a sensor has tripped an alarm (i.e., since the system was armed), then subsequently (until the system is disarmed), an active sensor condition will cause an alarm only if another trigger is also active. Thus, if at step 678A, the FACT feature has not been enabled, operation immediately returns, with the result that a sensor active signal will trip an alarm. If FACT is enabled, then the sensors are checked to find any active sensors (step 678B). If none are active, operation immediately returns. If a sensor is active, and if the system has not previously been tripped by this sensor (step 678C), the TRIP flag is set (step 679) and operation returns. If the system has previously been tripped, operation will return without setting the trip flag unless another trigger is active (step 678D).

Figure 14A:
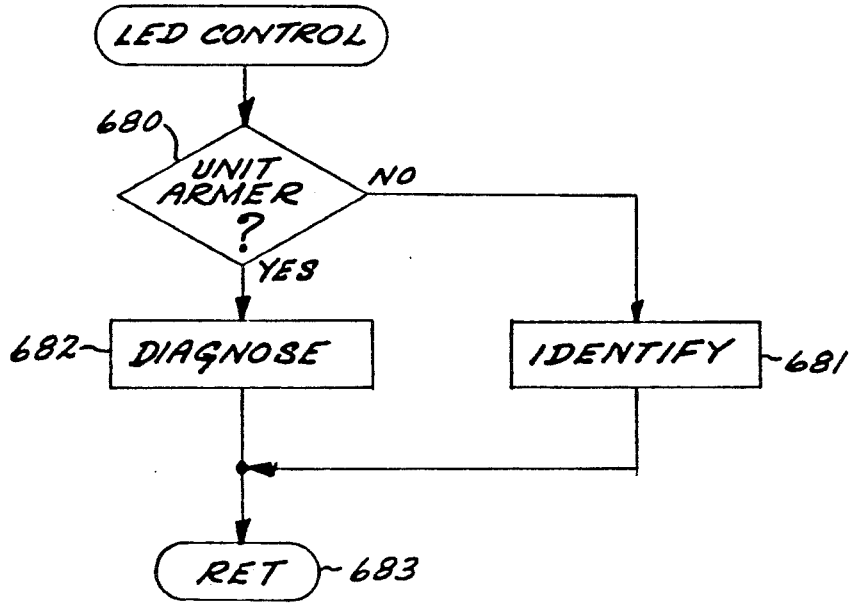
Figure 14B:
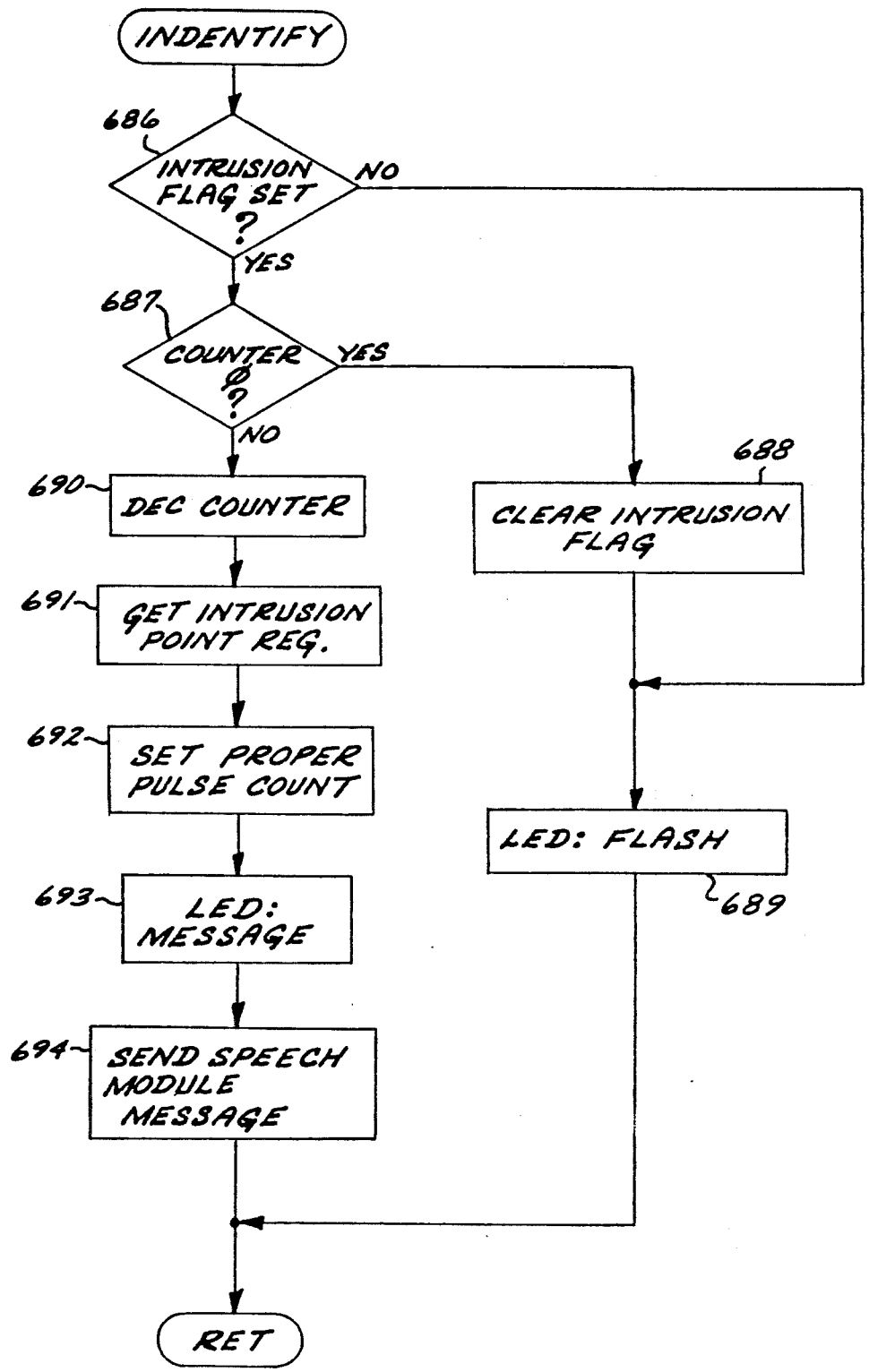
Figure 14C:
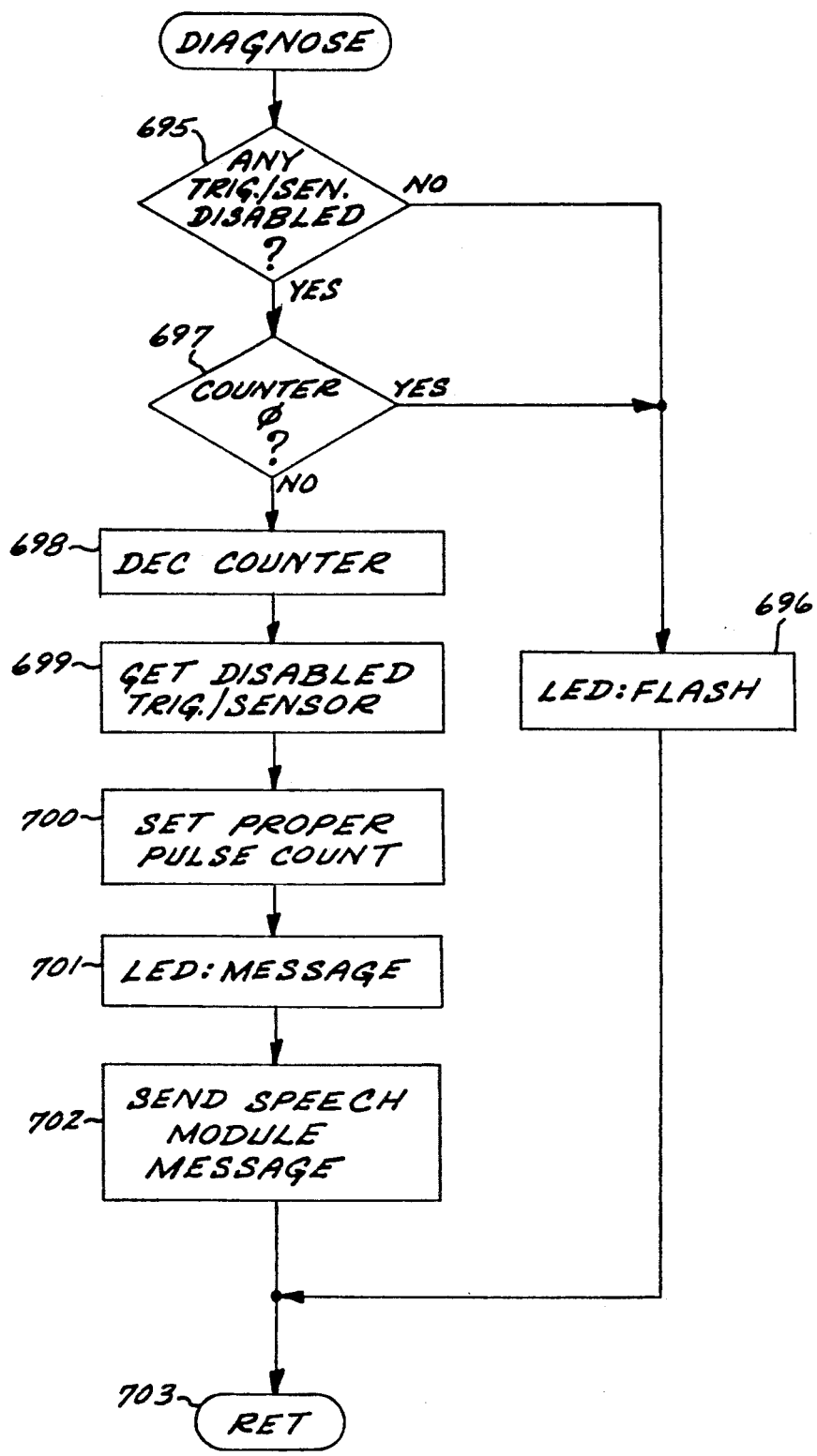

The LED CONTROL function (step 420 of FIG. 7) is shown in further detail in FIGS. 14A-C. At step 680 (FIG. 14A), the ARMED flag is checked to determine whether the system is in the armed mode. If not armed, the IDENTIFY subroutine is entered at step 681. Otherwise, the DIAGNOSE subroutine is entered at step 682 and thereafter operation returns to the main loop.

The IDENTIFY subroutine is shown in FIG. 14B. At step 686, the controller determines whether an intrusion was attempted while the system was armed. If not, then the green LED is flashed (step 689) and operation returns to the main loop. If an intrusion was attempted, then at step 687, the message counter is checked, and if zero, the INTRUSION flag is cleared (step 689), the green LED is flashed, and operation returns to the main loop. If the counter is not zero, then is is decremented (step 690). At step 691 the point of intrusion is established by reading the flags associated with the activated triggers and sensors stored in the register. The proper LED pulse count corresponding to the intrusion point is set (step 692), and at step 693, the appropriate LEDs are turned on. At step 694 the voice synthesizer is activated to announce audibly the intrusion point. It will be appreciated that the voice synthesizer is programmed to provide a plurality of messages, and that a particular message may be chosen and activated in correspondence to a particular control signal from the controller 70. Such a selection may be accomplished by a look-up table function, as where a particular intrusion point code selects the appropriate message. Voice synthesizers are known in the art having the capability of generating a selected one of a plurality of stored messages. Operation then returns to the main loop.

The DIAGNOSE subroutine is shown in FIG. 14C. At step 695, the controller determines whether there is a disabled trigger or sensor. If not, at step 696, a red LED is flashed, and operation then returns to the main loop. If a sensor or trigger is disabled, then the message counter is checked (step 697), and if "0," the LED is flashed, and operation returns to zero. Otherwise, the counter is decremented (step 698), the data defining the disabled trigger or sensor is obtained (step 699), the proper pulse counter corresponding to the particular disabled sensor or trigger is set (step 700), and visible and audible messages identifying the disabled element are generated at steps 701 and 702 by the LED and voice synthesizer.

Conventional security systems may be provided with particular features that may be enabled or disabled for a particular vehicle installation. However, this enabling-/disabling is conventionally performed by the system installer, by cutting wires, grounding pins, and the like. The system user has no ready means of reconfiguring the feature selection after the system is installed.

In accordance with another aspect of the invention, a programming means is provided for enabling or disabling particular system features which does not require the use of any tools and which may be used by the system user.

FIGS. 19A-L of the referenced U.S. Pat. No. 4,887,064, disclose one technique for selecting programming options when in the program mode. Reference is made to these figures and the description thereof in the pending patent application for further details regarding the specific functions which are programmed. As described there, the program switch is monitored to select a desired programming function by toggling the switch a predetermined number of times to select a particular function for programming data. When there are many possible programming options, and the data input device available to the user is a three position switch comprising the "program" and "valet" positions or switches, such a procedure can be inconvenient to the user. In accordance with the invention, the user-programmable functions are grouped in several possible branches, and the user first selects a desired branch and then a desired function within the branch. This simplifies the selection of a desired function to be programmed. Further, certain programmable functions are grouped which are to be programmed only by the system installer, and not by the user, are grouped in a separate branch which is accessed by a different programming technique than the user-programmable functions.

Figure 15A:
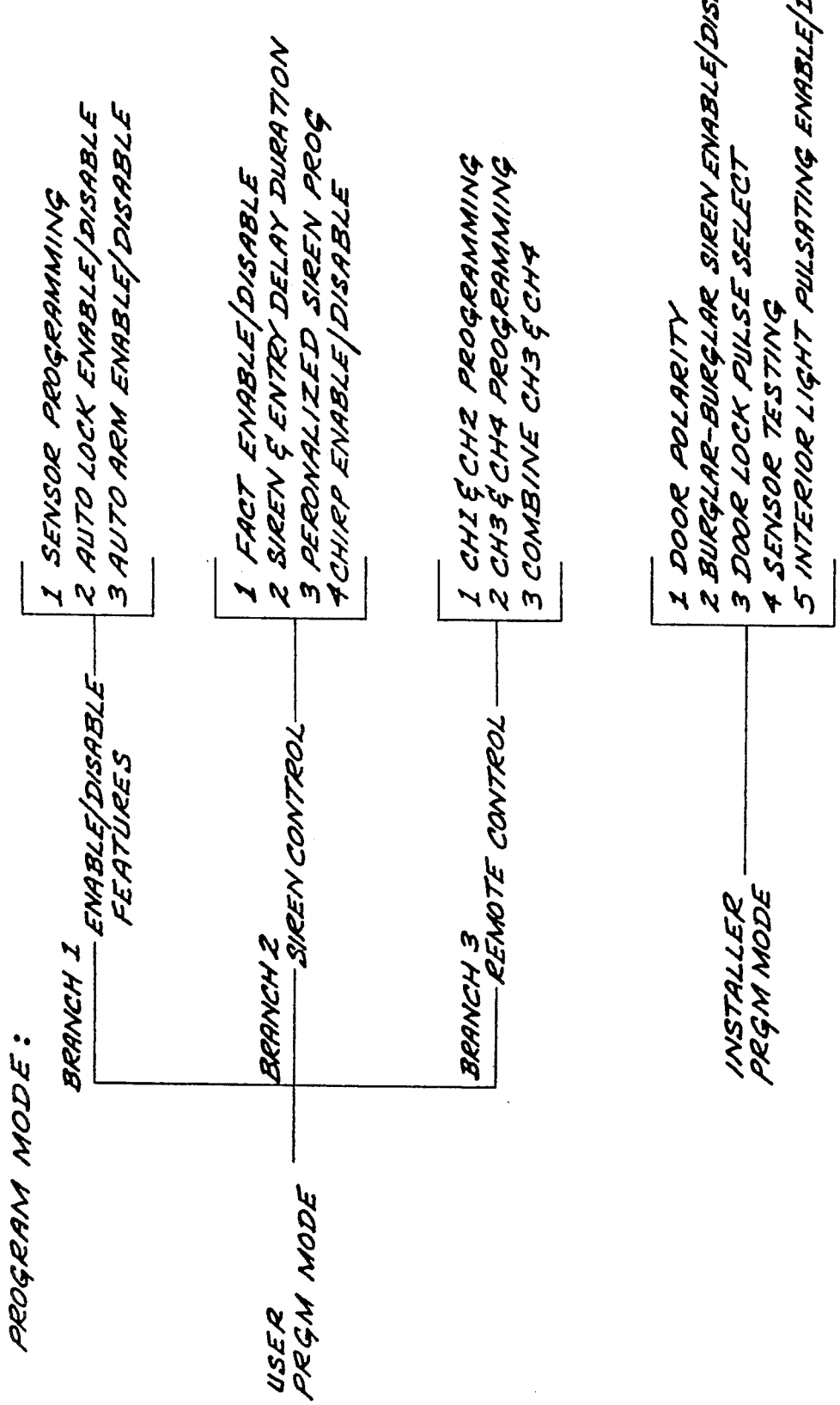
Figure 15B:
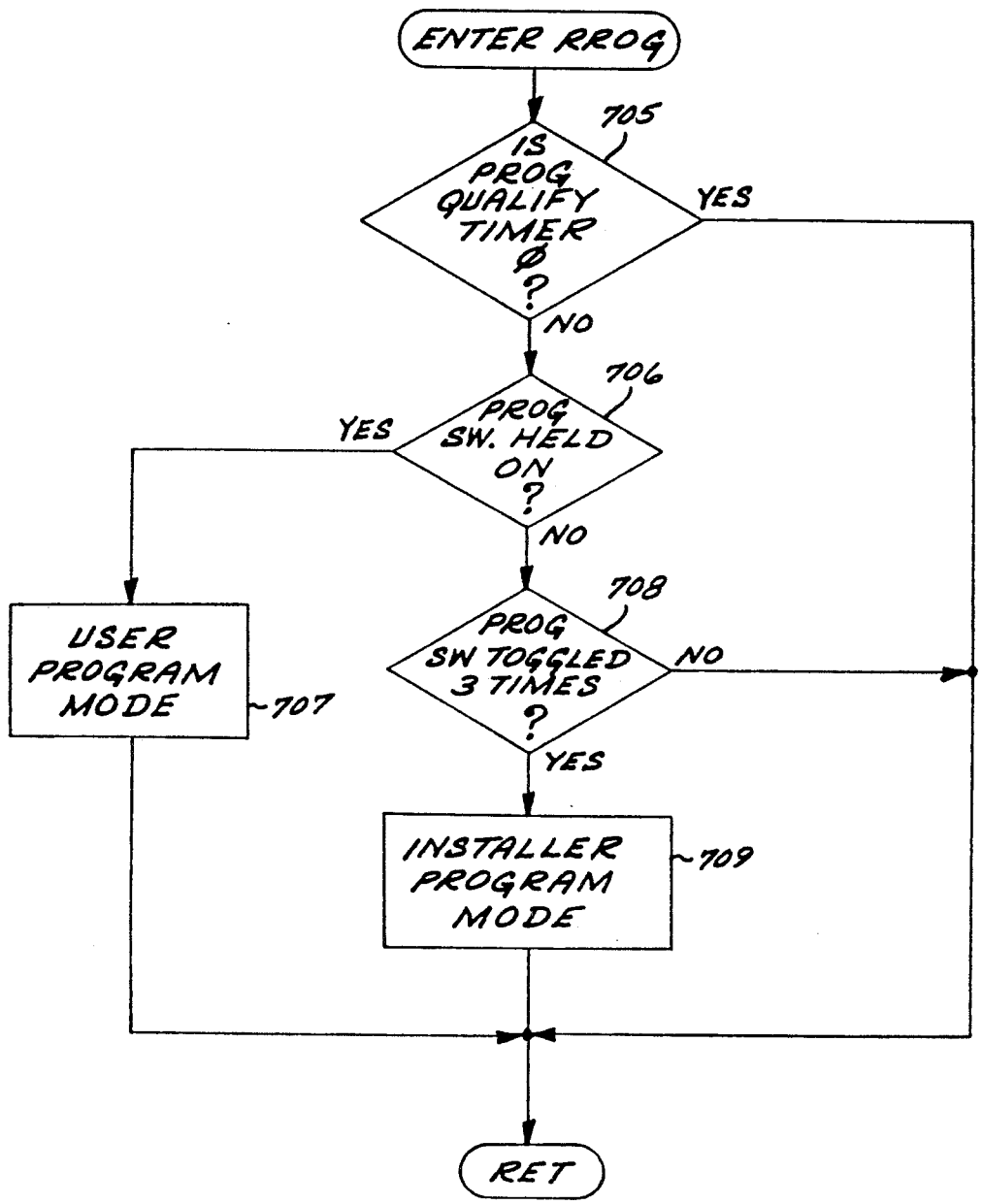

FIG. 15A is a graphical depiction of the three program branches in the user program mode and the single branch in the installer program mode, for this embodiment. The particular number of branches and the number of programmable functions grouped in each branch will, of course, depend on the particular system implementation. The user program mode includes the branch for programming the "enable/disable" features, the branch for programming the siren control features, and the branch for programming the remote control features. The first branch includes here three possible features, the sensor programming function, the automatic lock enable/disable, and the passive arming enable/disable. The siren control branch includes four possible functions, the FACT enable/disable, the siren and entry delay duration selection, the personalized siren programming and the chirp enable/disable functions. The remote control branch includes three remote control programmable functions.

The installer program mode branch includes five functions, programmable door trigger polarity, the BURGLAR-BURGLAR feature enable/disable and the door lock control signal duration feature, the sensor test feature and the interior light pulsation feature.

Both the user and installer programming mode are entered using the same three-position switch, which has an off position, a latched-on position (the valet switch or position) and a momentary-on, spring-loaded-toward-the-off position (the program switch or position). However, the user mode is entered by, within ten seconds of turning the ignition switch on, holding the program switch on until a chirp is heard. A branch must be selected within one minute, by toggling the program switch once, twice or three times, to select the first second or third programming function in this branch as desired, and then toggling the valet switch to the on position and then off to enter this data. The system will sound the same number of long chirps as the number of the function selected in this manner. Then once a branch has been selected, a particular function within the selected branch must be selected within one minute by the same procedure, i.e., by toggling the position switch the same number of times as the preset reference number associated with the desired function, and entering this data by toggling the valet switch. The system will provide short acknowledgement chirps indicating the function selected.

To enter the installer program mode the program switch is toggled three times to the on position within ten seconds of the ignition switch being turned on. The system will sound three chirps indicating that the installer programmable mode has been selected. The desired function within this program branch is then selected in the same manner as described above with respect to the user programmable function selection once a branch has been selected.

Figure 15C:
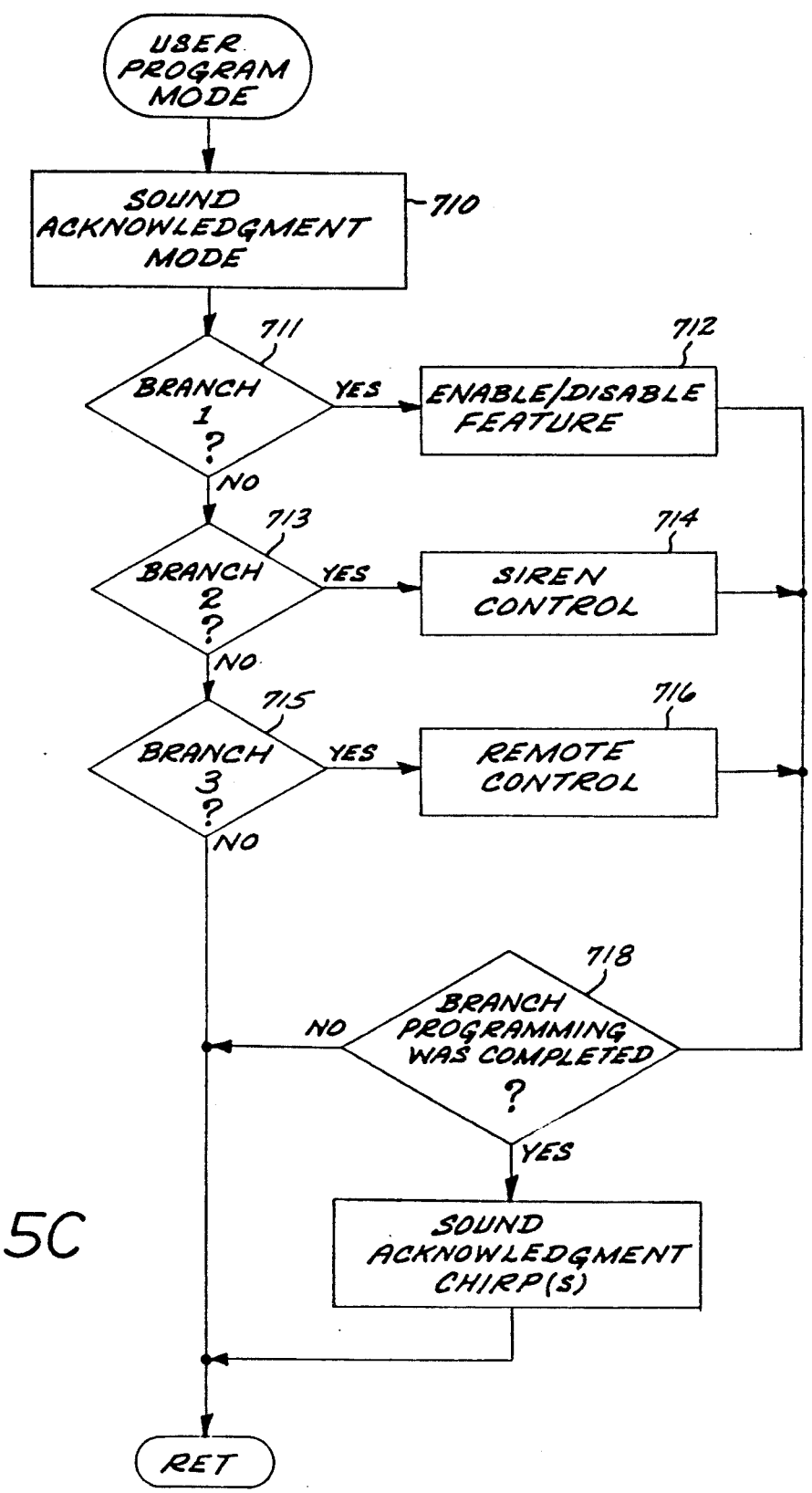
Figure 15D:
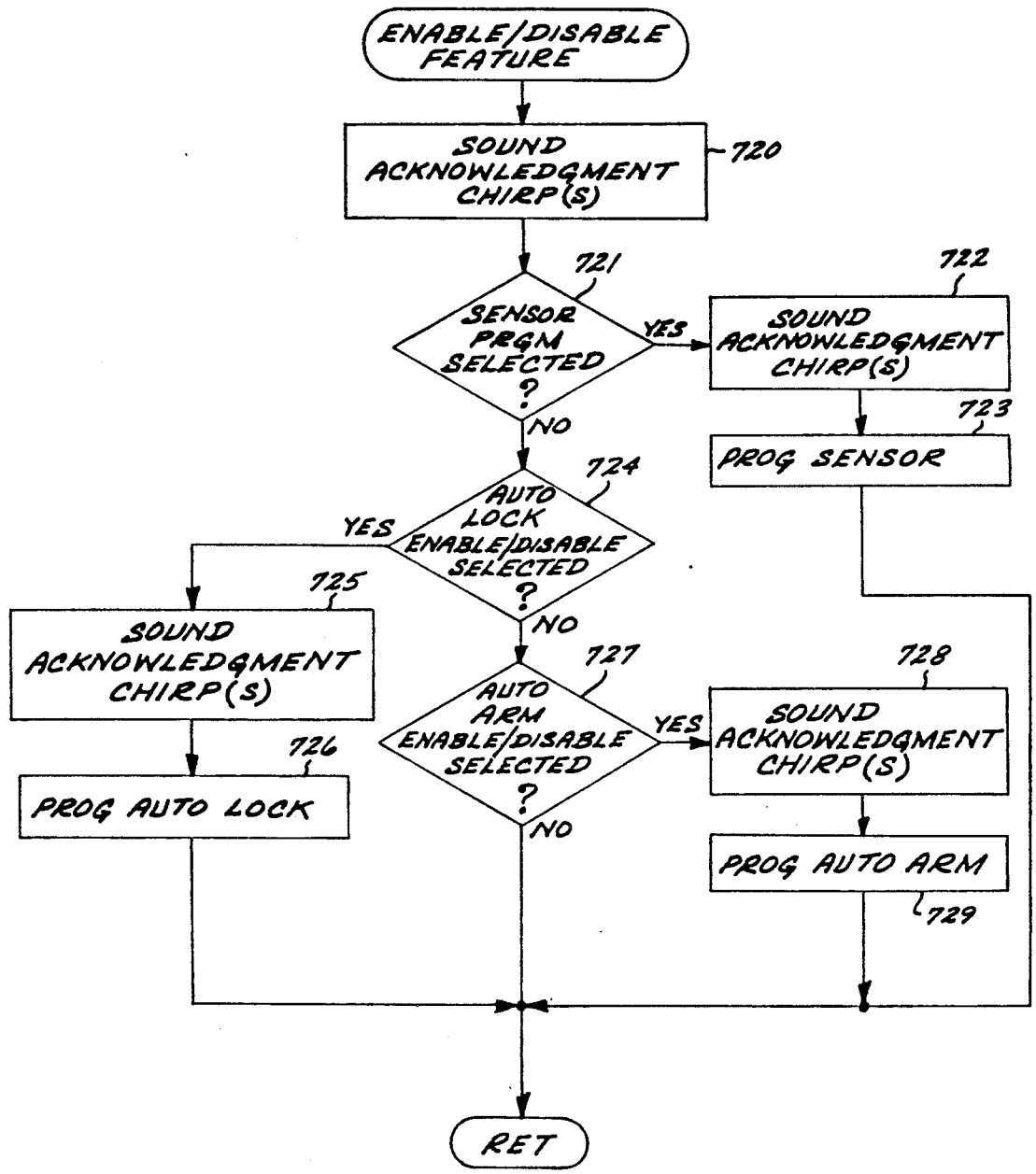
Figure 15E:
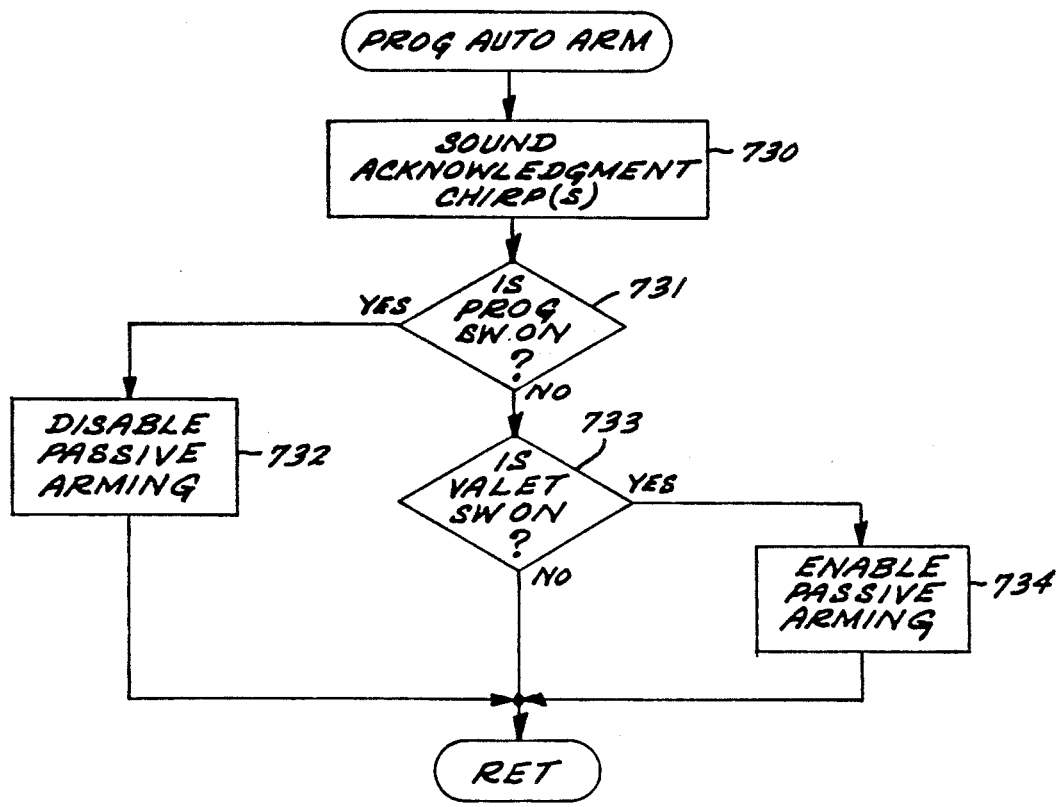
Figure 15F:
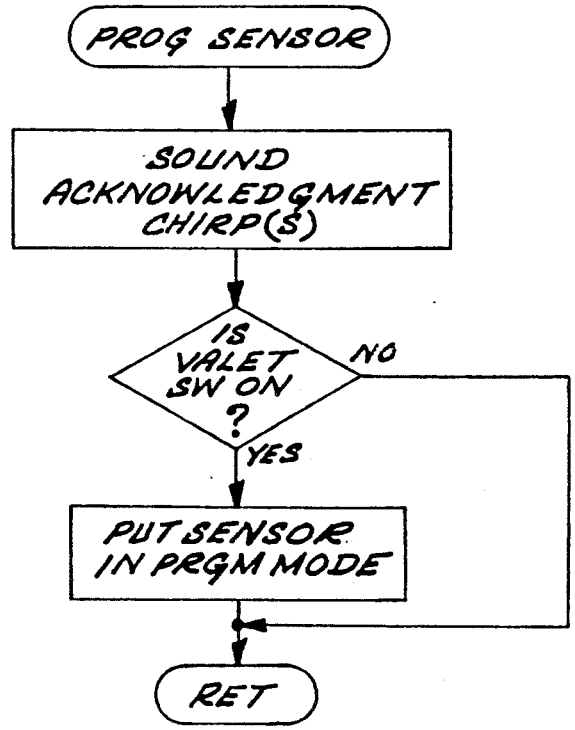
Figure 15G:
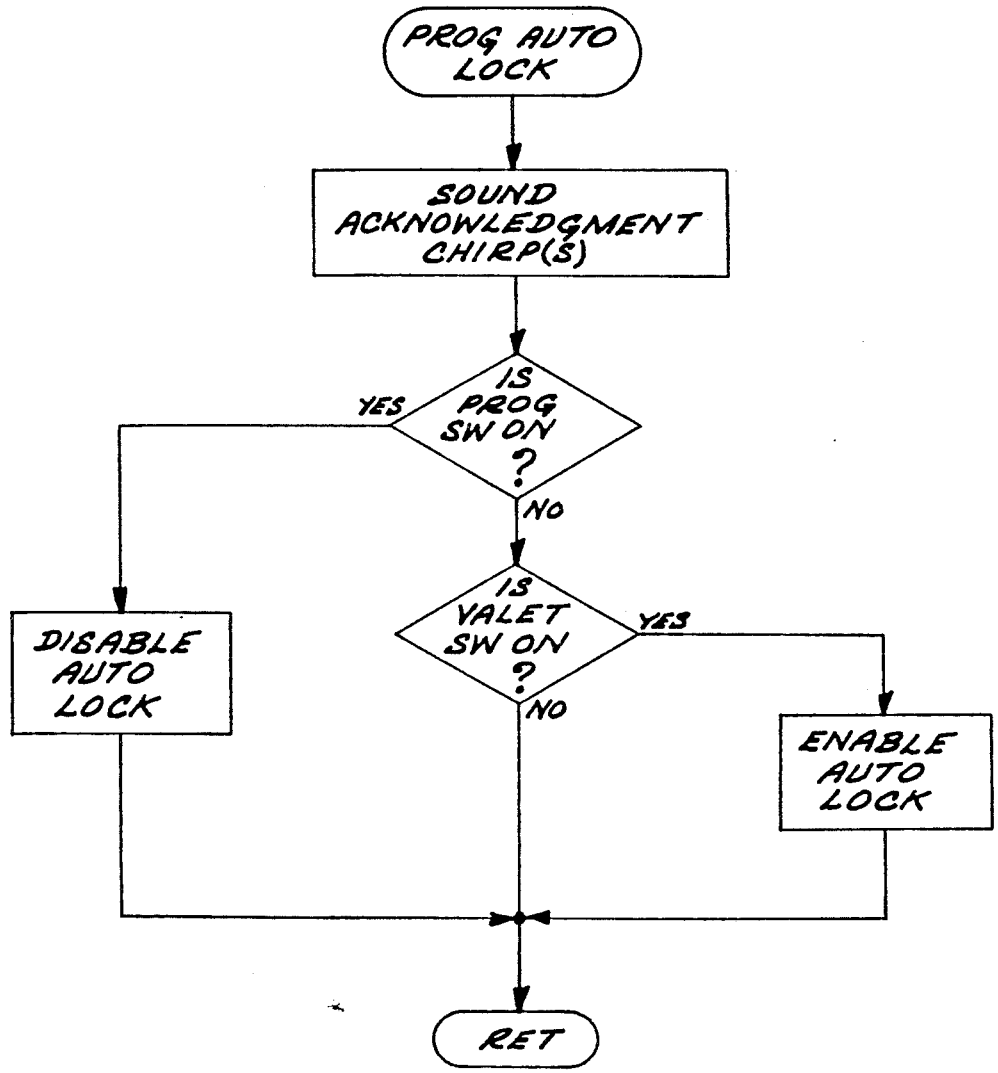
Figure 15H:
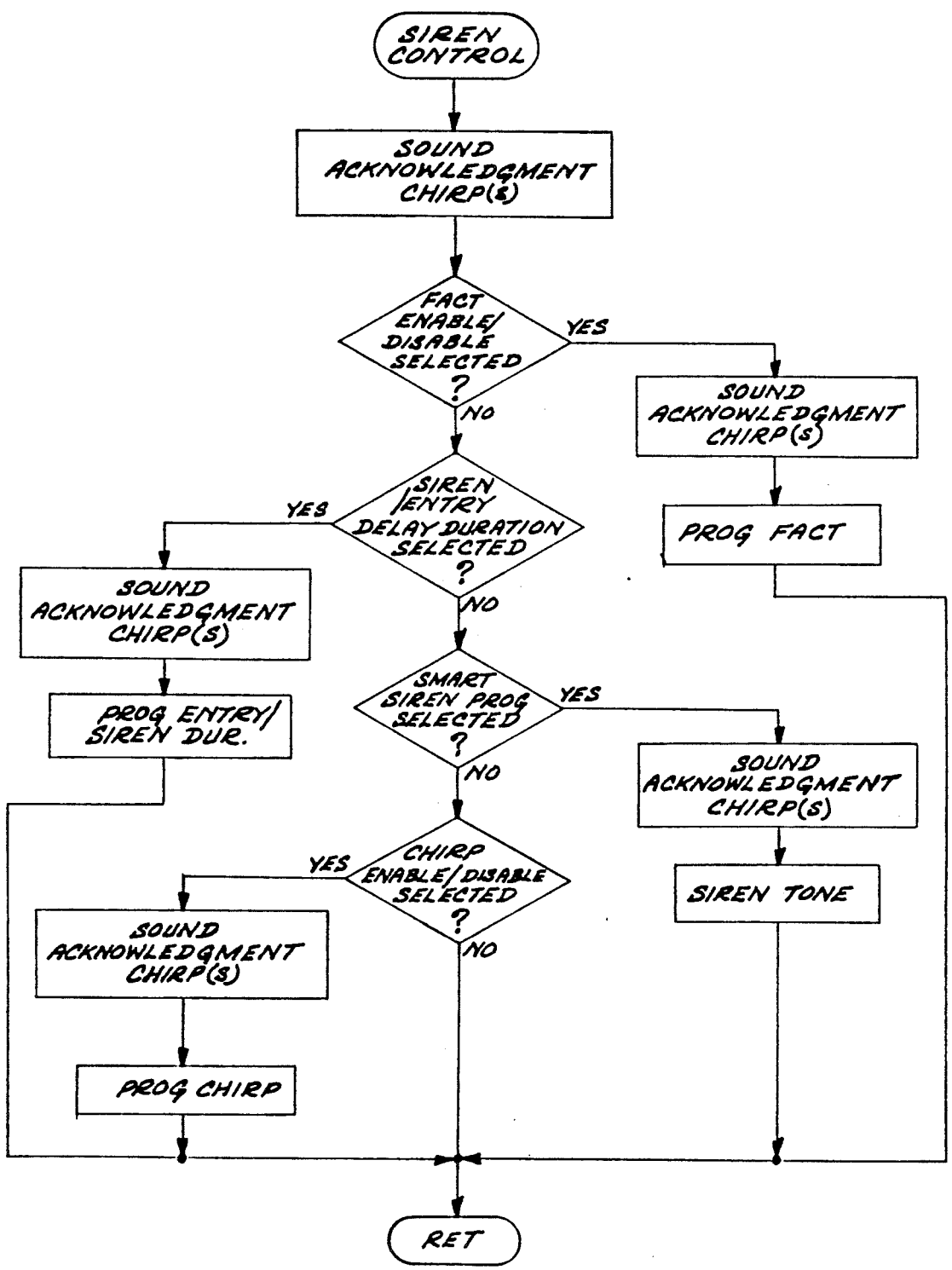
Figure 15I:
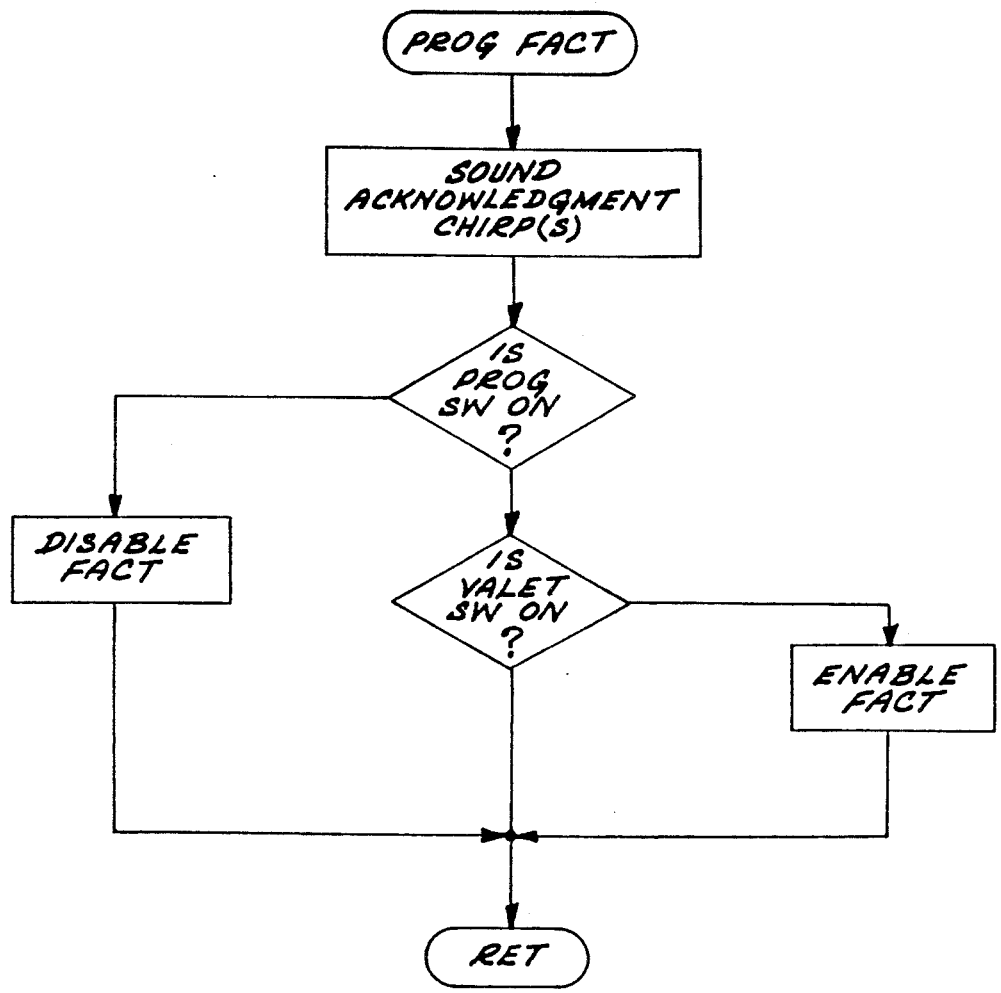
Figure 15J:
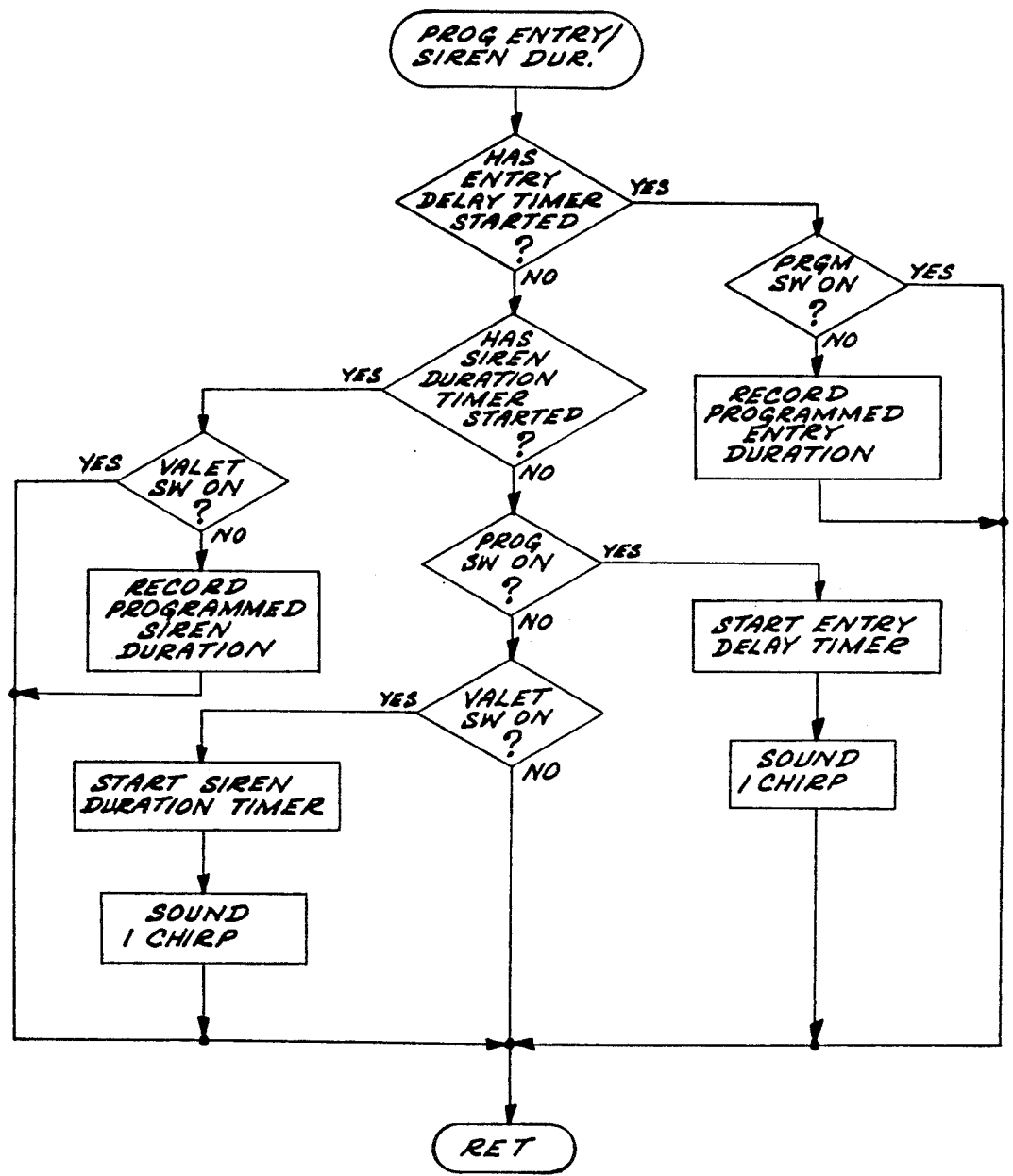
Figure 15K:
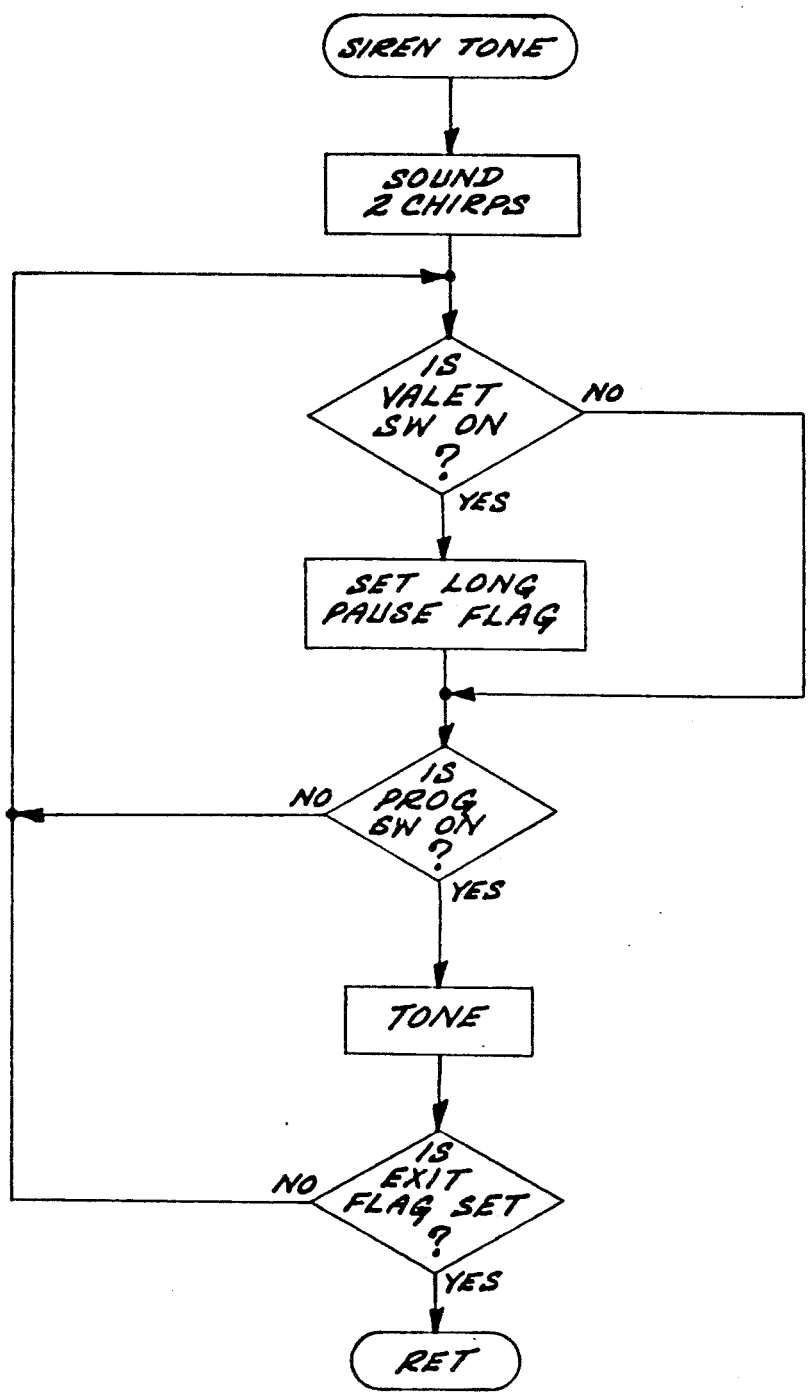
Figure 15L:
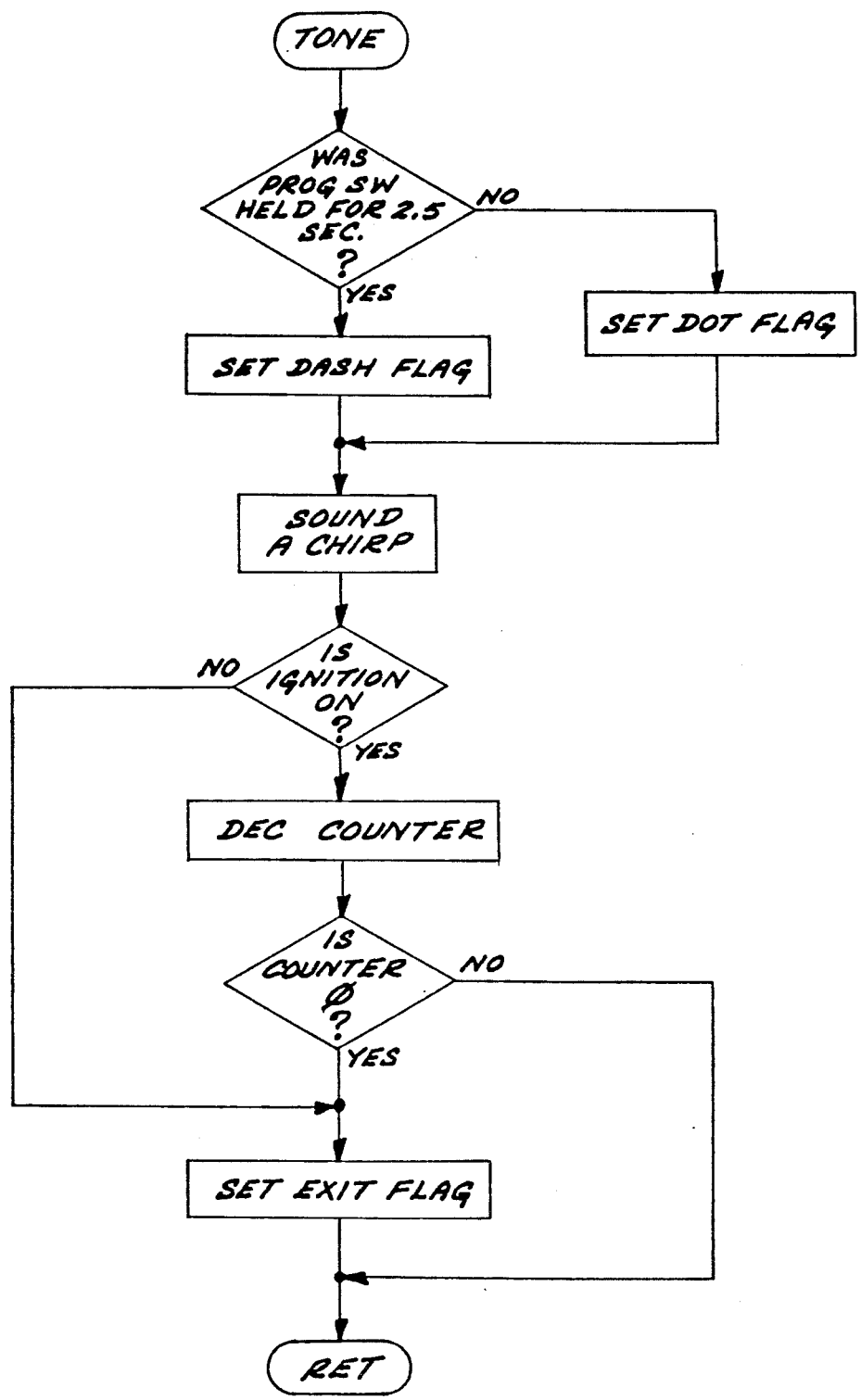
Figure 15M:
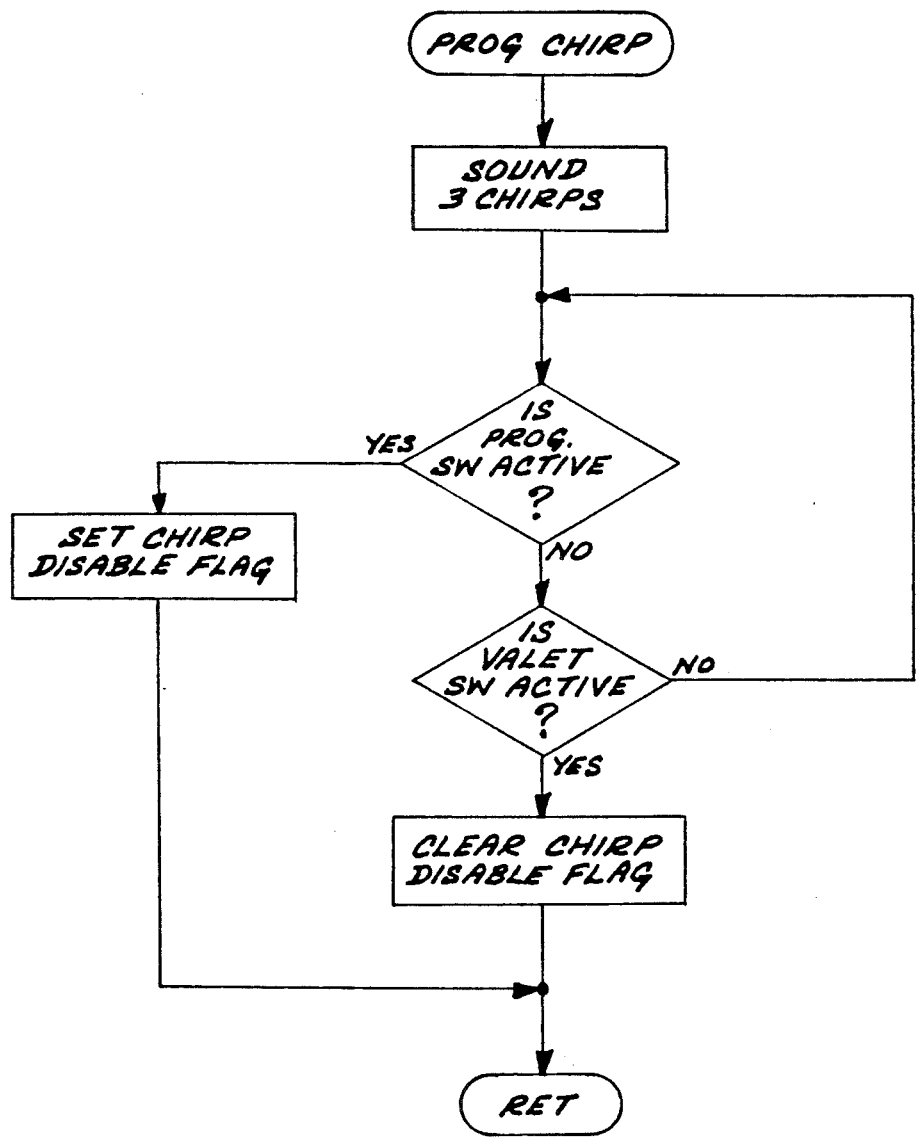
Figure 15N:
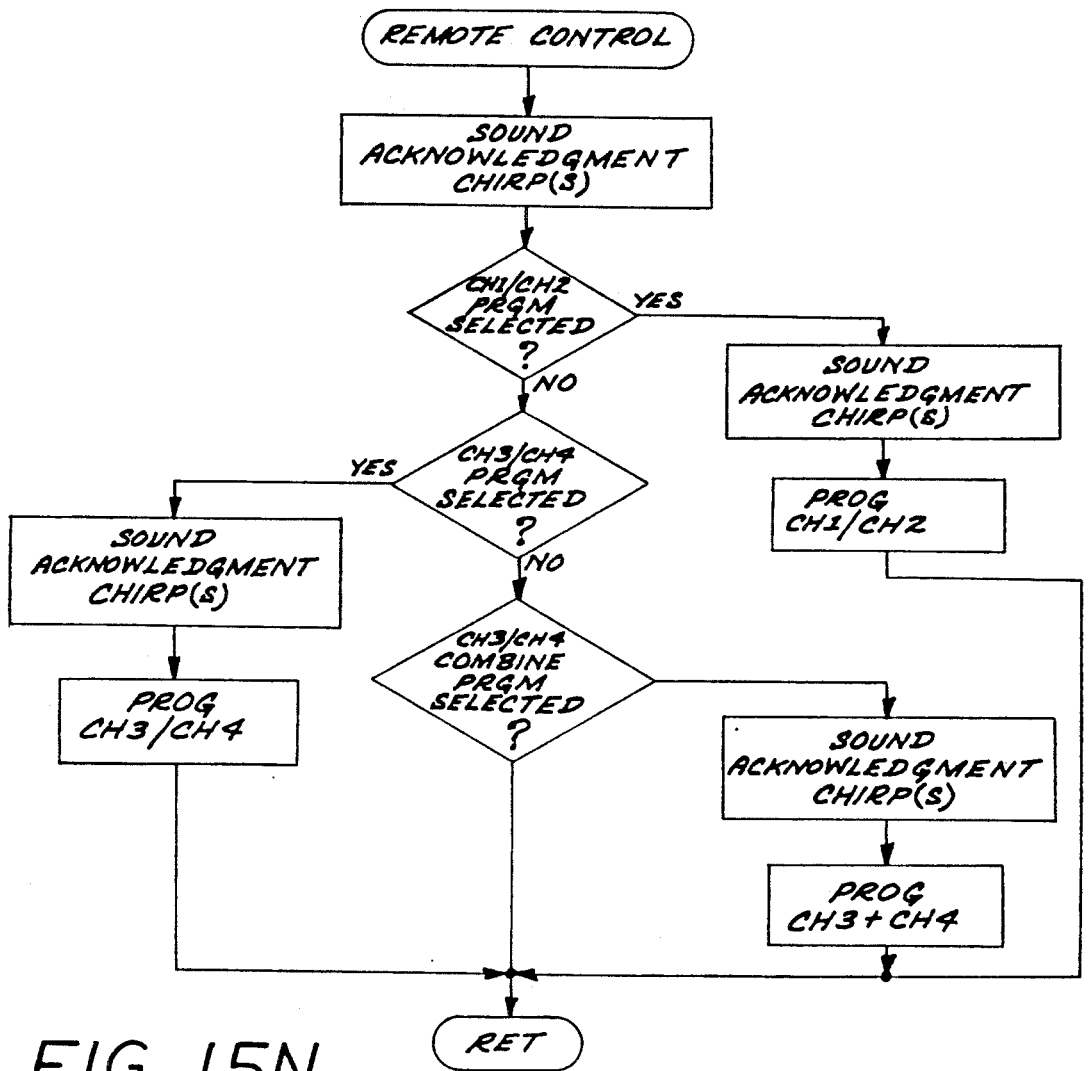
Figure 15O:
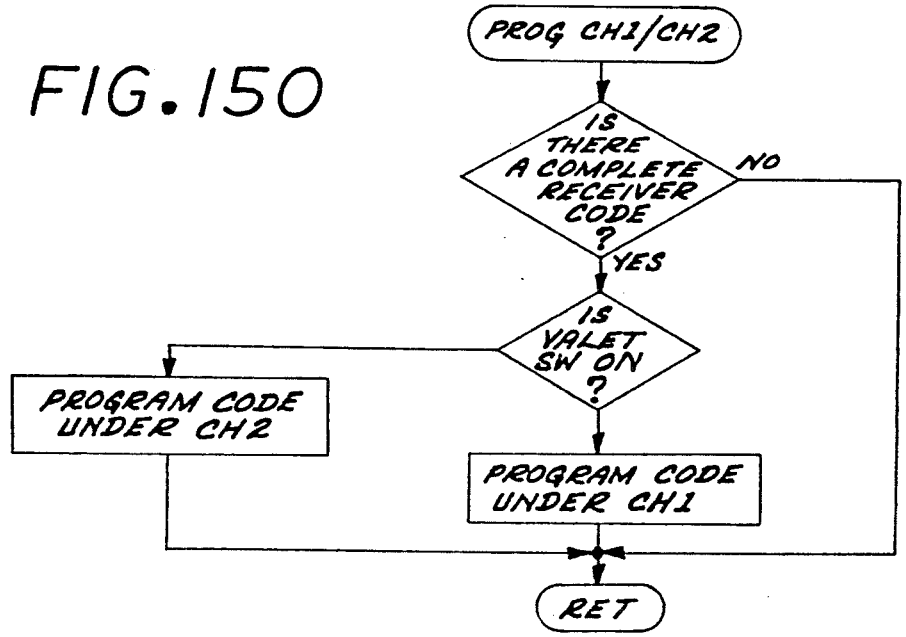
Figure 15P:
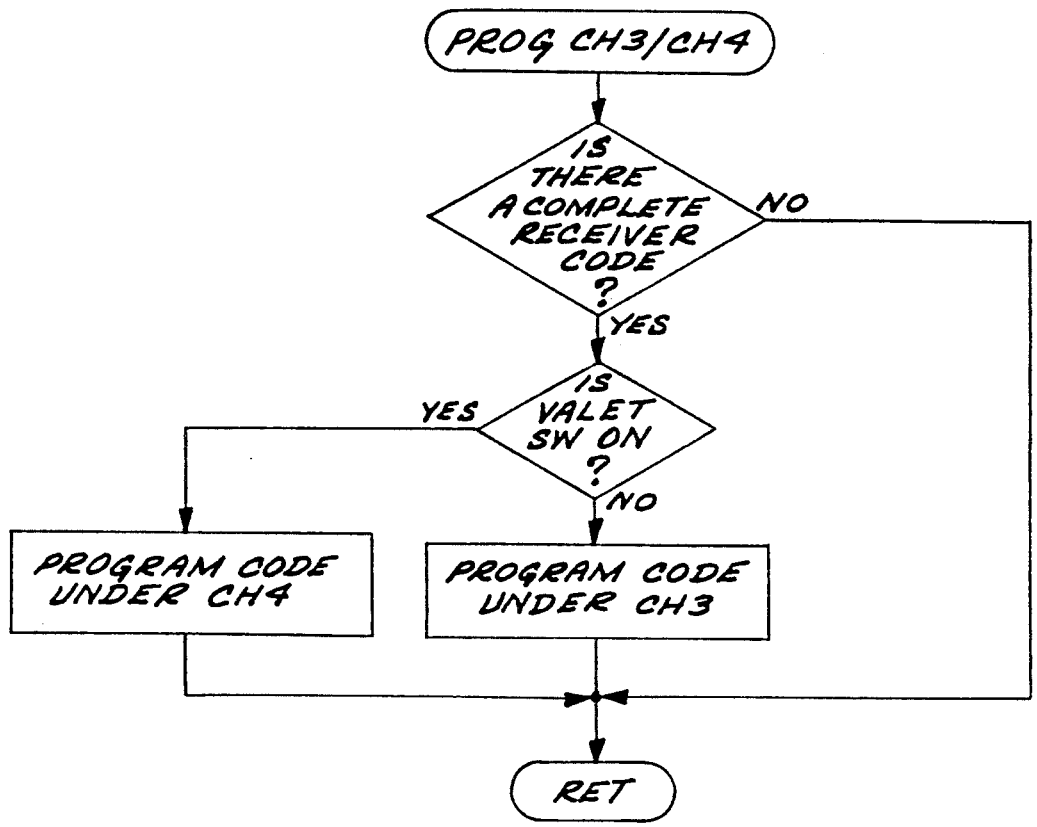
Figure 15Q:
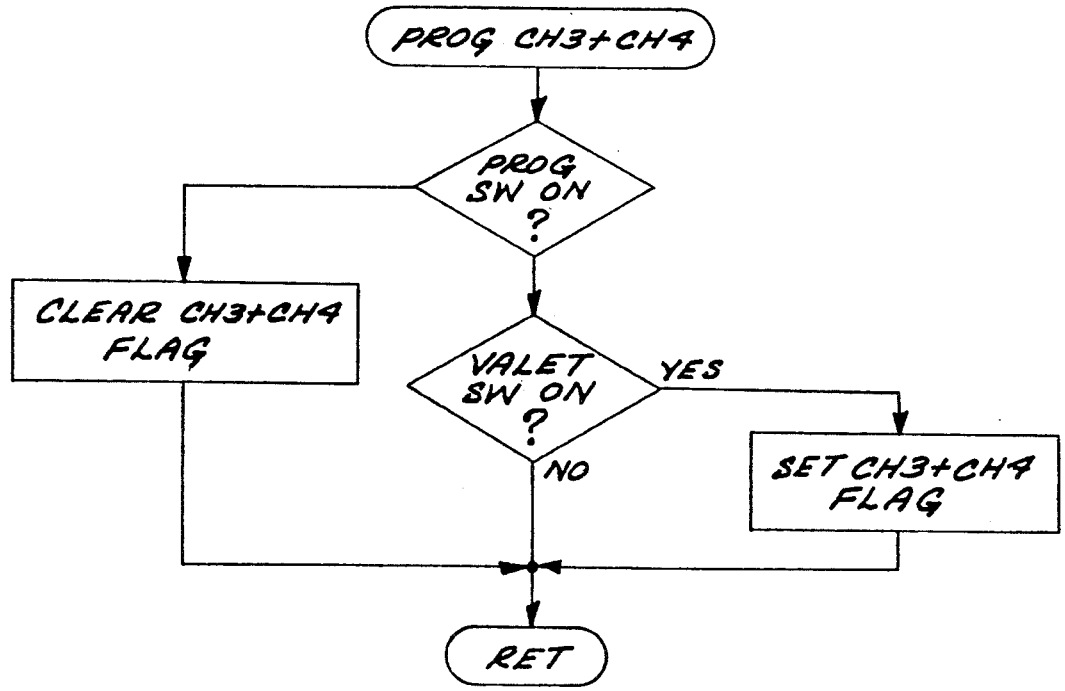
Figure 15R:
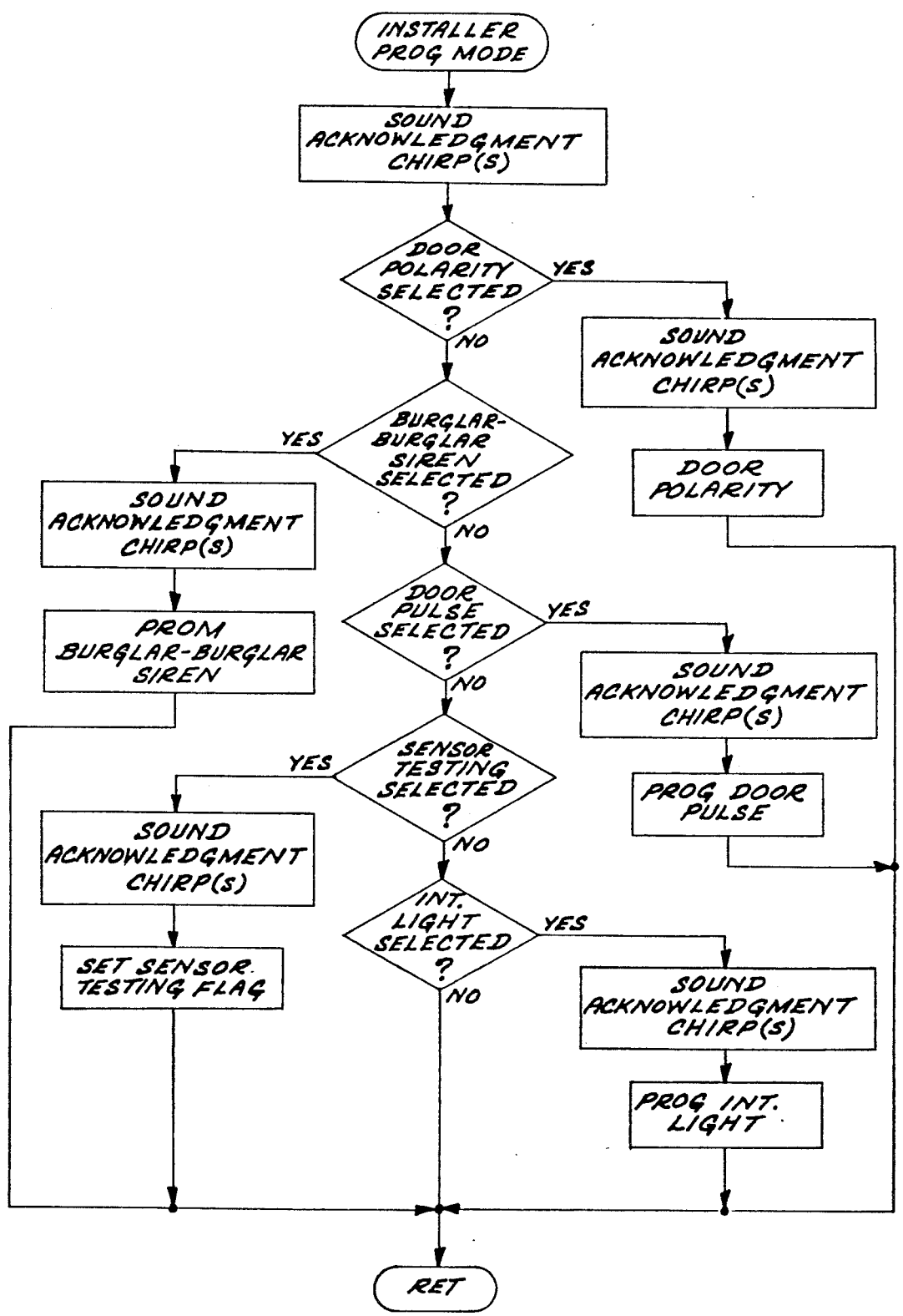
Figure 15S:
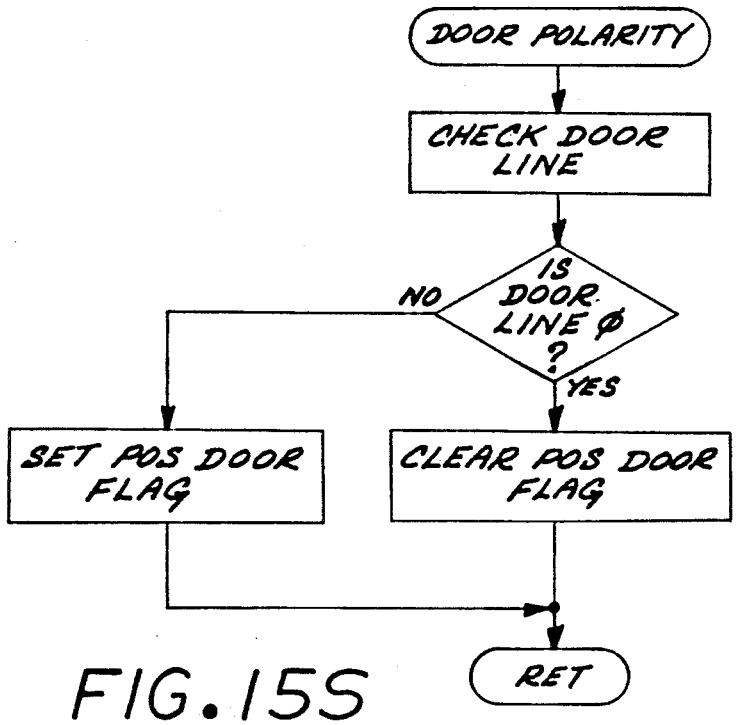
Figure 15T:
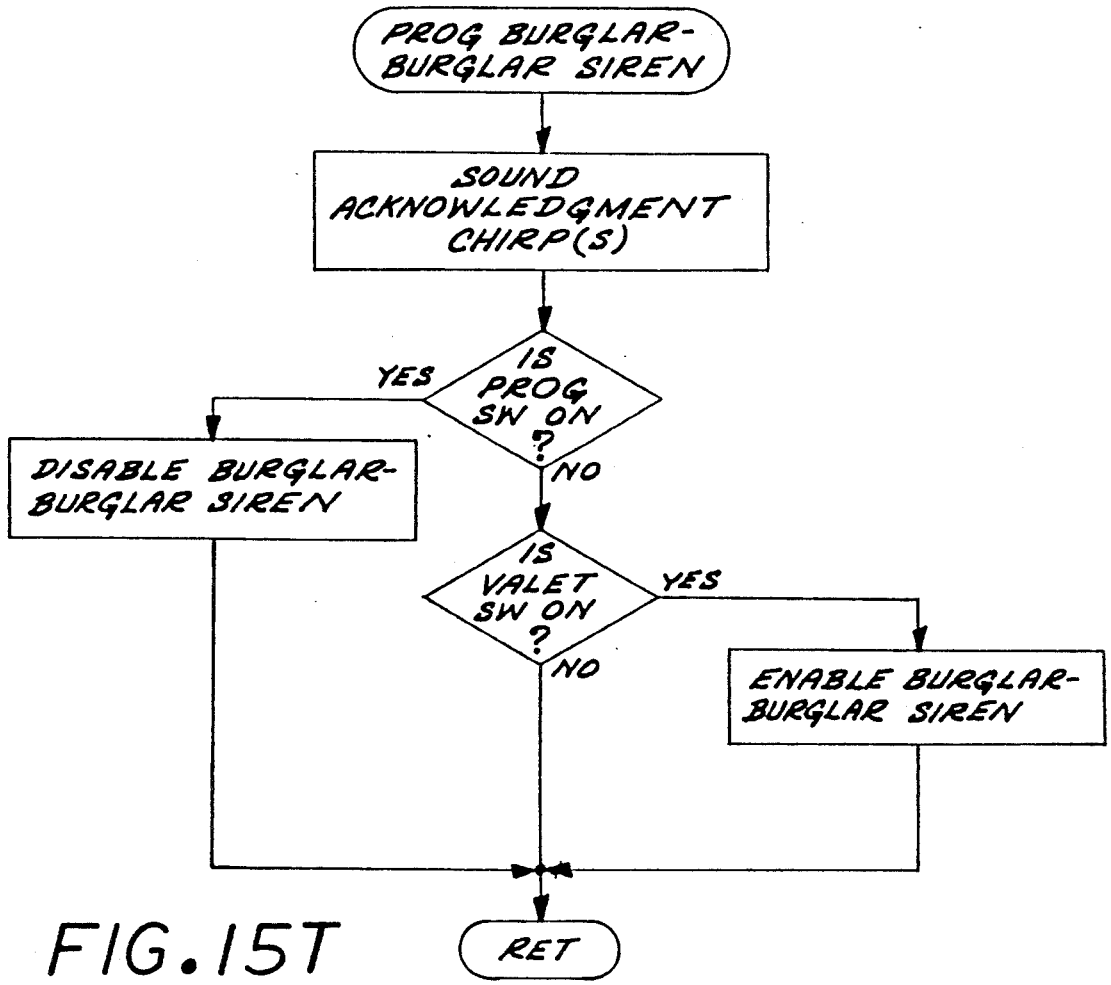
Figure 15U:
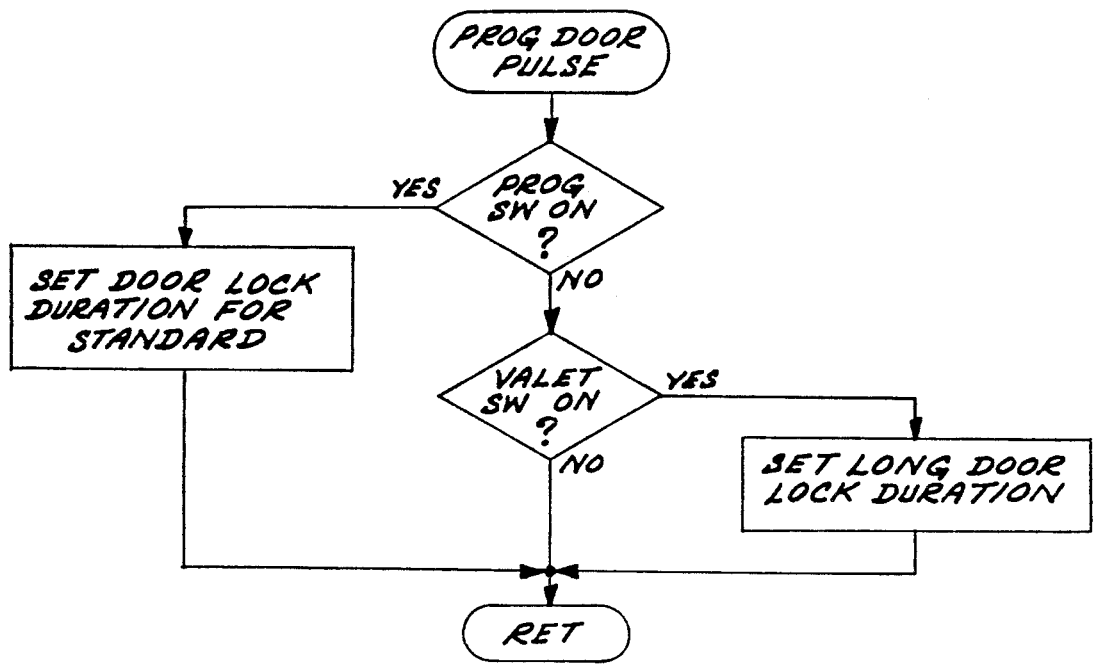

The ENTER PROG function (step 426 of FIG. 7) is shown in further detail in FIGS. 15A-U. At step 705, the 5 second program qualify timer (started at step 586, FIG. 12A) is checked. If its state has reached "0," operation returns to the main loop. If the counter has not reached "0," then the program switch 77 is checked at step 706 to determine if it is being held to the on position. If so then the user program mode is called at step 707. If the program switch is not being held on, then if the program switch has been toggled three times at step 708, the installer program mode is entered at step 709.

The user programmable mode branch selection is shown in FIG. 15C, where at step 710 the system sounds the acknowledgement chirp indicating that the user program mode has been entered as described above. Steps 711, 713 and 715 indicated decisions as to whether the enable/disable feature branch (branch 1), the siren control branch (branch 2) or the remote control branch (branch 3) was selected by the user. The selected branch is called at corresponding steps 712, 714 and 716. Upon return from the branch acknowledgement chirps are sounded if the user branch programming is completed (steps 717 and 718).

FIG. 15D represents the function 712 (FIG. 15), showing the selection of a particular function within the enable/disable branch. Thus, at step 720 an appropriate number of chirps is sounded, one chirp for branch 1, and at steps 721, 724 and 727 the program/valet switch is monitored to determine when a particular function is selected for programming. If the programmable sensor function is selected (step 721), then the acknowledgement chirp for this selection, here one chirp, is sounded and the PROG SENSOR routine is called. If the automatic locking enable/disable feature is selected (step 724), then two chirps are sounded (step 725) and the PROG AUTO LOCK routine is called (step 726). If the passive arming enable/disable feature is selected (step 727), then three chirps are sounded (step 728) and the PROG AUTO ARM routine is called (step 729).

FIGS. 15E-G illustrate the PROG AUTO ARM, PROG SENSOR and PROG AUTO LOCK routines respectively. For example, the PROGRAM AUTO ARM routine commences with the sounding of a single chirp as an acknowledgement that this routine has been selected (step 730). At step 731, the program switch 77 is checked and if on, the passive arming feature is disabled (step 732). If the program switch is not on, then the valet switch is checked (step 733) and if on, the passive arming feature is enabled (step 734). The PROG SENSOR routine and the PROG AUTO LOCK routines operate in a similar manner. The purpose of the PROG SENSOR routine is to put a programmable sensor device in its program mode for programming its sensitivity to vibration and shock. Such a sensor is described in the patent application entitled "Programmable Sensor Apparatus," Ser. No. 07/230,260, filed Aug. 9, 1988, by Ze'ev Drori and Moti Segal, U.S. Pat. No. 4,845,464.

FIG. 15H shows a flow chart of the siren control branch selection, which operates in a similar fashion to the enable/disable feature branch selection shown in FIG. 15D. The features which are programmed through this branch are FACT (FIG. 15I), the entry delay and siren duration feature (FIG. 15J), the personalized siren tone (FIGS. 15K and L) and the chirp enable/disable (FIG. 15M).

The FACT feature has been described above with respect to FIG. 13G. As illustrated in FIG. 15I, the user may enable or disable this feature during the user programming mode.

FIG. 15J illustrates the user programming of the entry delay and the alarm siren cycle duration. This feature allows the user to program the desired entry delay and siren duration.

FIG. 15J illustrates the SIREN TONE routine, the personalized siren programming feature, wherein the user can personalize the particular siren sound by programming a siren sound to comprise a series of "dots" and "dashes." FIG. 15M shows the PROG CHIRP routine, which permits the user to disable the sounding of chirps normally indicating the arming or disarming of the system. These features are described more fully in U.S. Pat. No. 4,887,065.

The programming feature selection for the third branch, the remote control branch, is shown in FIG. 15N. There are three functions in this branch, all involving the programming in the system controller memory of remote transmitter codes, as described in pending patent application entitled "Electronically Programmable Remote Control Access Systems," Ser. No. 07/094,395. In this embodiment there are four channels, each of which may be programmed to be responsive to a plurality of transmitter codes for performing a given function. For example, channel 1 arms and disarms the system. Channels 2-4 may be used for other purposes, such as to open the trunk lid remotely, and the like. The routines PROG CH1/CH2, PROG CH3/CH4, and PROG CH3+CH4 are shown in FIGS. 15O-15Q. Thus, FIG. 15O shows the selective programming of a particular code for either channel 1 or 2, FIG. 15P the selective programming of a particular code for either channel 3 or 4, and FIG. 15Q shows the selective programming of codes under either channel 3 or 4 to actuate channel 3 (to allow more codes to entered for channel 3.)

Figure 15V:
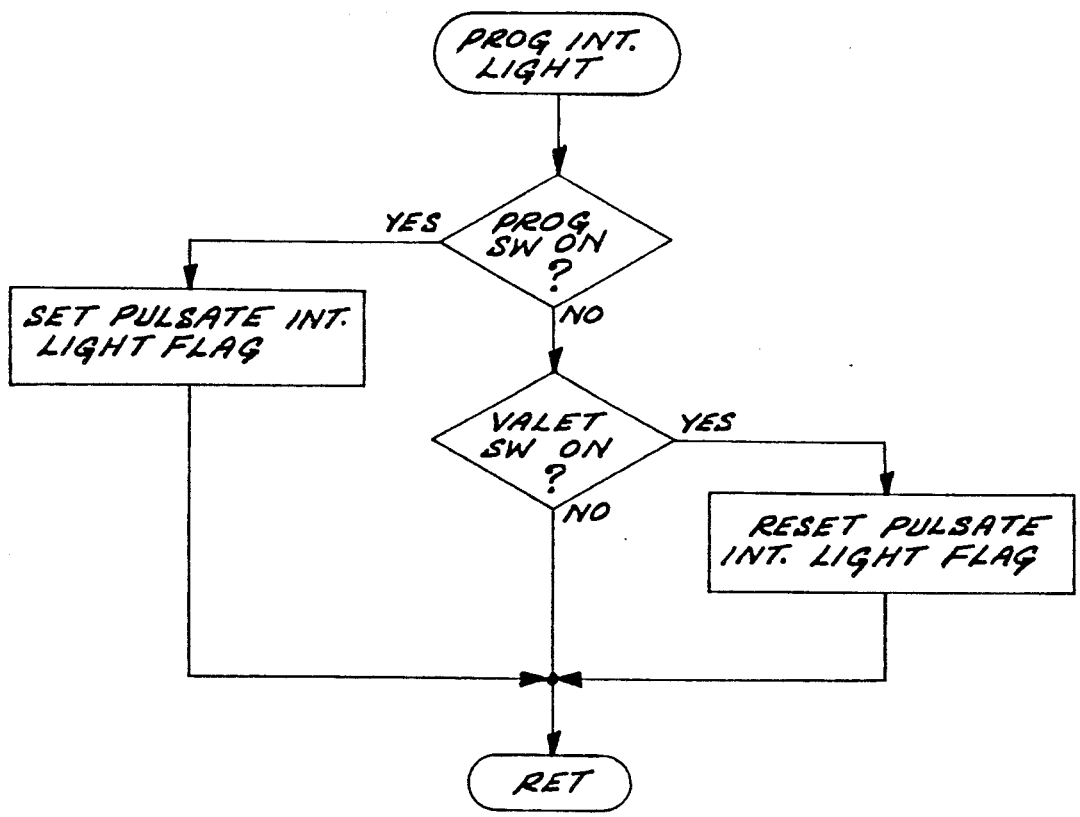

FIG. 15R shows the selection process for selecting the features to be programmed in the installer program mode. There are five features, the door trigger polarity routine (FIG. 15S), the BURGLAR-BURGLAR routine (FIG. 15T), the door lock pulse duration routine (FIG. 15U), the sensor test feature and the interior light pulsating feature (FIG. 15V).

The door trigger polarity (active high or low) for the particular vehicle is programmed by the installer by opening the vehicle door and selecting this feature for programming. By setting or clearing the POS DOOR flag automatically, the system is programmed to respond to the appropriate door trigger polarity.

FIG. 15T shows the selective enabling or disabling of the BURGLAR-BURGLAR feature by the installer. FIG. 15U allows the installer to select either a standard (typically) one-second output pulse duration for activating the vehicle power door locking and unlocking, or a long pulse duration (typically 3 seconds) for vehicles employing a door locking system requiring such longer length pulses.

From the foregoing, it is apparent that the various features of the system may be easily accessed during the program mode to enable, disable or program the various features of the system described above. For example, say that the user wishes to access the "auto arm" feature. After entering the user program mode, the user simply enters "1" to select branch 1, and then enters "3" to select the "auto arm" feature. The user then puts the switch 77 to the valet position to enable this feature. The preassigned number designations for the branches and features within each branch may typically be set forth in a user's manual accompanying the system. The manner in which the installer program mode is selected, as well as the features selectable in this mode, may be described in an installation manual which need not be given to the system user.

FIG. 15V allows the installer to enable or disable the interior light pulsate feature, wherein the interior light is cycled on and off during an alarm cycle.

Upon completion of the program mode, operation returns to the the main loop.

Figure 18:
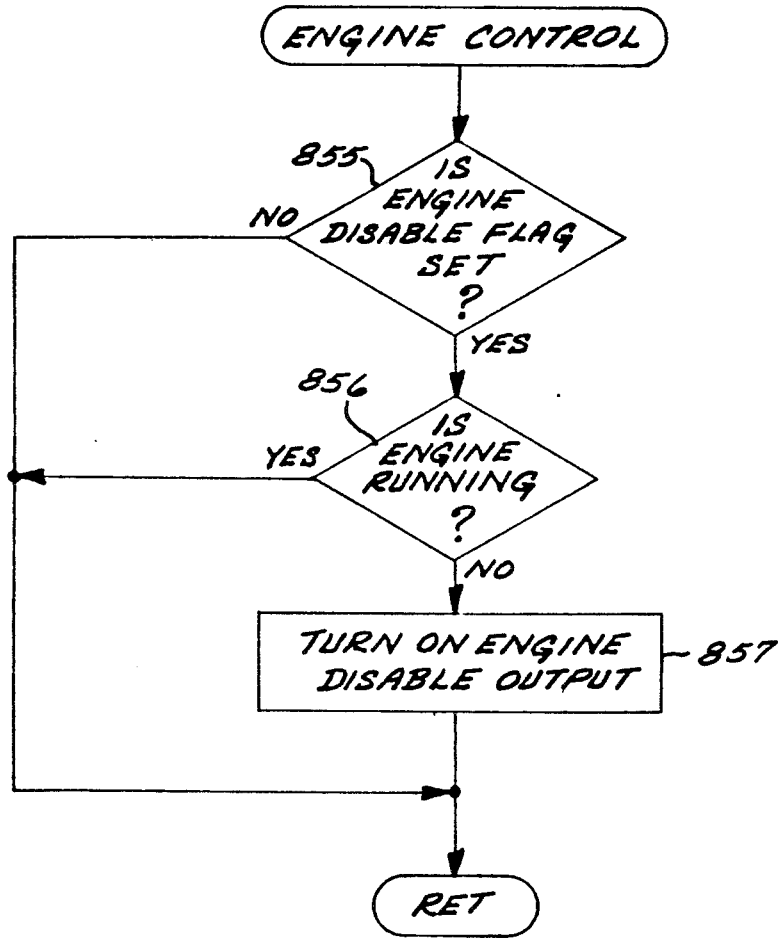

The BATTERY CHECK function module is shown in FIG. 16. This module prevents the system from draining the battery when an alarm condition is detected. The DOME LIGHT function module is shown in FIG. 21. The purpose of this module is to provide the capability of turning the vehicle courtesy light on and leaving it on for a predetermined period of time after the system has been disarmed, or until the ignition switch is turned on. The next function performed during the main loop (FIG. 7) is the ENGINE CONTROL function (step 434), shown more fully in FIG. 18. This function allows the vehicle engine to be disabled from unauthorized starting. Each of these functions is described more fully in the referenced U.S. Pat. No. 4,887,064.

Figure 19:
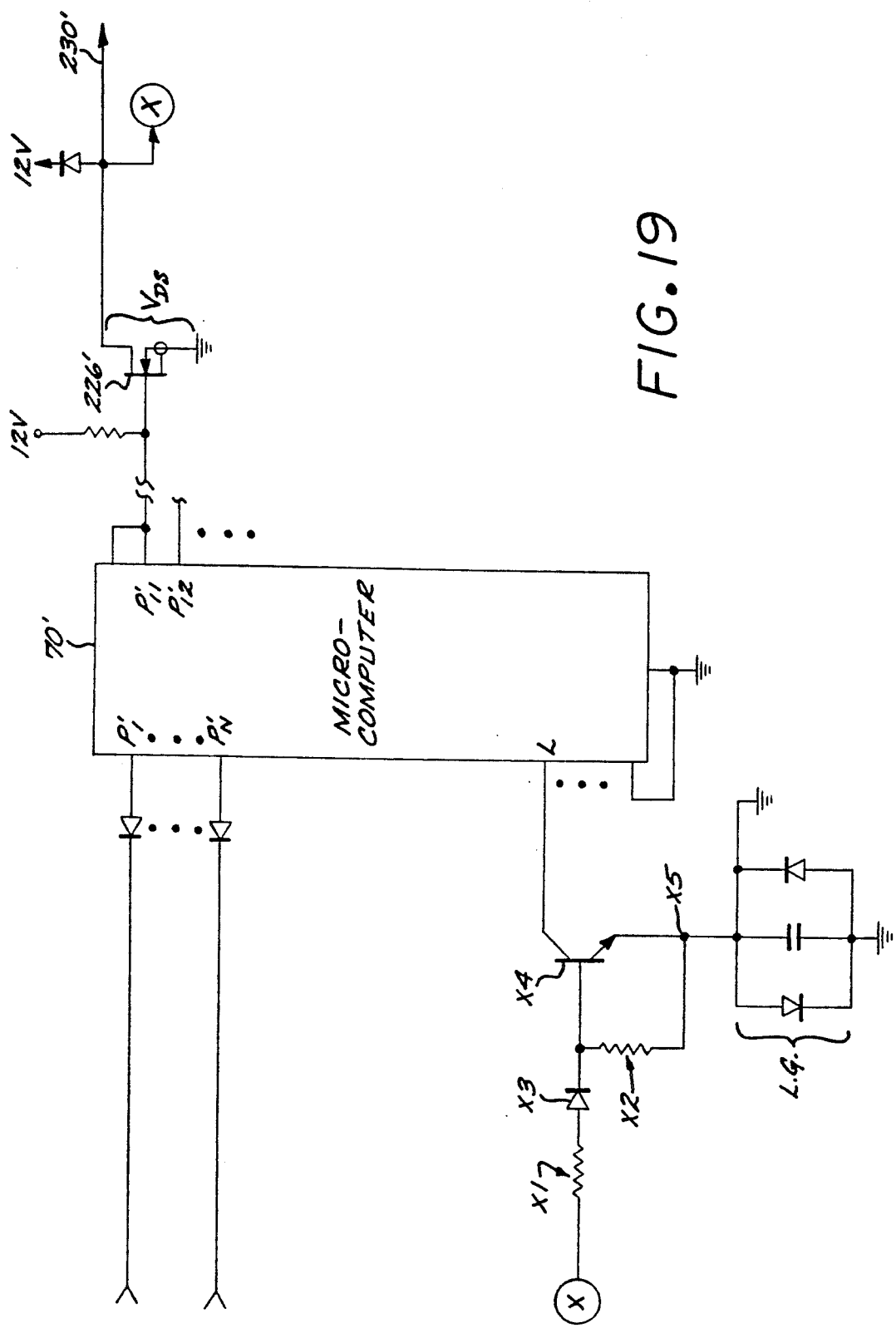
FIG. 19 is a simplified circuit schematic illustrating the output protection circuitry comprising the output protection feature of the invention.

Referring now to FIG. 19, the output protection circuitry comprising the invention is shown. FIG. 19 is a simplified form of FIG. 3, with many of its elements omitted for the sake of simplicity and clarity of description of this facet of the invention. Thus, the system includes a microcomputer 70' which receives sensor and trigger data at terminals P1'-Pn'. The microcomputer 70' controls a plurality of output devices by setting the states of output terminals P11'-P1n'. Thus, for example, terminal P11' may control an output circuit comprising FET transistor 236' which in turn drives the alarm siren through line 230'. Thus, the output P11' gates the FET transistor on or off. When the transistor is gated to the conductive state, the current through the drain to source regions of the FET is largely dependent on the impedance of the siren or other controlled device. If line 230' is inadvertently connected to +12 volts during installation and the transistor is gated on, a large destructive current will flow through the FET device, quickly resulting in damage to the device.

In accordance with the invention, a current sensing circuit is employed to provide a high current signal to the microcomputer 70' which acts on this information to turn off the output controlling the current handling element, thereby preventing damage to the FET. Thus, node X provides the potential difference between the FET drain and the source connection to chassis ground, $V_{DS}$. As is well known, the drain to source potential difference is a measure of the current flow through the device when the device is gated to the conductive state by an appropriate potential applied to the device gate connection, since there is some resistance in the device. The current sensing circuit generates a high current warning signal when the voltage $V_{DS}$ exceeds a predetermined level.

As shown in FIG. 19, the potential at node X is coupled through resistor X1 and diode X3 to the base of transistor X4. Node X5 is connected to the transistor emitter and to a biasing resistor X2. Node X5 is at the logic ground for the system. A logic ground (L.G.) circuit is connected to the chassis ground plane and includes a pair of diodes connected in parallel but in opposite sense. As a result, the logic ground plane is at a potential one diode junction drop or about 0.6 volts above the chassis ground plane. Thus, with diode X3 in series between the node X and the gate of transistor X4, and with the emitter at a 0.6 volt potential above chassis ground or the potential of the FET source, a voltage $V_{DS}$ level of at least about 1.2 volts is required to gate the comparator transistor X5 to the conductive state. With terminal L of the microcomputer 70' connected to the collector of transistor X5, an active low state of the terminal L will indicated the high current condition.

The microcomputer 70' periodically and frequently checks the status of the current sense terminals including terminal L, when call the routine OUTPUT PROTECTION in the main loop (FIG. 7) and when an active signal is sensed, the corresponding output terminal, here P11' is turned off, thereby preventing permanent damage to the output device 246'.

It will be appreciated that other current sensing circuits may be employed to achieve the function, e.g., with output devices other than FETs.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. A vehicle security system comprising means for detecting attempted intrusions to a vehicle when the system is put into the armed mode, means responsive to indications of a detected intrusion for activating an audible signal generating device for a predetermined alarm cycle duration, said means responsive to indications of a detected intrusion resetting after expiration of said duration so as to be activated again in the event of another intrusion after the first of said detected intrusions, and means for disabling, until said system has been disarmed and rearmed, further operation of said audible signal generating device in response to indications of a detected intrusion from said detecting means after said audible signal generating device has been activated by said detecting means a predetermined cumulative time interval after the system has been put into the armed mode, said cumulative time interval being longer than said alarm cycle duration, thereby reducing the noise pollution which might otherwise be created by a repetitive alarm condition.

2. The system of claim 1 wherein said predetermined time interval is the time duration of a predetermined number of successive alarm cycles.

3. A vehicle security system which does not continuously cycle through alarm cycles due to a constantly or repetitively active sensor or trigger device, comprising:
at least one sensor or trigger device for sensing an intrusion event and providing a device activated signal when the event is detected;
means for generating audible alarm alert signals in response to appropriate alert control signals;
a controller for controlling the operation of said security system so that said system may be operated in an armed mode wherein said controller monitors said at least one sensor or trigger device and generates the appropriate alert control signals to cause said audible alert generating means to issue an audible alarm alert signal of an alarm cycle duration in response to said device activated signal, or in a disarmed mode wherein said system is disabled from generating said alarm alert signals, said controller comprising:
means for monitoring the number of alarm cycles activated since the system was placed in the armed mode and preventing said audible alert generating means from activating further audible alarm alert signals after said number exceeds a predetermined number;
wherein said means for preventing said audible alert generating means from activating further audible alarm alert signals comprises means for monitoring the number of consecutive times one of said sensor or trigger devices is tripped and disabling said sensor or trigger device from thereafter activating said means for activating the audible alert generating means, without disabling the other of said sensor or trigger devices from thereafter activating said means for activating the audible alert generating means.

4. The system of claim 3 wherein said at least one sensor or trigger device includes a door trigger for generating a trigger device active signal when a door is open, whereby a continuous defect in said trigger, or the leaving of said door open, will, after activating said audible alert generating means said predetermined number of alarm cycles, no longer result in activation of said audible alert generating means, thereby minimizing noise pollution which would otherwise result from further activation and conserving battery power of the vehicle.

5. The system of claim 3 wherein said at least one sensor or trigger device includes a vibration sensor device, whereby repeated activations of the vibration sensor device will, after activating said audible alert generating means said predetermined number of alarm cycles, no longer result in activation of said audible alert generating means, thereby reducing the attendant noise pollution and conserving battery power of the vehicle.

6. The system of claim 3 wherein said at least one sensor or trigger device comprises:
a sensor device for sensing an intrusion event and providing a sensor device activated signal when said event is detected; and
a trigger device for indicating the open/close status of one or more of the vehicle's accessible compartments and providing a trigger device activated signal when said one or more compartments are open;
wherein said controller generates said appropriate alert control signals in response to either said sensor device activated signal or said trigger device activated signal; and
wherein said means for preventing said audible alert generating means from activating further audible alarm alert signals comprises means for monitoring the number of consecutive times one of said sensor or trigger devices is tripped and disabling said sensor or trigger device from thereafter activating said means for activating the audible alert generating means, without disabling the other of said sensor or trigger devices from thereafter activating said means for activating the audible alert generating means.

7. A vehicle security system which may be armed or disarmed by a remote control transmitter, and which is operable to automatically rearm the system a predetermined time interval after disarming by remote control if none of the vehicle doors has been opened, comprising:
vehicle antitheft means;
a remote control transmitter for generating an encoded signal;
means operable when the system is armed and responsive to receipt of said encoded signal for disarming said system; and
means for automatically rearming said system in the event none of the vehicle doors is opened during a time interval of predetermined length after said system is disarmed by said remote control transmitter.

8. The system of claim 7 wherein said means responsive to receipt of said encoded signal for disarming said system further comprises means for automatically unlocking one or more of the vehicle doors, and said means for automatically rearming said system further comprises means for automatically locking said one or more vehicle doors when said system is automatically rearmed.

9. The system of claim 8 wherein said system further comprises means for arming said system in response to receipt of said encoded signal generated by said transmitter, and means for locking one or more of the vehicle doors when the system is armed in response to receipt of said encoded signal.

10. The system of claim 9 wherein receipt of said encoded signal when the system is in the disarmed state results in the arming of the system, and wherein receipt of said encoded signal when the system is in the armed state results in the disarming of the system.

11. The system of claim 8 wherein said system further comprises means for arming said system in response to receipt of a second encoded signal generated by said transmitter, and means for locking one or more of the vehicle doors when the system is armed in response to receipt of said second encoded signal.

12. A vehicle security system, comprising:
- at least one sensor device for sensing attempted tampering with said vehicle and generating a "sensor active" signal when the sensor device is tripped;
- at least one trigger device for monitoring the open/closed status of one or more of the vehicle access locations, and providing a "trigger active" signal when said location has an opened status;
- a first alert means for generating a first type of alarm alert signal in response to a first alarm event signal;
- a second alert means for generating a second type of alarm alert signal in response to a second alarm event signal;
- means for selectively arming or disarming said security system; and
- an electronic controller for controlling the operation of said security system, said controller responsive to said "sensor active" and "trigger active" signals while said system is armed for generating said first and second alarm event signals under predetermined conditions, said controller comprising:
  - means responsive to receipt of the first said "sensor active" signal after said system is armed for activating said first alert means to generate said first type of alert signal for a limited time duration;
  - means responsive to at least said first "sensor active" signal after said system is armed for activating said second alert means for a limited time duration if said "trigger active" signal is generated within a predetermined time interval after receipt of said first "sensor active" signal.

13. The security system of claim 12 wherein said first alert means comprises a siren.

14. The security system of claim 12 wherein said second alert means comprises means for generating a voice synthesized message.

15. The security system of claim 12 wherein said controller further comprises means for bypassing said sensor device after receipt of said first "sensor active" signal so that second and subsequent receipts of said "sensor active" signal do not result inactivation of said first alert means.

* * * * *